United States Patent
Feng et al.

(10) Patent No.: US 11,729,182 B2
(45) Date of Patent: *Aug. 15, 2023

(54) SPECULATIVE RENDERING

(71) Applicant: Menlo Security, Inc., Mountain View, CA (US)

(72) Inventors: Ji Feng, Sunnyvale, CA (US); Gautam Altekar, Sunnyvale, CA (US); Yang Yu, Sunnyvale, CA (US)

(73) Assignee: Menlo Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,972

(22) Filed: Aug. 24, 2022

(65) Prior Publication Data
US 2023/0041844 A1   Feb. 9, 2023

Related U.S. Application Data

(63) Continuation of application No. 17/031,692, filed on Sep. 24, 2020, now Pat. No. 11,489,845.

(60) Provisional application No. 63/048,610, filed on Jul. 6, 2020, provisional application No. 62/992,798, filed on Mar. 20, 2020, provisional application No. 62/989,471, filed on Mar. 13, 2020, provisional application No. 62/983,270, filed on Feb. 28, 2020, provisional application No. 62/904,873, filed on Sep. 24, 2019.

(51) Int. Cl.
*H04L 9/40*   (2022.01)
*G06F 9/451*   (2018.01)

(52) U.S. Cl.
CPC ............ *H04L 63/123* (2013.01); *G06F 9/451* (2018.02); *H04L 63/0281* (2013.01); *H04L 63/1408* (2013.01)

(58) Field of Classification Search
CPC .............. H04L 63/123; H04L 63/0281; H04L 63/1408; G06F 9/451
See application file for complete search history.

(56) References Cited

U.S. PATENT DOCUMENTS

| | | | | |
|---|---|---|---|---|
| 8,438,474 | B1 * | 5/2013 | Lloyd | G06F 16/9574 |
| | | | | 715/241 |
| 8,739,186 | B2 * | 5/2014 | Iorio | G06F 9/485 |
| | | | | 709/208 |
| 9,075,778 | B1 * | 7/2015 | Hamon | G06F 16/951 |
| 9,391,832 | B1 * | 7/2016 | Song | G06F 16/9574 |

(Continued)

OTHER PUBLICATIONS

Zambre, Rohit, et al. "Parallel performance-energy predictive modeling of browsers: Case study of servo." 2016 IEEE 23rd International Conference on High Performance Computing (HiPC). IEEE, 2016. (Year: 2016).*

(Continued)

*Primary Examiner* — Jung W Kim
*Assistant Examiner* — Sameera Wickramasuriya
(74) *Attorney, Agent, or Firm* — Van Pelt, Yi & James LLP

(57) ABSTRACT

Predictive rendering (also referred to herein as speculative rendering) is disclosed. The predictive rendering is performed by an endpoint browser in response to a user input made by a user. The predictive rendering is verified using a surrogate browser that is executed on a remote server. The verification can be performed asynchronously.

27 Claims, 19 Drawing Sheets

(56) References Cited

U.S. PATENT DOCUMENTS

| | | | |
|---|---|---|---|
| 9,898,445 B2* | 2/2018 | Reshadi | G06F 16/9535 707/706 |
| 10,440,140 B2* | 10/2019 | Barraclough | H04L 67/5681 |
| 2002/0069241 A1* | 6/2002 | Narlikar | H04L 9/40 709/225 |
| 2002/0073155 A1* | 6/2002 | Anupam | H04L 67/02 709/204 |
| 2005/0071777 A1* | 3/2005 | Roessler | G06F 9/451 715/825 |
| 2006/0224973 A1* | 10/2006 | Albrecht | G06F 9/451 715/760 |
| 2007/0006080 A1* | 1/2007 | Finger | H04N 5/85 386/E5.064 |
| 2008/0235239 A1* | 9/2008 | Penton | G06F 16/9574 |
| 2010/0306642 A1* | 12/2010 | Lowet | H04L 67/1095 715/234 |
| 2010/0312858 A1* | 12/2010 | Mickens | G06F 16/9574 709/203 |
| 2013/0086031 A1* | 4/2013 | Marantz | G06F 16/9535 707/706 |
| 2014/0226805 A1* | 8/2014 | Li | H04W 4/16 379/207.02 |
| 2014/0283068 A1* | 9/2014 | Call | H04L 63/0428 726/23 |
| 2015/0312375 A1* | 10/2015 | Valey | H04L 67/5681 |
| 2016/0239468 A1* | 8/2016 | Capt | H04L 9/40 709/225 |
| 2018/0322667 A1* | 11/2018 | Yap | H04W 4/16 379/207.02 |

OTHER PUBLICATIONS

Flinn et al., Data Staging on Untrusted Surrogates, 2nd USENIX Conference on File and Storage Technologies (FAST 03), 2003.

Zhao et al. "Energy-aware web browsing on smartphones." IEEE Transactions on Parallel and Distributed Systems 26.3 (2014): 761-774. (Year: 2014).

* cited by examiner text input, no JS
Free form text: [          ]
text input, JS control, allow only 5 digits
Number: [23232]
[Submit]

FIG. 15A

Free form text: [          ]
text input, JS control, allow only 5 d
Number: [11111]
[Submit]
FORM 2
Name: [          ]

🔒 Input mismatch ✕
The website javascript has changed the content of the input box, please re-examine the content of the input box.

FIG. 15B text input, no JS
Free form text: [                  ]
text input, JS control, allow only 5 d
Number: [22222]
[Submit]
FORM 2

🔒 Input mismatch ✕ the content of the input box, please re-examine the content of the input box.

FIG. 15C

Disable tab key default action: ☐

Inconsistency detected ✕

Please check your input values, some of them has been changed.

[OK]

Password: [            ]
[Submit]
FORM 3

FIG. 15D

SPECULATIVE RENDERING

CROSS REFERENCE TO OTHER APPLICATIONS

This application is a continuation of U.S. patent application Ser. No. 17/031,692, entitled SPECULATIVE RENDERING filed Sep. 24, 2020, which claims priority to U.S. Provisional Patent Application No. 62/904,873, entitled VIDEO RENDERING filed Sep. 24, 2019, and claims priority to U.S. Provisional Patent Application No. 62/983,270, entitled ADAPTIVE RASTERING filed Feb. 28, 2020, and claims priority to U.S. Provisional Patent Application No. 62/989,471, entitled ADAPTIVE RASTERING filed Mar. 13, 2020, and claims priority to U.S. Provisional Patent Application No. 62/992,798, entitled ADAPTIVE RASTERING filed Mar. 20, 2020, and claims priority to U.S. Provisional Patent Application No. 63/048,610, entitled ELEMENT SHADOWING AND SPECULATIVE RENDERING filed Jul. 6, 2020, each of which is incorporated herein by reference for all purposes.

BACKGROUND OF THE INVENTION

One way that nefarious individuals perpetrate computer attacks is by exploiting browser vulnerabilities. When an unsuspecting user visits a website hosting malicious content, that user's browser can by compromised and the compromise can further be extended to other resources on the user's computer. Exposure to known threats can sometimes be prevented by having users routinely apply patches or otherwise update their browsers. Unfortunately, many users lack the skill or knowledge to keep their browsers up to date (or run legacy browsers for which such patches/updates are not available) and thus remain vulnerable to preventable attacks. Approaches such as having patches automatically applied can reduce but not eliminate risk. For example, even browsers diligently kept up-to-date can be compromised by zero-day and/or other attacks that the browser is not capable of withstanding.

One approach to helping protect users of browsers is to make use of a surrogate browser, interposed between the user's browser and remote content. In an example implementation, the surrogate browser can be used to interact with potentially problematic content, and an end user can be presented with a representation of those interactions while protecting the user's own browser from at least some potential harm, such as through pixel mirroring or Document Object Model mirroring. One problem with such mirroring techniques can be that for certain types of pages (e.g., having particular kinds of interactive elements), the user experience is less satisfying than when the user's own browser is directly used to access content. Accordingly, improvements in surrogate browsing techniques are desirable.

BRIEF DESCRIPTION OF THE DRAWINGS

Various embodiments of the invention are disclosed in the following detailed description and the accompanying drawings.

FIGS. 15A-15D illustrate various notifications.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Example Environment

Figure 1:
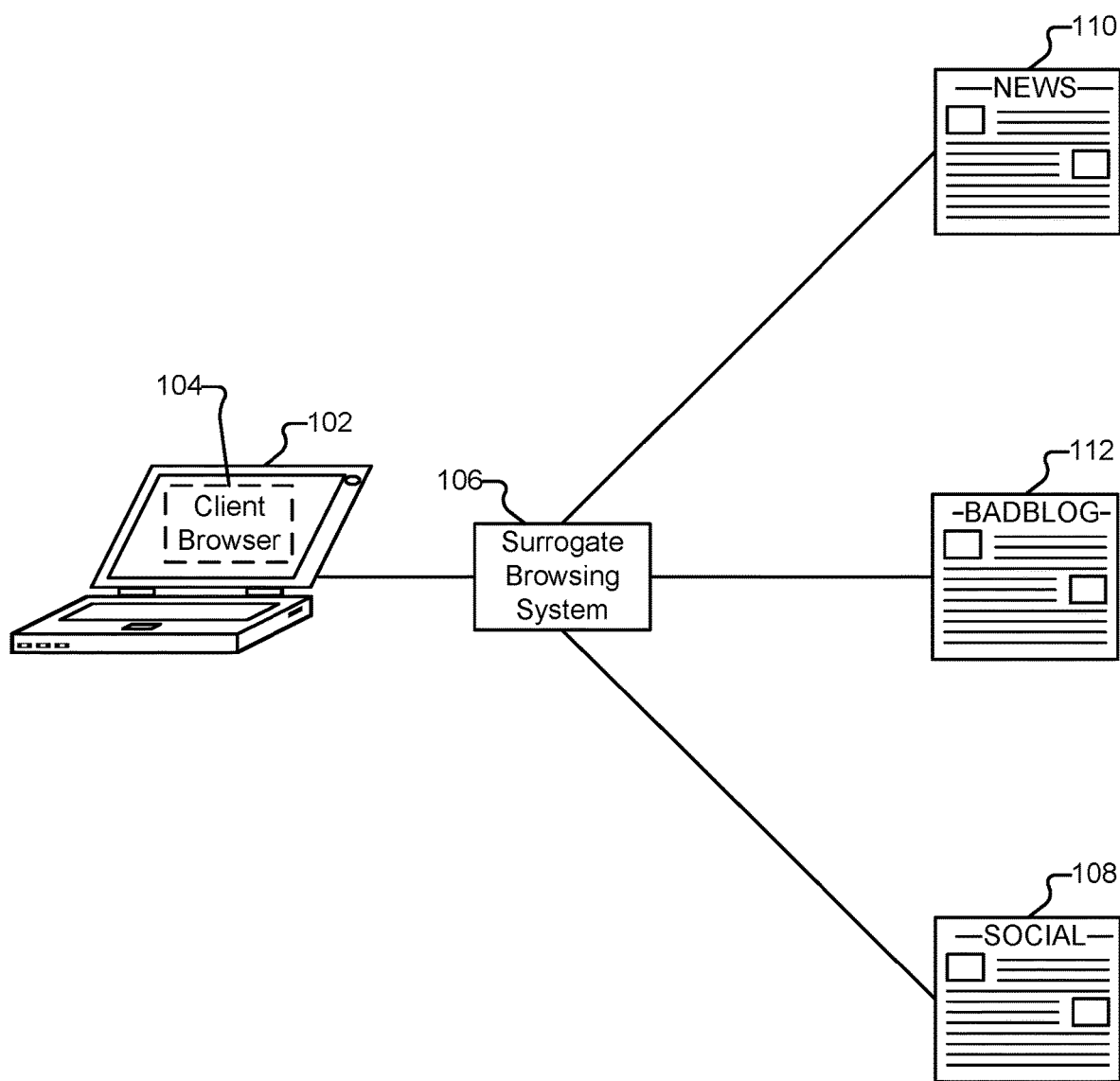
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links—resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed—located at data centers around the world.

Figure 2A:
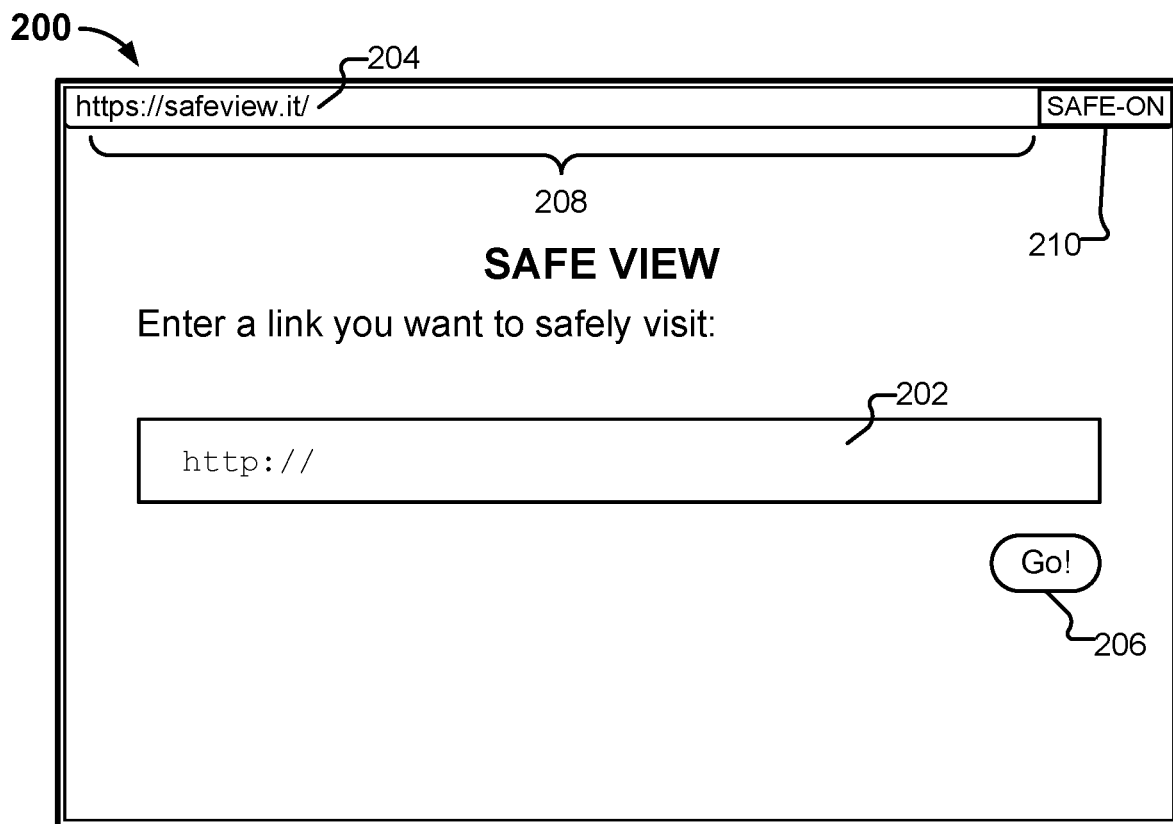
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://examplenews.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
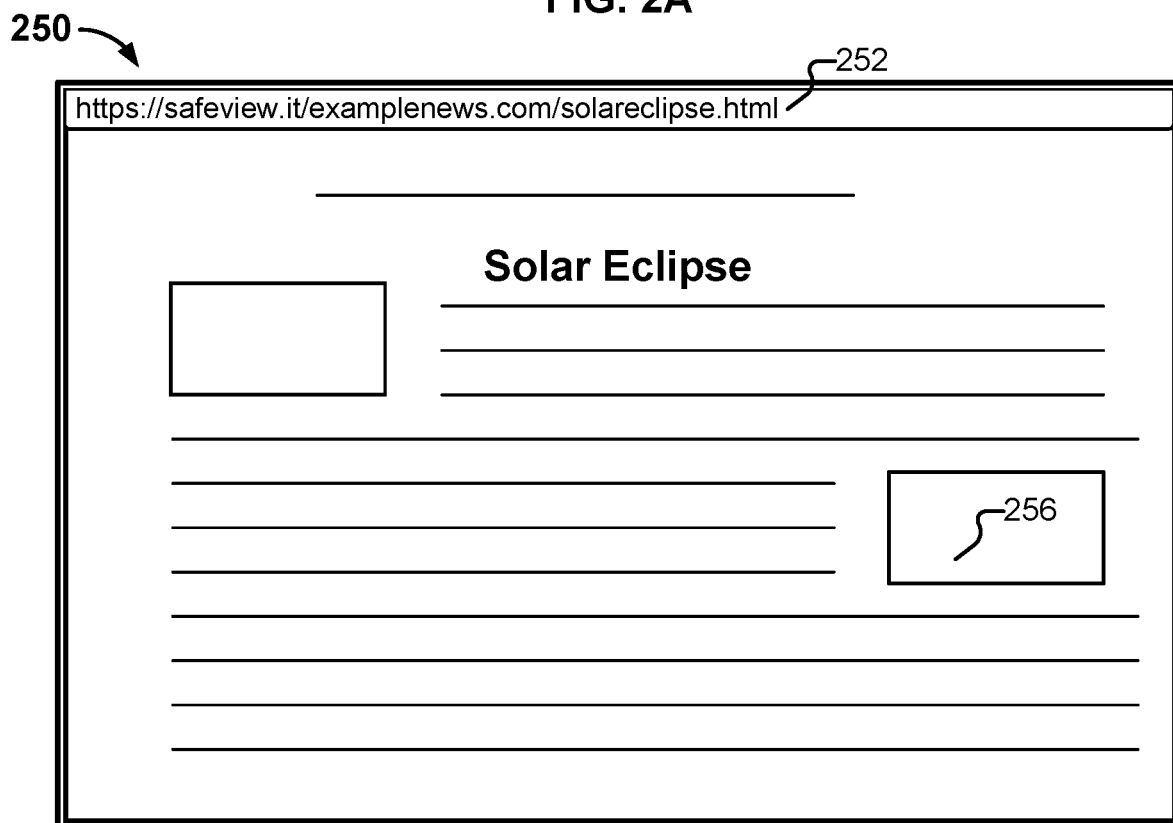
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "examplenews.com/solareclipse.html" directly with her browser. As will be described in more detail below, system 106 has fetched the content from site 110 on behalf of Alice, and has processed the received content to generate a representation of the content that is then provided by system 106 to client 102. Also as will be described in more detail below, surrogate browsing system 106 can be configured in a variety of ways and use a variety of techniques to transform the content it receives (e.g., from site 110) prior to transmitting a representation of the content to client 102.

Figure 3:
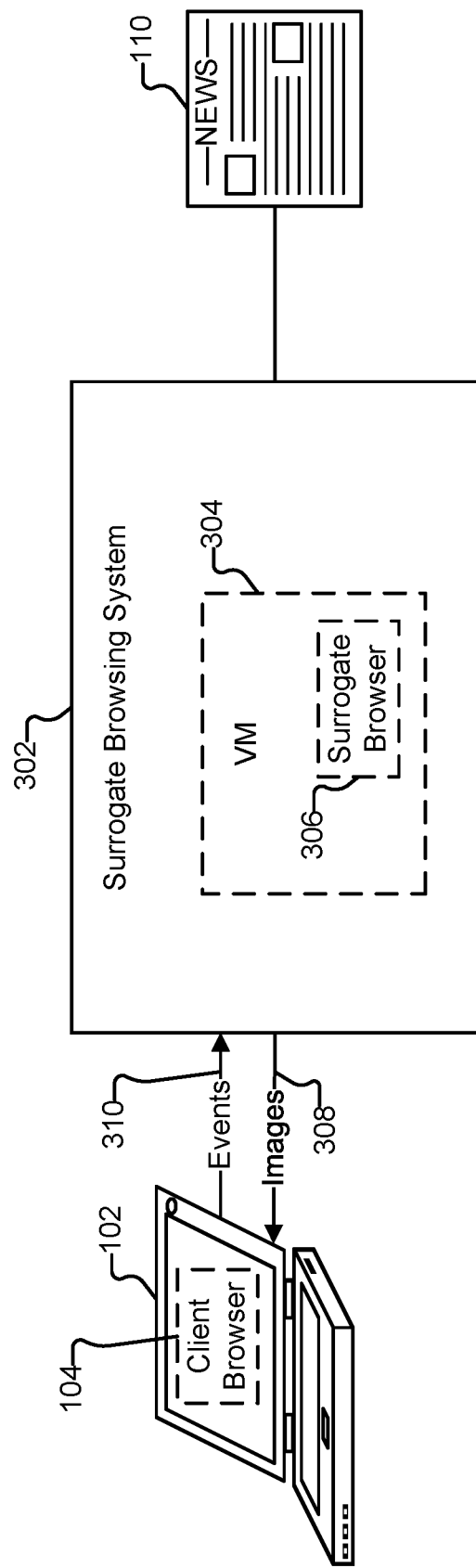
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as driveby downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components—a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
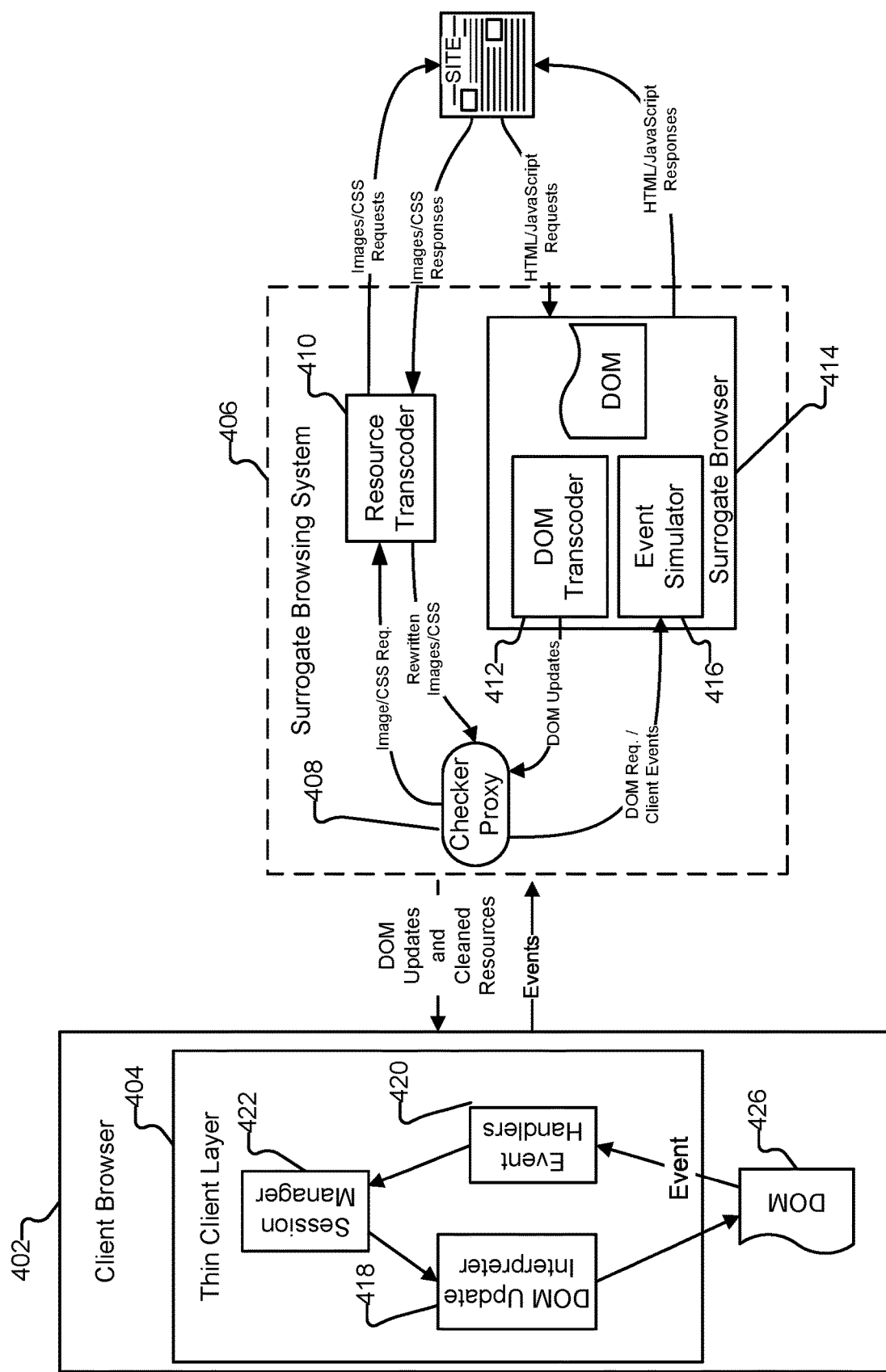
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

Surrogate Browsing System 406

Surrogate Browser 414

Surrogate browser 414 is a Webkit-based browser (or other appropriate browser) running inside a Linux container—a lightweight and disposable sandboxing environment. The surrogate browser renders requested pages and runs JavaScript code within the pages. It also contains an event simulator component 416 that applies user interaction events (e.g., 310) received from client 102.

DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interaction and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

Thin Client Layer 404

The thin client layer (404) includes three logical components: a DOM update interpreter 418, client event input handler(s) 420, and a session manager 422.

DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

Event Handler(s) 420

Many modern web pages are interactive—user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages—a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

Enterprise Mode

Figure 5:
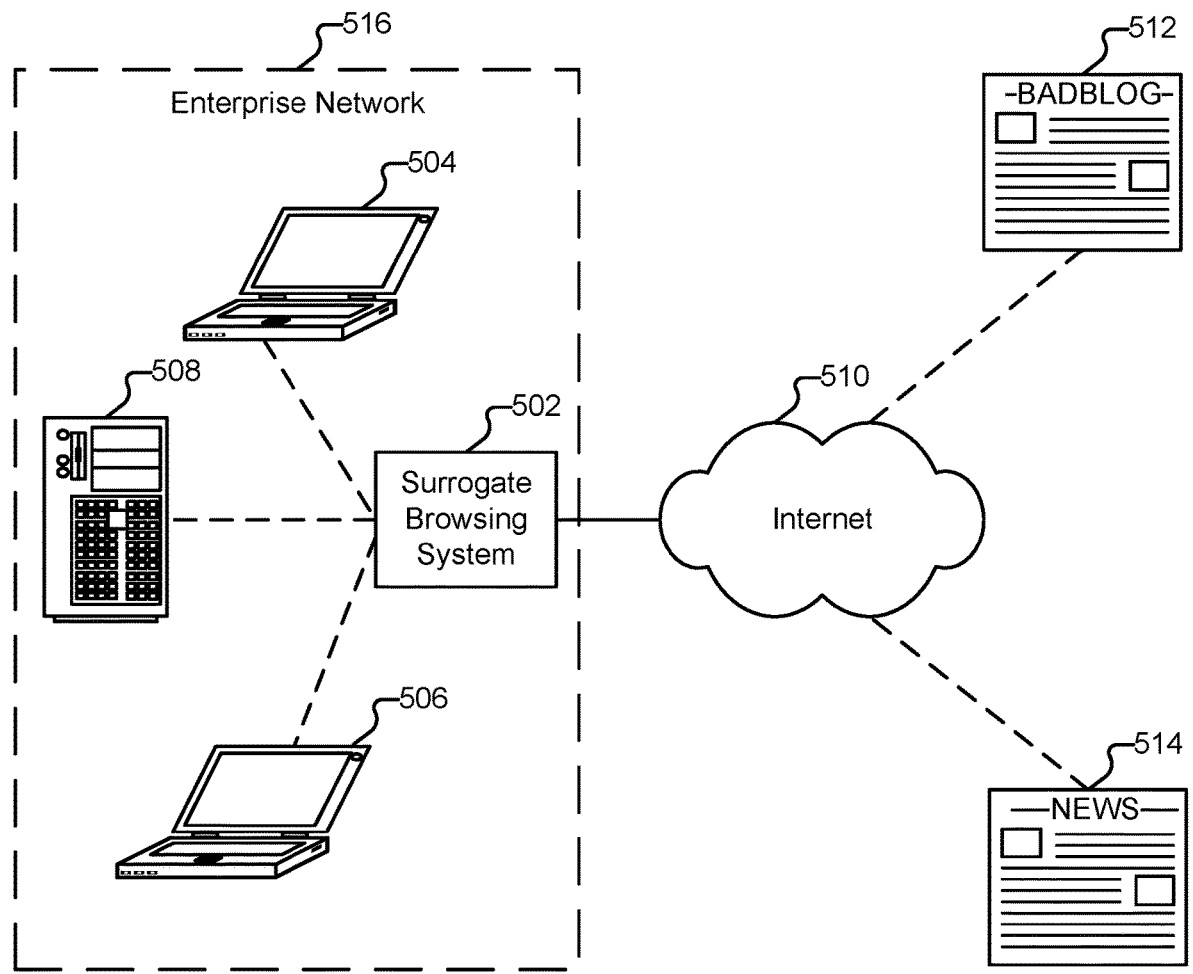
FIG. 5 illustrates an embodiment of a surrogate browsing system.

FIG. 5 illustrates an embodiment of a surrogate browsing system. In the example shown, an enterprise (e.g., the company for which a user, "Charlie," works), has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512 must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

Additional Information—Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification.
Unique_id and frame_id are attributes that maintain
the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

TABLE 2

Example of DOM update sequence. A div element is added to the DOM.
Then, its id attribute is changed. Finally, the element
is removed from the DOM.

DOM_add_element, "div," [["id," "example"], ["class," "mainCSS"]], "123121," "245564576," "12353123," "13443253456"

DOM_modify_attribute, "123121," "id," "changed," "13443253456"

DOM_remove_element, "123121," "13443253456"

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

TABLE 3

Example of unsuccessful attacks. In case a), the checker will not
recognize a new command and classify it as a malicious activity.
In case b), the checker will, using whitelists, observe that the attacker
is trying to inject a script and classify it as an attack.

a) DOM_inject_script, "javascript:do_bad_things( )"
b) DOM_add_element, "script," [["type," "JavaScript"]], "123121," "245564576," "12353123," "13443253456"

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

Example Process Used in Some Embodiments

Figure 6:
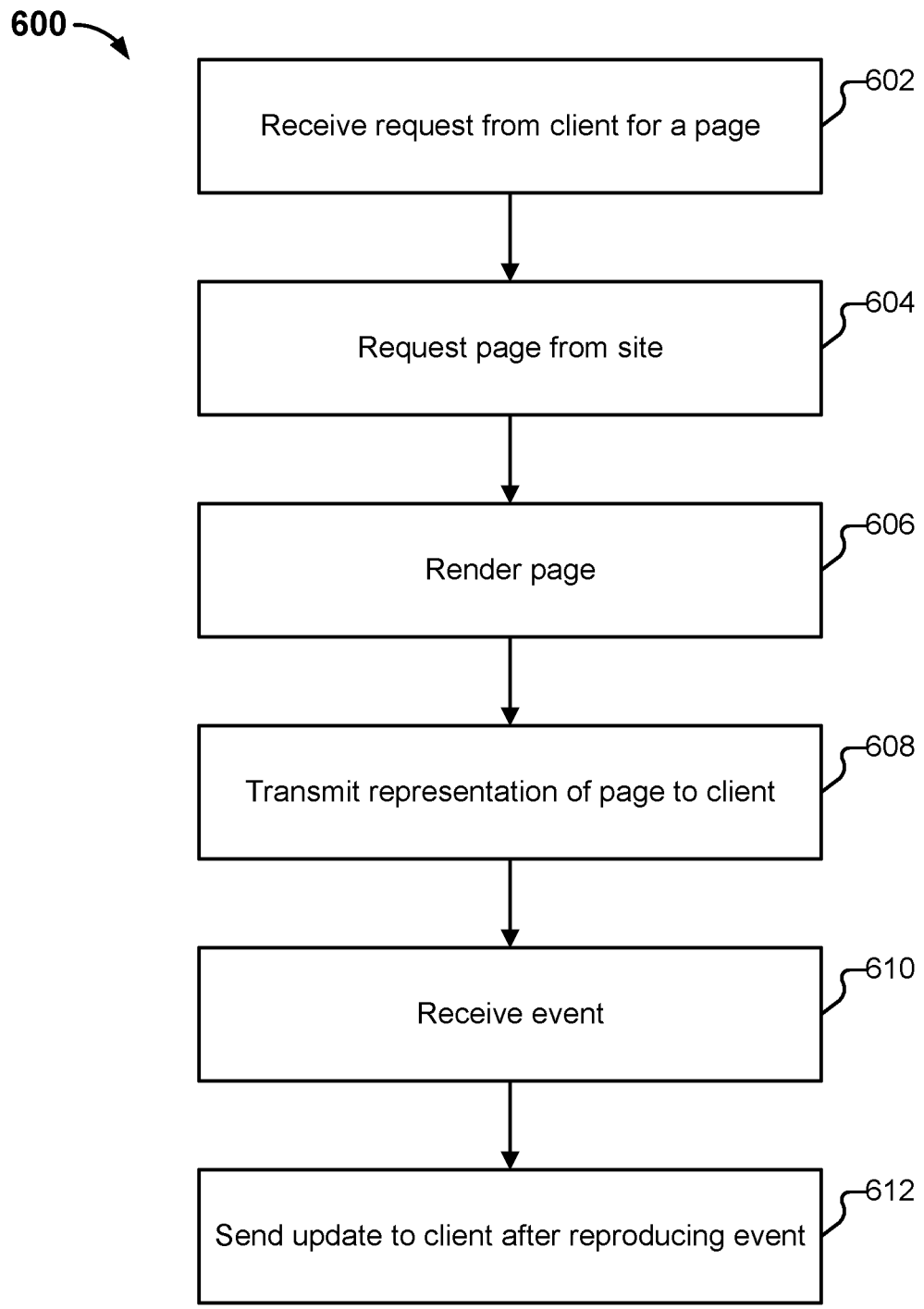
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. Additional Example Environment

Figure 7:
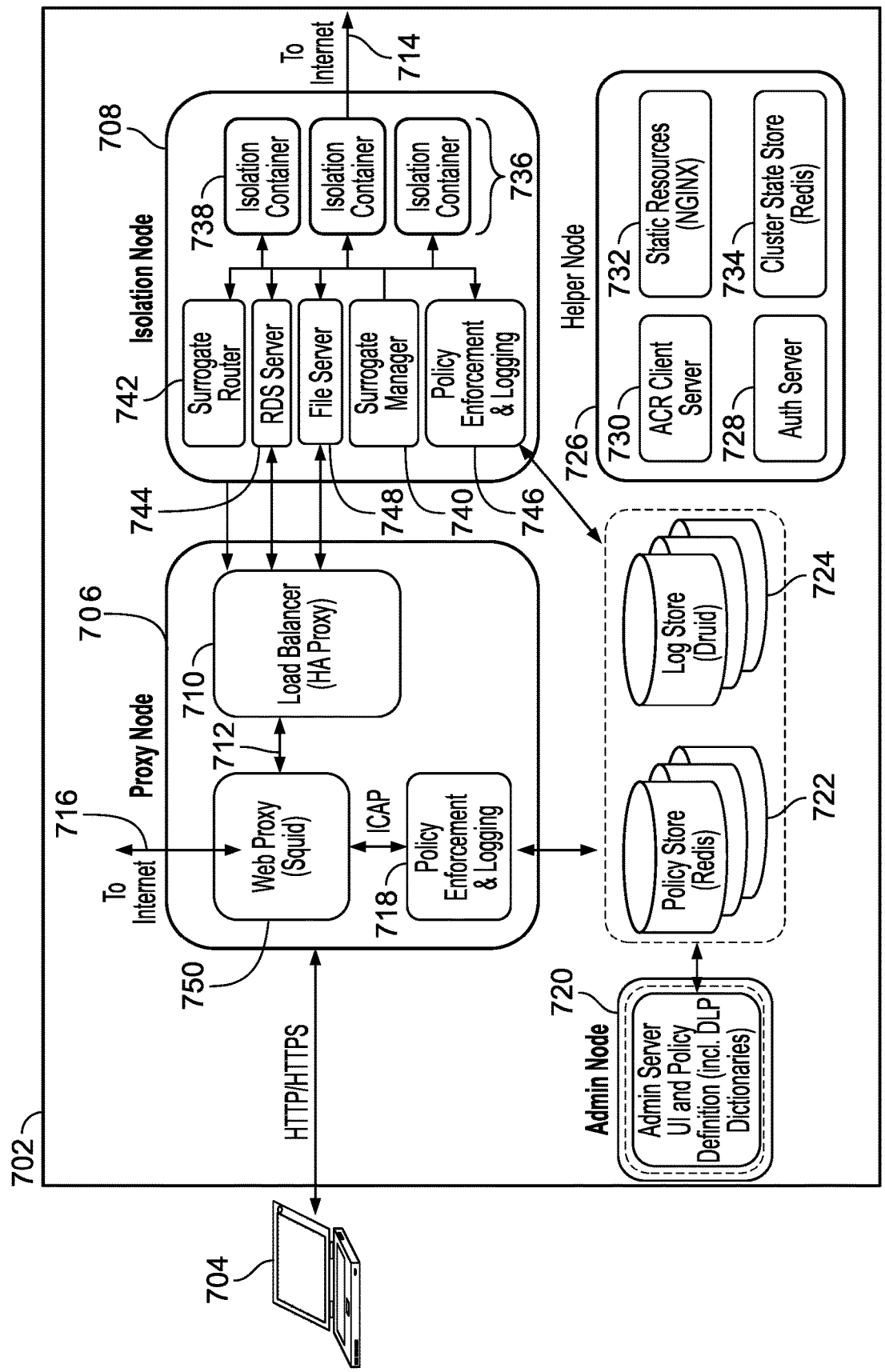
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g. each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes, is configured in a separate AWS Auto Scale group to provide per-cluster elasticity as demand increases and decreases.

Proxy node 706 acts as a gateway to surrogate browsing system 702. Users of surrogate browsing system (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable proxy node 706 can be configured to provide data loss (or leak) prevention (DLP) services to traffic associated with client 704. This can be helpful, e.g., where client 704's traffic exits to the Internet via path 716, rather through isolation node 708. More robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, ACR client server 730 provides a copy of a thin client (stored as a static resource along with other static resources 732 such as company logos, boilerplate text, etc.) to the client browser. Finally, cluster state store 734 is responsible for maintaining/synchronizing external state (e.g., which isolation container 736 is currently assigned to a client).

Although pictured in FIG. 7 as having a isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium browser process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. Pairing and Communication Channels

Figure 8:
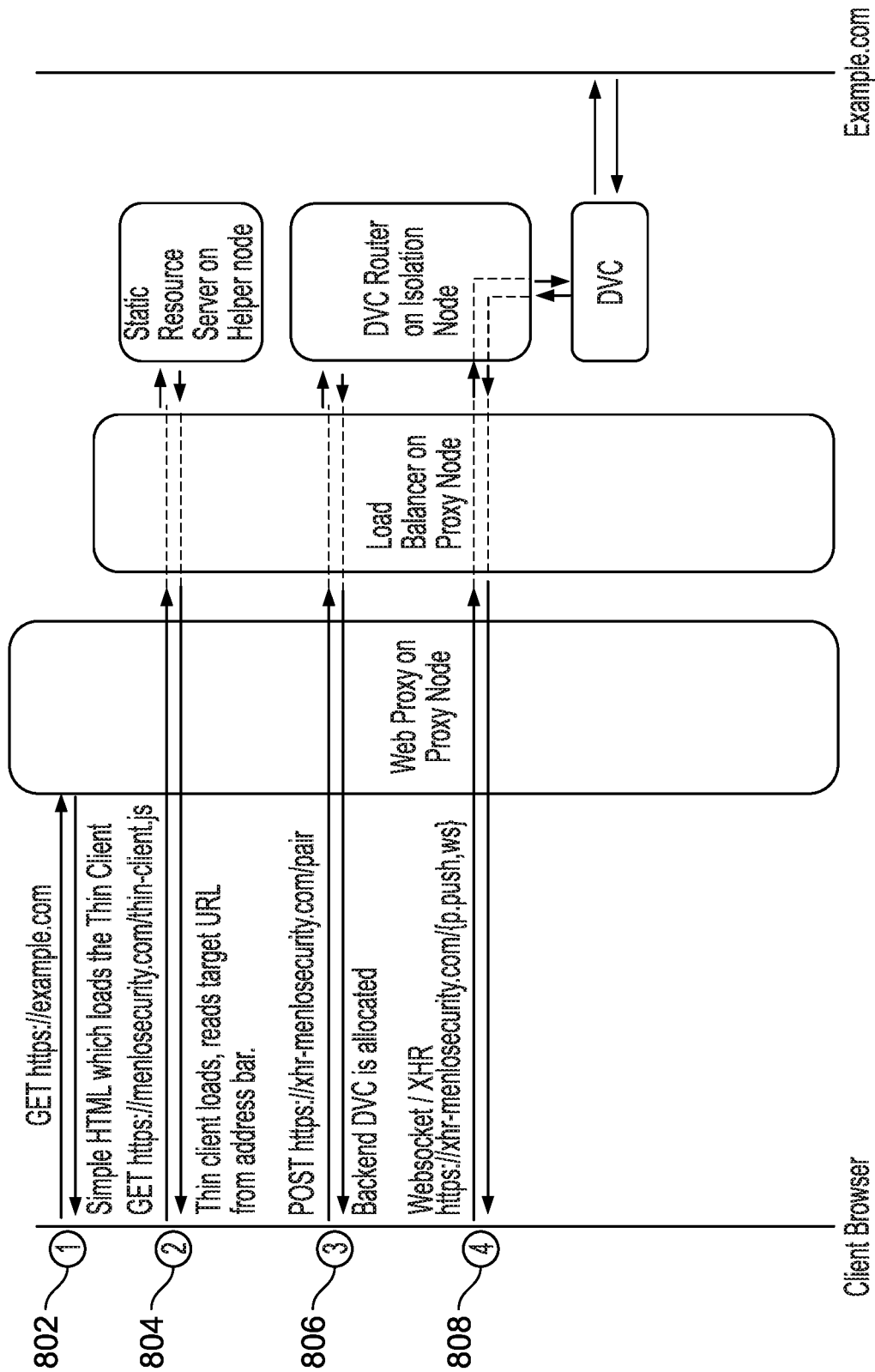
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client." This JavaScript is loaded from helper node 726. It is the same for all visited pages and will be cached by the client browser after the first visit to any site.

Third (806), the thin client JavaScript starts executing in the client browser. The thin client consults the address bar to get the URL of the page the user wants to load and POSTs it to xhr-menlosecurity.com. At this point, a Disposable Virtual Container (DVC), also referred to herein as an isolation container, is allocated for the user, if necessary. The DVC for the user is then instructed to create a tab and navigate it to example.com. The DVC starts loading example.com. At this point, no information from example.com has been sent to the client browser.

Finally (808), a communication channel with the DVC is established and information starts flowing bidirectionally to the client: rendering data flows from the DVC and user input (mouse, keyboard) flows to the DVC. This communication occurs over a websocket if a websocket can be established. Otherwise, communication occurs via multiple XHR requests.

Figure 9:
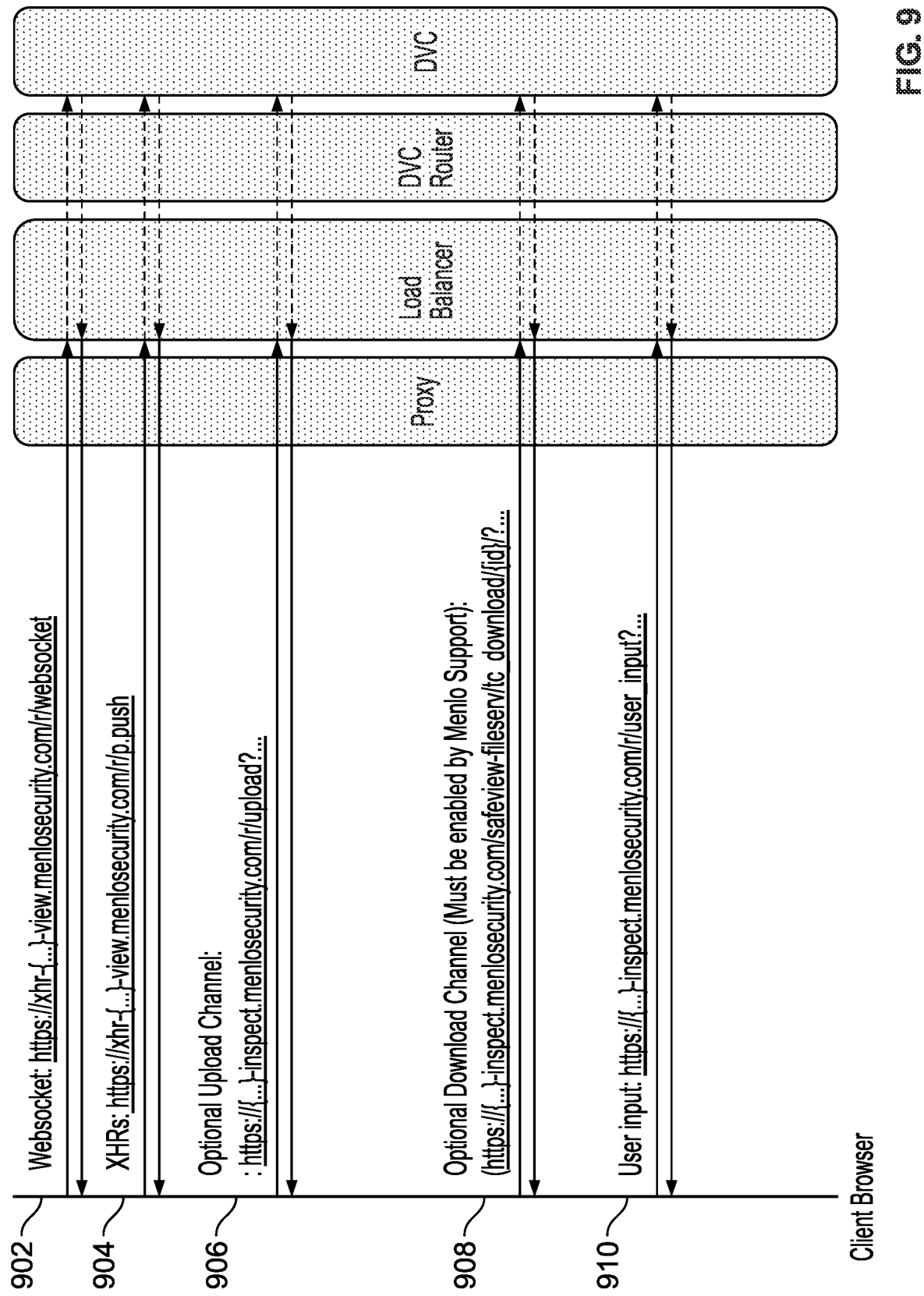
FIG. 9 illustrates different communication channels used in various embodiments.

FIG. 9 illustrates different communication channels used in various embodiments. Channel 902 is used to relay user input (mouse, keyboard) to the DVC. Channel 904 is used to relay rendering information to the client browser. As mentioned above, if possible, a websocket is used. Otherwise, XHRs are used. Channel 906 is a dedicated channel for uploads. The original destination URL (example.com) is a URL parameter (page_url). Channel 908 is a dedicated channel for downloads. The original source of the file (example.com/file.bin) is a URL parameter (file_url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. Adaptive Rastering

Modern browsers decompose pages into a set of layers which collectively comprise a tree of layers. Each layer in the layer tree corresponds to an independent portion of the page and maps to a GPU texture or entity. Browsers (e.g., via a CPU) can draw the contents of each layer independently, and as applicable, the compositing of multiple layers to form a final layer can be performed by a GPU.

Figure 10:
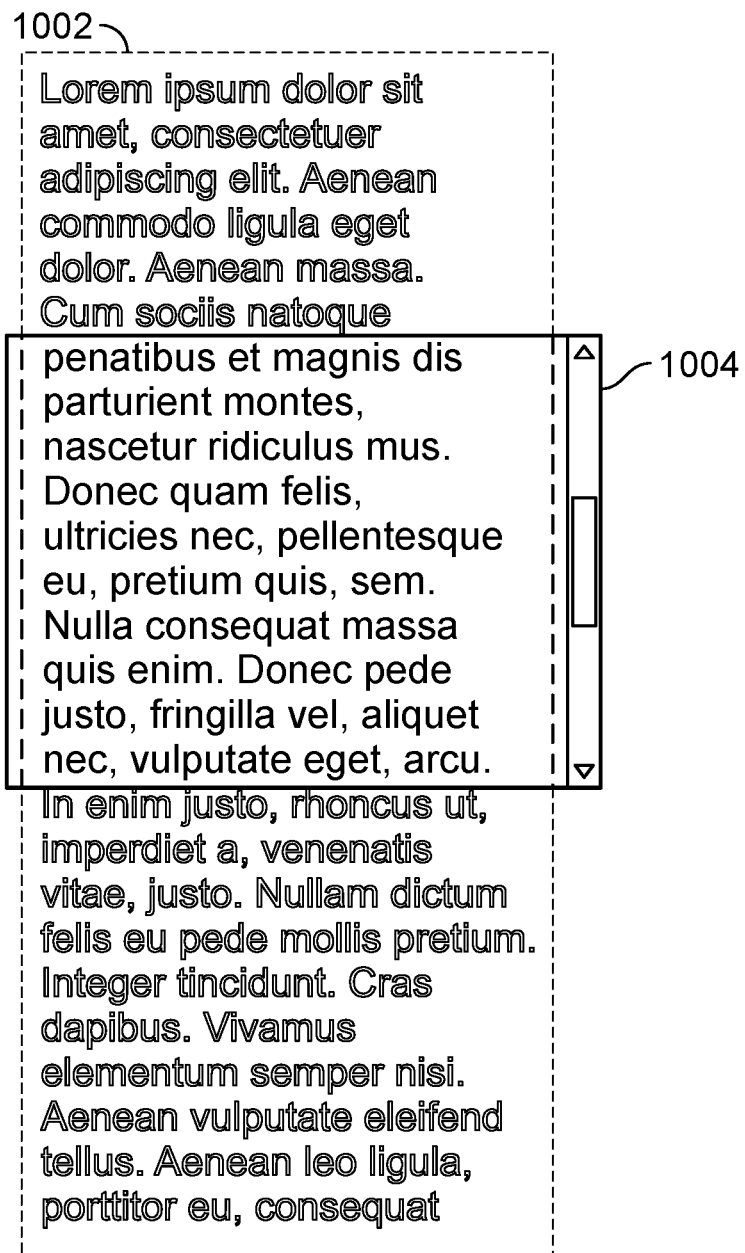
FIG. 10 illustrates a picture layer and a clipping layer.

In various embodiments, instead of or in addition to performing pixel/DOM mirroring techniques (e.g., as described above), system 106 is configured to perform remote compositing techniques in which a given page is decomposed (by system 106) into a set of layers, including content picture layers and clipping layers (whose positions are very accurately specified), and drawing operations within those layers. The content picture layers contain content that should be drawn to the screen (e.g., images, text, or geometric figures such as a square or circle). The clipping layer determines what portion of picture layers should be rendered to the screen and is used, e.g., to support scrolling. As shown in FIG. 10, region 1002 corresponds to a content picture layer, while region 1004 corresponds to a clipping layer (revealing a portion of the content picture layer and allowing a user to scroll up or down to see the remainder of the content).

The layers (e.g., as layer tree information) and corresponding drawing operations are mirrored (over a network connection) to the endpoint JavaScript thin client which then renders the content using the JavaScript API DOM. This approach offers a variety of benefits. As one example, it offers higher fidelity rendering over the DOM mirroring described above, as there is less room for individual interpretation of how to render the content by the end user browser. As another example, it provides for improved security as the entire DOM is not sent (which could include CSS elements, etc.). Instead, a lower level data structure, comprising fewer operations, that has been processed by the surrogate browser's compositor is sent. This results in less room for interpretation on the client side, regardless of which client-side browser (e.g., Safari or Edge) is used. Further, while the drawing operations and layer information provided by system 106 to the client browser are specific, they are not so specific as to preclude endpoint GPU or other applicable optimizations. As an example, if the user chooses to scroll a portion of the rendered content, the local browser can independently move content (including layers) without consulting the backend (e.g., as contrasted with pixel/DOM mirroring). This can be done by the local client browser translating the GPU buffer without having to redraw content within it, resulting in reduced latency and a better user experience. Similar to surrogate-browser independent scrolling, surrogate-browser independent pinch and zoom can also be achieved (as can animated images, CSS animation, and CSS effects) using these techniques. Layers can be scaled and re-rastered at different resolutions by the client browser without consulting the surrogate browser.

Figure 11A:
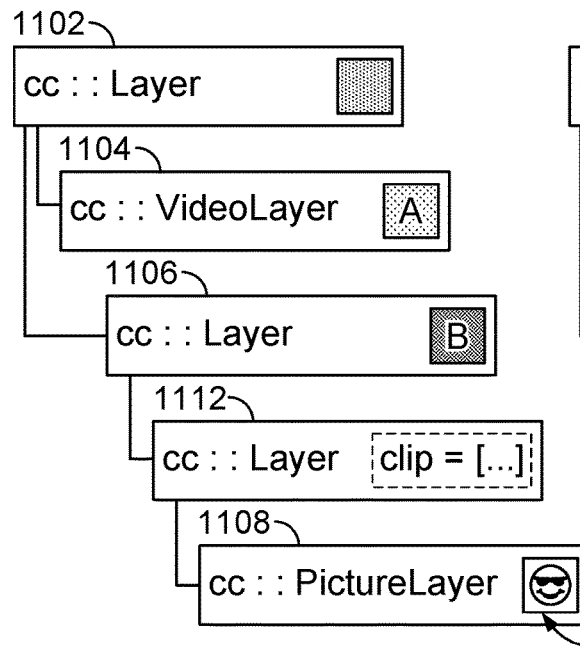
FIG. 11A illustrates an example of a layer tree.
Figure 11B:
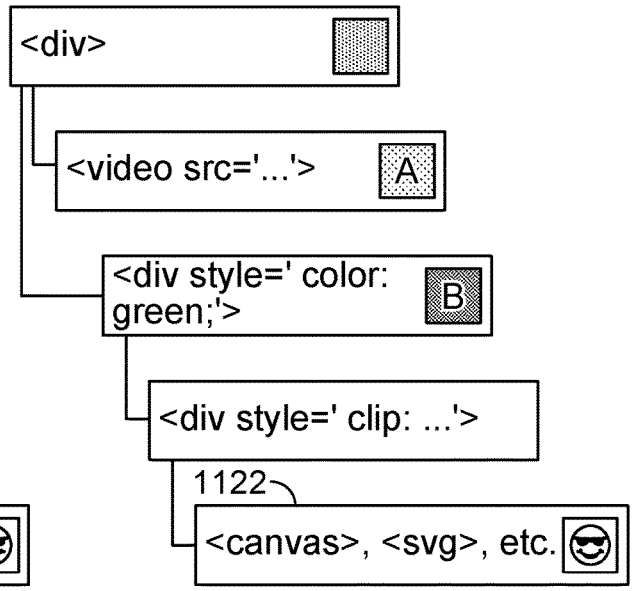
FIG. 11B illustrates an example of a DOM layer tree.
Figure 11C:
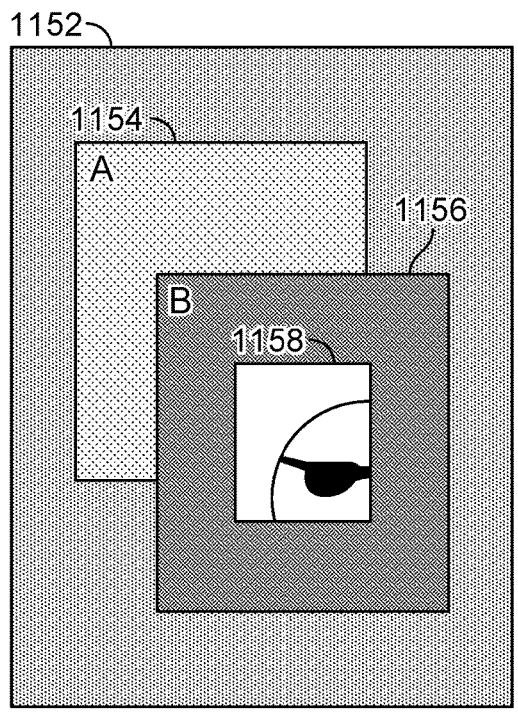
FIG. 11C illustrates an example of a rendered result corresponding to the layer tree of FIG. 11A.

FIG. 11A illustrates an example of a layer tree, and FIG. 11C illustrates an example of a corresponding rendered result as composed in a GPU. System 106 (via an appropriate surrogate browser) periodically produces layer trees (such as is shown in FIG. 11A) and transmits them (as "commits," which also contain associated resources such as display lists) to the corresponding endpoint browser. Example pseudocode relating to building a layer tree is provided below in Section VI (e.g., "buildLayerTree"). JavaScript precludes direct manipulation of the endpoint browser's layer tree state. In order to render the page, in various embodiments, the thin client indirectly recreates the layer tree state via the DOM API ("DOMify"ing the received information). Layer tree DOM corresponding to the layer tree shown in FIG. 11A is depicted in FIG. 11B. The JavaScript thin client provides the layer tree DOM to the endpoint browser which in turn induces the browser to render the content (e.g., via the client's GPU). In various embodiments, drawing is instead/in addition performed using WebGL. Whenever new content loads or whenever the user interacts with the page (e.g., by scrolling), as applicable, the layer tree DOM can be updated by the thin client (e.g., modifying only those layers implicated by the changes while leaving the other layers alone).

Layer 1102 (1152) is a background layer. Layer 1104 (1154) is a video layer. The video layer is playing a video and is updating frequently. Layer 1106 (1156) is a container layer with a background color (e.g., green) that has a picture layer 1108 that includes a display list 1110 and has a clipping layer 1112 (collectively rendered at 1158). For an associated layer, the display list references drawing commands that, when executed, generate the requisite content of that layer. A given display list is comprised of a set of display items. Examples of display items include instructions for drawing polygons, instructions for drawing paths (where text glyphs are paths), instructions for drawing images, etc. In contrast to sending pixels, drawing commands can be executed by the GPU to render content more quickly. All page content can be decomposed into display lists (e.g., by a surrogate browser). Once received at the client end browser, the display lists can be translated (by the JavaScript thin client) into DOM, as a combination of SVG and non-SVG DOM elements. Example pseudocode relating to semantic preserving transformations is provided below in Section VI (e.g., various aspects describing "DOMTile"). Because the client browser is performing DOM-based rendering, technologies such as screen readers can be supported by the client browser (in contrast, e.g., with pixel-mirroring approaches). This approach is also contrasted with Chromium Blimp-based remoting approaches which can send layer trees directly to the GPU and do not need to first be converted into DOM. In an alternate embodiment, instead of translating the entire display list using a single rasterizer (e.g., a DOM-based rasterizer), an appropriate rasterization target can be picked, potentially dynamically, at sub-layer granularity. For instance, the user-visible portion of a layer (a dynamic property that changes as the user scrolls) can be rendered using a Canvas-based rasterizer while the non-user-visible portion can be rendered using a DOM-based rasterizer. This can be helpful because Canvas-based rasterization may have high CPU and (V)RAM costs that preclude its use on the entire display list (e.g., Mobile Safari limits <canvas> allocations to ~200 MB), and DOM-based rasterization is better able to leverage the endpoint browser's native rendering machinery to reduce (V)RAM costs, for example, by offloading the rendering of pixels to the GPU (aka GPU rasterization). In an alternative embodiment, DOM-based rasterization can be used to render all static content in the layer (e.g., text that is drawn just once) while a Canvas-based rasterizer is used to render all dynamic layer content such as high frequency animations or content that corresponds directly to a <canvas> element loaded on the surrogate browser. This can be helpful because translating display lists into DOM may incur high CPU and power costs on some browsers and therefore the Thin Client should minimize such translations. And, certain devices (e.g., mobile devices) may have resource limitations (e.g., a limited amount of memory available for HTML Canvas rendering). Different strategies can be employed by different devices (and for different layers) as applicable. Example pseudocode relating to selecting rasterization targets is provided below in Section VI (e.g., "selectTileType").

Figure 12:
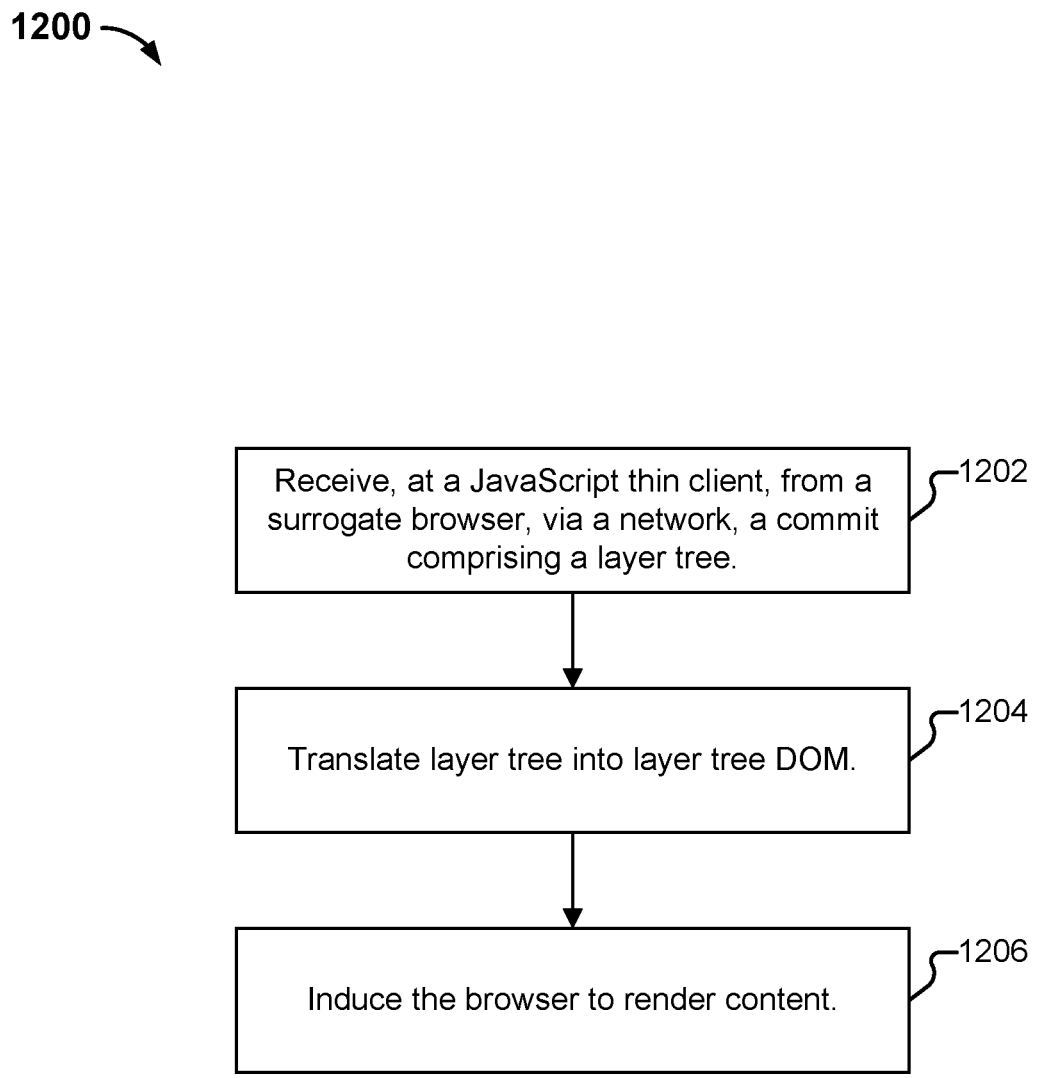
FIG. 12 illustrates an example of a process for displaying content.

FIG. 12 illustrates an embodiment of a process for displaying content. In various embodiments, process 1200 is performed by client device 102. The process begins at 1202 when a JavaScript thin client (e.g., executing on client device 102) receives, from a surrogate browsing system (e.g., surrogate browsing system 106), via a network, a serialized commit comprising a layer tree (and display lists or deltas as applicable). While process 1200 is described as making use of layer trees, other compositing data types can also be used in conjunction with the techniques described herein (e.g., layer lists and/or property trees). At 1204, the JavaScript thin client uses the received commit to generate (or update, as applicable) a DOM layer tree. The JavaScript thin client can translate the display list (using a semantic preserving transformation) into either a semantic DOM element that exposes semantic visibility of the content being drawn (e.g., SVG, or a combination of DIVs and CSS styling applied to those DIVs), or, in an alternate embodiment, the JavaScript thin client can translate the display list into at least one of a plurality of rasterization targets (i.e., selecting at layer granularity (or sub-layer granularity) how translation should be performed). As an example, as shown at 1122, picture layer 1110 can be translated into HTML Canvas, while another picture layer (not shown) can be translated into SVG. Thus, as applicable, different layers can be rendered using different elements (e.g., an HTML Canvas element or non-Canvas element such as SVG or WebGL). One benefit of using SVG when translating the display list is that it exposes the semantics of the item being drawn by the browser. For example, if text is drawn using an SVG <text> element, the client browser understands that text is being drawn (or a rectangle, boundary box, etc.), and screen readers or other applicable accessibility or other technologies can operate on the content (as opposed to content drawn using HTML Canvas which renders a bag of pixels). Finally, at 1206, the client browser is induced to render content (e.g., resulting in the GPU generating a composite layer such as is shown in FIG. 11C).

V. Speculative Rendering

Figure 13:
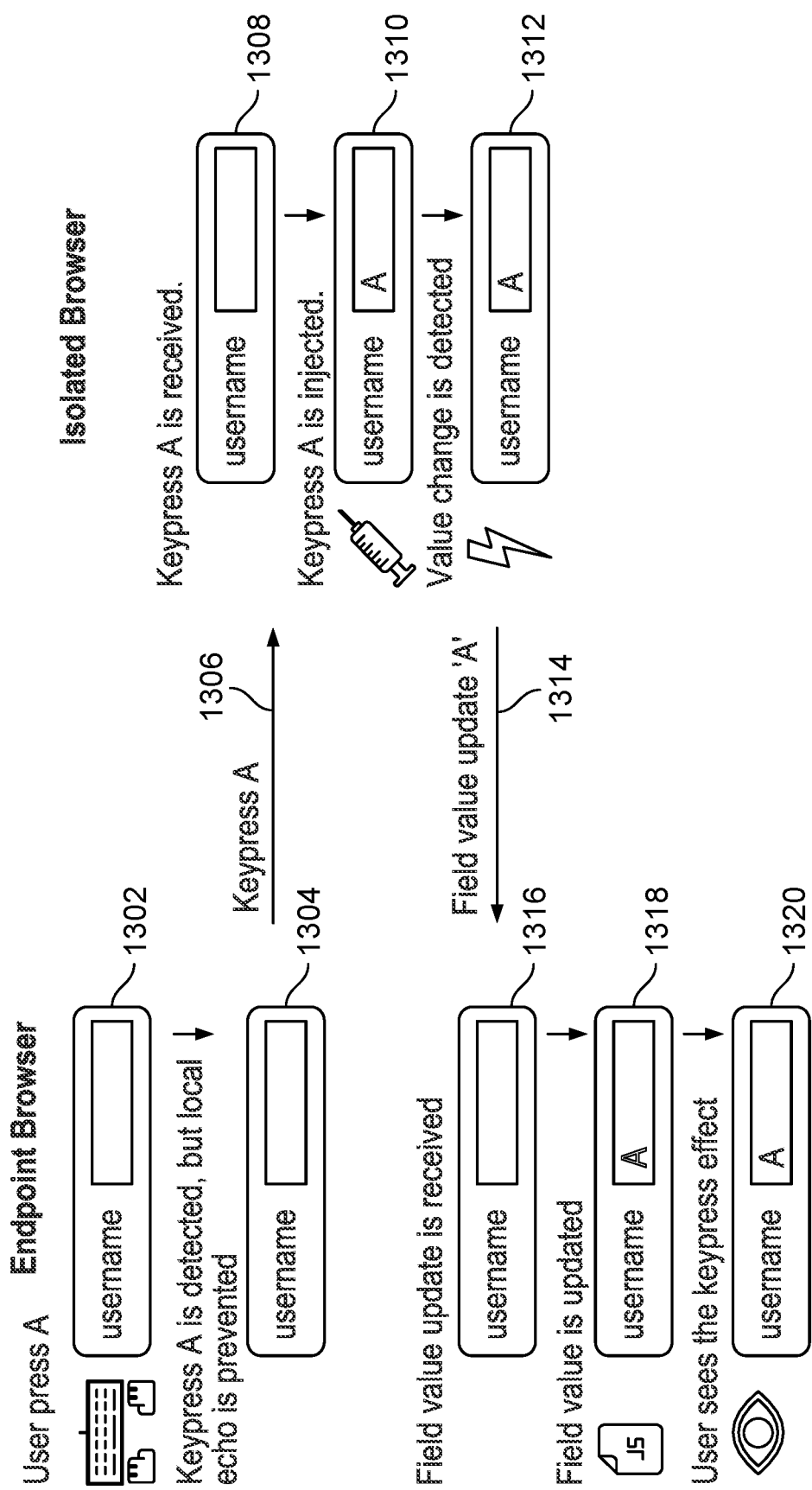
FIG. 13 illustrates a first approach to handling keypresses in a surrogate browsing environment.

FIG. 13 illustrates a first approach to handling keypresses in a surrogate browsing environment (in both DOM rendering and remote compositing surrogate browsing modes). In this example, when a user presses a character ("A") at 1302, the keypress is detected but local echo is prevented by the thin client at 1304. The keypress is sent to the surrogate browser (1306). Once received (1308), it is injected by the surrogate browser into the remote web page (1310) and a value change is detected in the input field (1312). An update is sent to the endpoint browser (1314), and when it is received (1316) the endpoint browser updates the field value (1318) and the user (finally) sees the effect of the keypress effect (1320). Two advantages to the approach illustrated in FIG. 13 are: (a) the value seen by the user is consistent with the value at the surrogate browser, and (b) implementation is straightforward (i.e., no input validation is needed since it is guaranteed to be accurate). Unfortunately, there are a variety of drawbacks to the approach as well. As a first example, the native browser's password manager may fail to trigger (e.g., in Chrome). As a second example, an indicator for visiting an insecure website (http://vs. https://) may fail to display (e.g., in Chrome). As a third example, an indicator of misspelled words (e.g., a squiggly red line) may behave erroneously. As a fourth example, an input field left-right scroll may not work. Finally, as a fifth example, input latency may be noticeable, particularly on a slow network.

Figure 14:
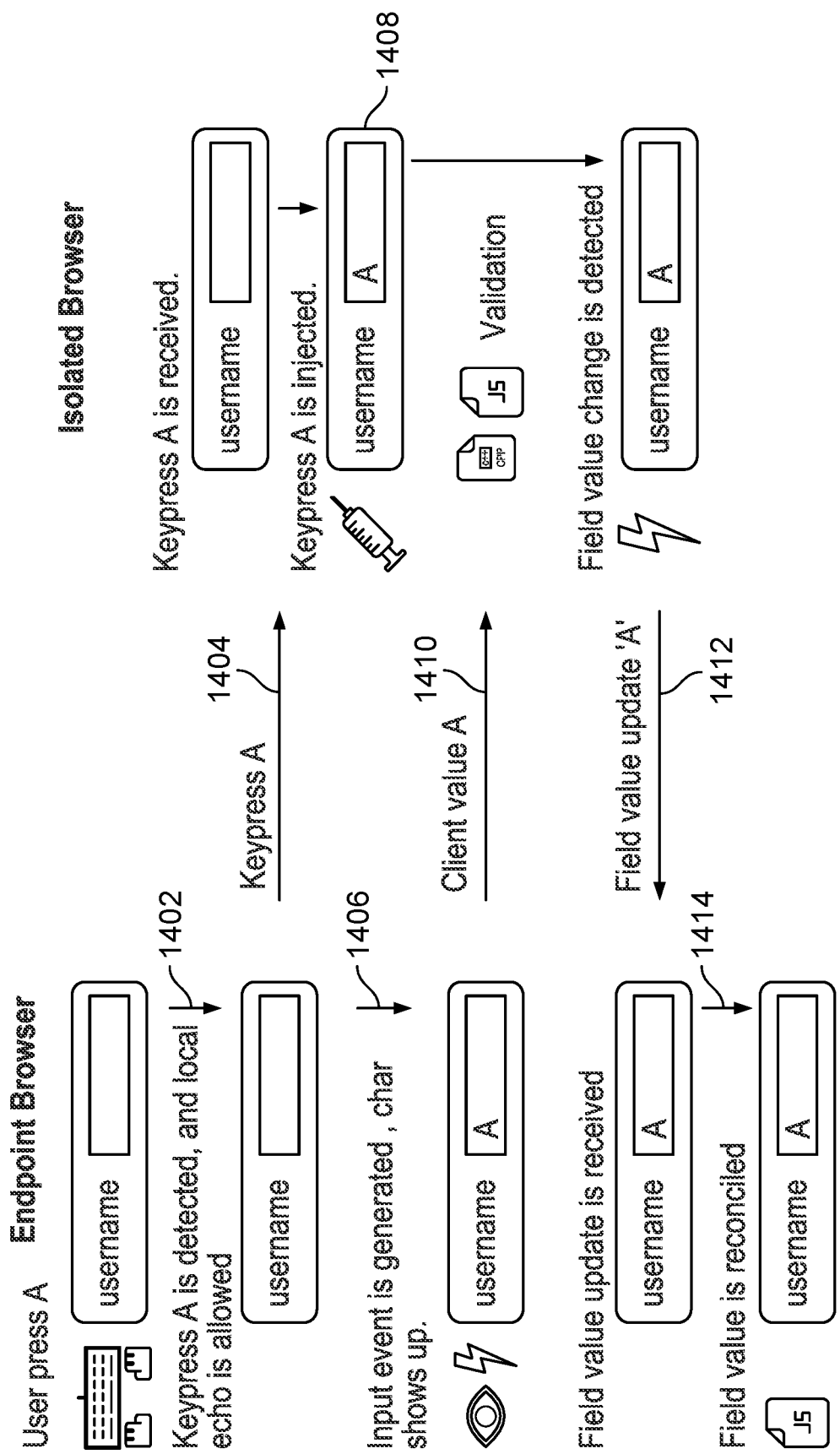
FIG. 14 illustrates an alternate approach to handling keypresses in a surrogate browsing environment.

An alternate approach to handling keypresses in a surrogate browsing environment is depicted in FIG. 14 and is also referred to herein as "speculative rendering." In speculative rendering, the thin client is configured to predict what to draw, entirely at the endpoint browser, and have the endpoint browser render that prediction without waiting for the surrogate browser to provide instructions on what to draw. In some embodiments, the prediction leverages two ideas: prefetching (leveraging contextual metadata that is prefetched ahead of time), and adaptive correction (in the event the prediction is wrong, correcting it based on hints received from the surrogate browser).

In the example of FIG. 14, local echo is provided at the thin client when the user presses a key (1402). As with the workflow shown in FIG. 13, the keypress is sent to the surrogate browser (1404). However, at the same time, the thin client attempts to use client side information to provide a local context for the keypress. In the example of FIG. 14, the thin client will recognize that the keypress is occurring in a typical input field and should cause the letter "A" to be displayed right away, without waiting for the surrogate browser (1406). Meanwhile, the surrogate browser inserts the letter into the web page and also renders it (1408). The thin client informs the surrogate browser that it chose to render the letter A in the input field (1410), and (as with the approach in FIG. 13) is informed by the surrogate browser that, when the surrogate browser injected the keypress into the remote site, the field value updated (1412). The thin client reconciles (1414) its prediction ("render an A") with the information provided by the surrogate browser ("render an A") and determines that no corrective action is needed.

Typically, applications will delegate the rendering and the input to the browser and will not deviate from default behavior, meaning that speculative rendering will typically be correct. From a user's standpoint, the perception will be that the responsiveness of typing during a surrogate browser session is indistinguishable from typing during a native browsing session. In some cases, however, the prediction may not be correct, or speculation should not be used. As a first example, the thin client can use a word list to filter out fields for which speculation should not be used (e.g., a password field which should not echo the character typed to the display).

As a second example, the user might type (and be shown by the thin client) an uppercase A, while the remote website enforces lowercase letters. As a result, the value sent at 1412 will be a lower case "a" which will not match the "A" shown to the user at 1406. At that point, the thin client can correct what is displayed locally to the user to match the state of the surrogate browser after it has interacted with the remote application (i.e., depicting an "a" instead of an "A"). Optionally, the thin client can inform the user that a change was made, or the change can be made without informing the user. For example, in very low latency networks, the user may not perceive anything odd about character changes being made. As another example, for very high latency networks (e.g., with two second roundtrips), the user can be advised that a change has been made to the input field and asked to pay attention/confirm that what is depicted is what they intended to type (e.g., before clicking a submit button). Various examples of such notifications are shown in FIG. 15A (changing the border and background during typing), 15B (providing a popup during submission), 15C (changing the border/background and also providing a popup during submission), and 15D (an alternate submit time warning). Further, once a discrepancy is detected (e.g., the application is changing the default behavior of entered characters), additional speculative rendering by the thin client can be suspended (e.g., for the duration of the user's interactions with the page during a given browser session), instead having the thin client rely on the surrogate browser (e.g., reverting to the "remote echo" approach shown in FIG. 13). A variety of other situations can also trigger a switch from speculative rendering to remote echo. As one example, the website may intercept keypresses and refrain from showing any characters back to the surrogate browser (whether because the website is busy, or for other reasons). If the surrogate browser does not receive any updates from the website within a threshold amount of time, the surrogate browser can instruct the thin client to remove any predicted text it was depicting and to switch to remote echo mode. As another example, if the thin client accumulates a threshold number of keystrokes that are unacknowledged by the surrogate browser (i.e., does not receive a threshold number of field value updates at 1412), the thin client can switch itself to remote echo mode automatically. Certain categories of websites (e.g., airline booking websites) or specific websites (e.g., www.example.com) which are known to try and help users complete fields (e.g., with airport codes) can have speculative rendering automatically disabled at the thin client.

Speculative rendering can also be used to address similar usability/latency issues observed with other input experiences in a surrogate browsing environment. As one example, mouse hover animations (e.g., link or menu item highlighting) are typically performed using CSS, which is rendered locally and in virtual realtime by a native browser. This is not the case, however, for a surrogate browser. One approach to speculative rendering for CSS hover effect elements (such as input buttons or links with highlighting effects) is to prefetch multiple versions of the button/link—one that is the default version that corresponds to a no-hover state (i.e., is not highlighted) and one (also referred to herein as a "hover twin") to the state where the button or link is highlighted. The prefetched items are available ahead of time so that when the user (e.g., Alice) hovers her mouse over the element during a surrogate browsing session, the thin client can perform a local hit test, and attempt to determine what element/object on the screen is being hovered over. Once the object is identified, then the hover twin can be rendered (if that object has a hover twin). Additional information on hover twins and hit testing is provided in Section VI below.

Figure 16:
FIG. 16 illustrates an example of a native copy widget.

Mobile touch actions are another example of where speculative rendering can be used. When a user interacts with a mobile browser, it would be desirable to trigger native widget renders upon touching page objects such as text selection. For example, if a user selects text within a mobile browser, it would be desirable to trigger showing the native copy widget (an example of which is shown at 1602 in FIG. 16), and the selected text should be copied into the native copy-paste buffer of the mobile device. Similarly, when the user taps and holds a link in the mobile context, it is desirable to have the native interface for links be rendered (e.g., which provides options to the user such as the ability to open the link in a new tab). And, when the user taps an input widget in the mobile context, it would be desirable to be able to render the native on-screen keyboard.

A problem with surrogate browsing in a mobile context is that in a naïve implementation, when the user touches such on-screen elements (e.g., touches a piece of text to select it), the naïve implementation would rely on consulting the surrogate browser to determine what is being touched (i.e., a hit test is happening on the surrogate browser in a naïve implementation). By the time the surrogate browser responds to the thin client with information on what was hit, it is likely that context has been lost for the touch and native display of an appropriate widget is no longer possible. In the case of attempting to copy text, the delay has likely resulted in the copy-paste buffer no longer being available, as mobile browsers tend to have a restriction that actions (e.g., accessing the buffer) be taken in the context of the touch which is not possible when the surrogate browser is asynchronously consulted. Similar to the mouse hover scenario described above, pre-fetching can be used to make sure that contextual information is available on the mobile client side and the hit test can be performed locally at the thin client on the endpoint browser within the context of a touch. In particular, in an example embodiment, when the thin client receives a tap event, it initiates a local hit test. It is able to do this because it has access to a display list of all on-screen objects, including the text associated with those objects. The hit test can reveal information such as whether a user is touching a text element and in response, create a shadow element at that location in order to trigger the appropriate native widget. Additional detail is provided below in Section VI.

Figure 17:
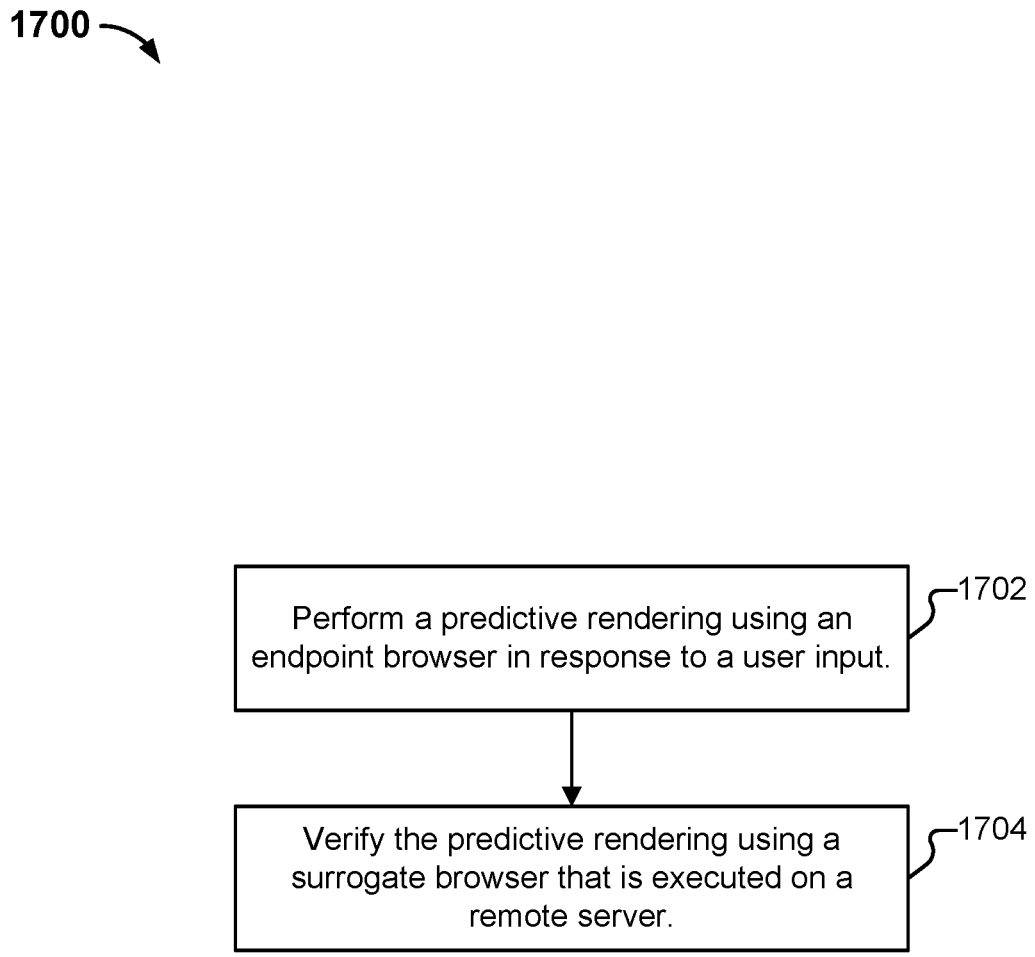
FIG. 17 illustrates an embodiment of a process for performing predictive rendering.

FIG. 17 illustrates an embodiment of a process for performing predictive rendering (also referred to herein as speculative rendering). In various embodiments process 1700 is performed by client device 102. The process begins at 1702 when a predictive rendering using an endpoint browser is performed in response to a user input. As one example, a predictive rendering is performed at 1702 (as illustrated at 1406) when a user presses the letter "A" and the thin client executing on an endpoint browser causes the letter "A" to be rendered to the user. Similar predictive rendering can be performed in response to other kinds of user interactions (e.g., mouse hovers) as described above. At 1704, the predictive rendering is verified using a surrogate browser that is executed on a remote server. An example of such verification according to some embodiments is shown in FIG. 14 where the thin client provides the surrogate browser with its predicted value (1410). An alternate example of such verification according to some embodiments is shown in FIG. 14 where the surrogate browser provides update 1412 and the thin client performs a reconciliation (1414).

VI. Code Examples and Additional Detail

Described herein are embodiments of a Surrogate Browsing (Remote Browser Isolation) system that, for example:

1. Supports Remote Compositing compatible with unmodified WC3-compliant Endpoint Browsers (also referred to as Clientless Remote Browser Isolation)
   a. Endpoint Browsers: IE10+, Firefox, Chrome, Edge, Safari, Android Chrome, Mobile Safari, Opera, etc.
   b. No plugins, extensions, or modifications to Endpoint Browser needed.
   c. Endpoint Browser runs a JavaScript Thin Client that uses nothing beyond standard DOM APIs to render content.
2. Supports Remote Compositing with multiple DisplayList drawing methods
   a. DOM Drawing. The Thin Client optionally transforms DisplayList objects, including text, to a DOM tree that:
      i. allows the Endpoint Browser and third-party programs such as Screen Readers and Extensions to understand and act on the images, text, links, input fields, and other content on the page.
      ii. Allows the Endpoint Browser's native rendering machinery to produce pixel content, thus improving rendering speed and memory utilization.
   b. Canvas 2D/3D drawing. The Thin Client optionally transforms rendering data to Canvas drawing commands, supporting both 2D and 3D (WebGL) drawing.
   c. Adaptive drawing. Thin Client optionally selects the optimal drawing method for the content at hand on a per-tile basis, using custom optimality criteria.
3. Supports contextually-aware data-rate throttling of page content
   a. Subdivides the page into units (Layers for short) and gives bandwidth priority to the most important units as determined by their impact on perceived user experience.
   b. This allows the system to keep within imposed resource limits (bandwidth and endpoint CPU) in a way that avoids degrading the user experience of the entire browsing session.
   c. Employs multiple novel mechanisms for avoiding video playback stalls on throttled video content.
4. Supports speculative local rendering of content in response to user input
   a. Wherein the Thin Client independently predicts the results of user actions and optimistically renders those predicted effects, taking corrective action if needed.
   b. Wherein said optimistic prediction (a) avoids the network latency associated with traditional synchronous mouse and keyboard input response handling, and (b)

allows display of native widgets such as context menus and soft-keyboards in response to user actions (e.g., context-menu click).

Overview: A Remote Compositing Based RBI System

Remote Compositing is a technique for mirroring the visual content generated by one browser (server) onto another browser (endpoint), typically over a network. The core Remote Compositing approach can be extended to support Chromium-to-Any-Browser remoting, where the server is a modified Chromium-based browser and the endpoint can be running any WC3-compliant browser (with no modifications needed). One example use case is Remote Browser Isolation (RBI) for security in which Remote Compositing provides for seamless and secure remoting of browsing sessions to a remote browser in the cloud (Isolated Browser), thus offloading significant portions of attack surface such as HTML/CSS parsing and JavaScript execution onto the server browser.

Remote Compositing is on par with DOM Mirroring with regards to network and rendering efficiency. However, it goes beyond DOM Mirroring in accuracy and security, largely because it mirrors the Layer Tree as opposed to the DOM Tree. The Layer Tree is a low-level rendering data structure that is compact yet semantically rich enough to support GPU accelerated compositing and rasterization on the endpoint. Moreover, the Layer Tree can be translated and rendered using a minimal set of DOM elements that are available in all modern browsers, thus enhancing cross-browser rendering capability while minimizing the degree of exploitative control that malicious pages have on the endpoint browser's DOM.

Described herein are various Remote Compositing techniques that provide for practical and high performance Chromium-to-Any-Browser remoting. The techniques described herein also apply to alternative formulations of Remote Compositing: e.g., a variant that mirrors only Display Lists (drawing operations) produced by the Renderer and reconstructs a Layer Tree on the client.

Figure 18:
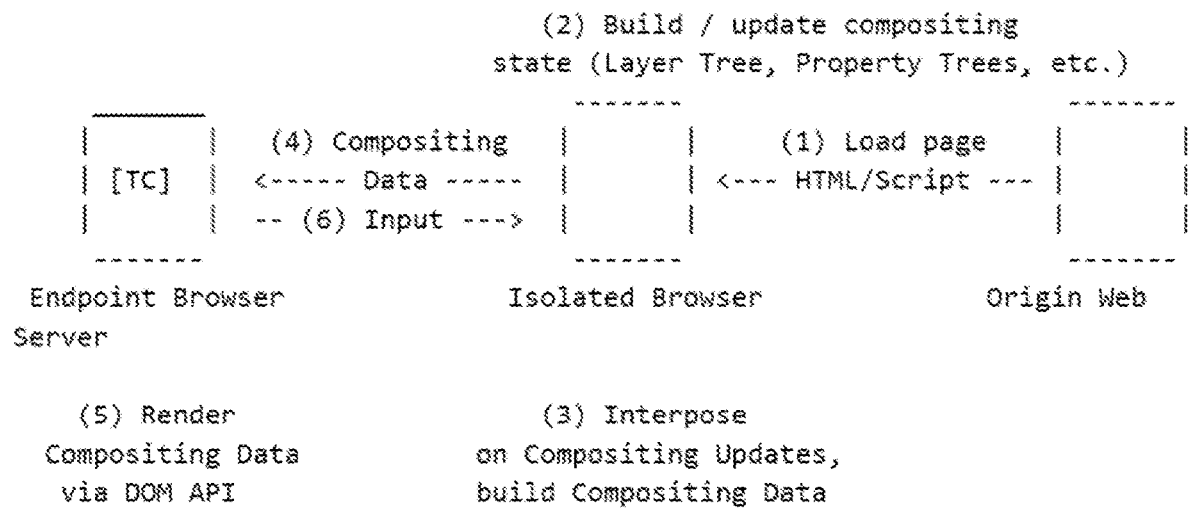
FIG. 18 illustrates an embodiment of a remote compositing based system.

FIG. 18 illustrates an embodiment of a remote compositing system. In the example shown, the surrogate (isolated) browser loads and executes the page on the user's behalf (1), generating Compositing Updates (2) in the process. The system interposes on these Compositing Updates (3) and relays them over a network to a JavaScript Thin-Client (TC) running on the Endpoint Browser (4). The TC transforms Compositing Updates into user-visible pixels (5) using nothing beyond the DOM and scripting capabilities provided by a W3C-compliant Endpoint Browser. The TC also intercepts user inputs (keypresses, mouse & touch actions) made on the Endpoint Browser and relays them to the Isolated Browser (6) to support fully-interactive browsing.

Example Components

Isolated Browser (IB)
  any web browser with a modern rendering pipeline: e.g., Chromium
  loads pages and associated resources (HTML, CSS, JavaScript, Flash) on behalf of user
  executes all active content (e.g., JavaScript, Flash)
  generates Compositing Data (a.k.a., Commits) to be used by the Endpoint Browser;
Compositing Data comprises:
  Layer Tree: a tree of logical Layers, each potentially referencing a Display List; alternative implementations may replace the Layer Tree with the equivalent Layer List and Property Trees combination
  Display List: a recursive list of drawing operations; the Thin Client translates these ops into DOM API calls that ultimately generate on-screen pixels
  potentially runs on a different host (e.g., cloud environment) than Endpoint Browser
Endpoint Browser (EB)
  any W3C-compliant web browser: e.g., Chrome, IE, Firefox, Mobile Safari
  runs on user's device (Desktop or Mobile)
  runs a Thin-Client Compositor (TC)
    a JavaScript web application (hence the name Thin Client) that runs on EB
    loaded via proxy-based redirect or injection when user navigates to a particular site, or via URL prepend: e.g., secure-browsing.com/example.org
    has a bi-directional communication channel with Isolated Browser
    updates its local world-view of what to render by:
    receiving Compositing Data from the IB on the channel
    receiving local user-input actions (e.g., mouse wheel and hover actions)
      independently of the IB, periodically renders its current world-view by:
      (re)drawing individual layers (e.g., to effect image animation)
      repositioning and re-compositing Layers (e.g., to effect scrolling)
      inducing browser to generate pixels for the latest worldview
  uses nothing more than the standard JavaScript/DOM API to render content
  no plugins, no extensions, no custom browser

Example Flow (1) User loads or navigates to a page for Secure Browsing by:
  entering URL that explicitly points to a Secure Browsing Service (e.g., safeview.it/example.com) into the Endpoint Browser's URL Bar
  OR by leveraging an intermediate rewriting proxy to redirect an HTTP request (e.g., via URL rewriting) to the Secure Browsing Service (2) Endpoint Browser receives TC JavaScript from Secure Browsing Service, and executes it (3) TC couples with an Isolated Browser from a pool of Isolated Browsers provided by Secure Browsing Service and instructs Isolated Browser to load the page (4) Isolated Browser loads target page and associated resources from the origin server (example.com)

(5) Isolated Browser generates rendering data by transforming web content (HTML/CSS/JavaScript) to a Layer Tree^ (a.k.a. lifecycle update)

(6) Isolated Browser interposes on Layer Tree generation, serializes it and sends it to the TC in encoded form (e.g., binary encoding)

(7) TC creates a DOM representation from received Layer Tree and activates it, thus inducing Endpoint Browser to render content (8) Go back to step 5 until the user navigates away from the page. Upon navigation, go back to step 4.

Alternate implementations of Remote Compositing exist. The approach remains applicable, e.g., if the endpoint can reconstruct Layers and Display Lists from the information provided. The Display List rendering techniques herein apply even if there is only one Layer for the whole page.

Common Component Specification

The following modules are used by both the Isolated Browser and Endpoint Browser components in various embodiments.

```
module<standard> Common::Compositing {
  # A tree of Layer objects. Encapsulates all visual state of the Isolated
  # Browser. On the Isolated Browser, it is built and updated by the
  # Compositor module. On the Endpoint Browser, it is deserialized and
  # reconstructed by the Thin Client. Rendering the tree, termed
  # "Compositing", is defined as drawing each layer on to an output device
  # in a pre-order traversal of the tree.
  class LayerTree:
    # Reference to the root Layer in the tree.
    prop root: Layer
    # Returns an ordered list of Layers that corresponds to a pre-order
    # traversal of this Layer Tree.
    func preOrderList( ) -> List<Layer>
      traversal = [ ]
      stack = [root]
      while not stack.empty( ):
        layer = stack.pop( )
        traversal.push(layer)
        for child_layer in layer.children.reverse( ):
          stack.push(child_layer)
      return traversal
    func getLayerById(target_id : int) -> (Layer | None)
      for layer in self.preOrderList( ):
        if layer.id == target_id:
          return layer
      return None
  # Encapsulates video player state. This is state typically obtained from
  # Renderer's implementation of HTMLVideoElement.
  class VideoState:
    # A queue of video frame chunks awaiting serialization to the TC.
    typedef Array<uint8> as FrameChunk
    chunks: Array<FrameChunk>
    ## Common video players properties chosen to demonstrate the concept of
    # JavaScript-driven player changes (e.g., volume control). This is not
    # exhaustive
    # True iff sound is muted. This can be altered by JavaScript,
    prop muted: bool
    ## End common video properties
  enum LayerType:
    # Scrolls and/or clips descendant Layers.
    kScrollClipLayer = 0
    # Describes visual content as specified by a DisplayList (recursive list
    # of drawing commands).
    kPictureLayer,
    # A layer dedicated to showing the current frame of a single video.
    kVideoLayer
  # Compositing or blend mode operation to be applied when compositing
  # layer. An implementation will likely support additional blend modes,
  enum BlendMode:
    kSrcOver = 0,
    kDstOver = 1
  class Layer:
    ### Base properties for all layer types
    prop type : LayerType
    # This Layer's unique identifier; always >= 0.
    prop id : int
    # Reference to parent layer, or None if this is the root layer,
    prop parent : (Layer | None)
    # List of child Layers; may be empty,
    prop children : List<Layer>
    # True iff Layer is new or was modified. Set by the Renderer.
    # Supports efficient serialization of layer tree updates for network
    # efficiency.
    prop is_dirty : bool;
    # Layer's bounding rectangle in the Layer's own coordinate space,
    prop bounds : Rect
    # 3D projection matrix that determines how the Layer will be projected
    # on to the Layer's parent; the viewport transformation matrix for a
    # Layer is the concatenation of transform matrices in the
    # Layer's ancestor path.
    prop transform : Matrix3D
    # Blend mode operation to be applied when compositing this layer,
    prop blend_mode : BlendMode
    # The index of this Layer in a pre-order traversal of the LayerTree to which
    # this Layer is attached; this is primarily used to determine if one
    # Layer paints on top of another Layer in order to calculate occlusion.
    prop pre_order_index : int
    # Defined only for PictureLayer.
    prop display_list : (DisplayList | None)
    # Defined only for VideoLayer.
    prop video_state : (VideoState | None)
    # A reference to the corresponding element in the LayerTreeDOM;
    set in
    # the process of building the LayerTreeDOM.
    prop element : (HTMLElement | None)
    # Specific to kPictureLayer types. The rastered output of a picture
    # layer is subdivided into a set of tiles, each of which may raster its
    # portion of the layer's display-list in a different way.
    prop tiling_set : RasterTileMap
    # Returns the RenderFrame that
    func<standard> getRenderFrame( ) -> RenderFrame
}
```

The following are components related to drawing operations.

```
module<standard> Common::Drawing {
  # An example minimal set of drawops to aid in exposition. Richer sets can also be
  # used.
  enum DrawOpType:
    kSave = 0,
    kRestore,
    kClip,
    kDrawPath,
    kDrawText,
    kDrawImage
    kDrawDisplayList
  class DrawOp:
    prop type : DrawOpType
    # The bounds of this draw op in the local coordinate space. Some draw ops, such
    # as kSave/kRestore, do not have any bounds.
    prop bounds : Rect | None
    func DrawOp(_type : DrawOpType) -> None
      type = _type
  class SaveOp inherits DrawOp:
    func SaveOp( ) -> None:
      DrawOp(kSave)
  class RestoreOp inherits DrawOp:
    func RestoreOp( ) -> None:
      DrawOp(kRestore)
  class ClipOp inherits DrawOp:
    prop rect : Rect
    func ClipOp( ) -> None:
      DrawOp(kClip)
  class DrawPathOp inherits DrawOp:
    prop path : Path2D
    func DrawPathOp( ) -> None:
      DrawOp (kDrawPath)
  class DrawTextOp inherits DrawOp:
    # The text to be drawn.
    prop utf8_array : string
    # Position of each glyph on x axis.
    prop pos_array : Array<float>
    func DrawTextOp( ) -> None:
      DrawOp(kDrawText)
```

```
class DrawImageOp inherits DrawOp:
    prop image : Image
    func DrawImageOp( ) -> None:
        DrawOp(kDrawImage)
# Describes a sub-drawing.
class DrawDisplayListOp inherits DrawOp
    prop display_list : DisplayList
    func DrawDisplayListOp( ) -> None:
        DrawOp(kDrawDisplayList)
```

A Display List comprises an ordered sequence of primitive drawing operations: e.g., "draw a rectangle with width w and height h at position x,y", "draw a path beginning at position x,y", and so on. The Display List specification given here is rudimentary in that it supports only a few draw-ops; real-world implementations, such as the open-source Skia drawing library, offer a richer set of draw ops.

The display-list representation offers several benefits:

compact, resolution-independent size suitable for efficient network transfer can be rastered at arbitrary scale while remaining sharp (a hallmark of all vector rendering techniques)

decouples content-to-be-drawn from how-it-is-drawn (i.e., rasterization)

multiple rasterization targets (Canvas, WebGL, DOM, etc.)

can be analyzed to efficiently answer "what will it draw?" questions—useful to achieve Adaptive Rasterization can piggyback DOM and CSS level semantics and properties of element that corresponds to the DisplayList

```
class DisplayList:
    # A list of drawing operations,
    prop draw_ops : List<DrawOp>
    # Returns true iff content drawn within query_rect entirely consists of
    # a single color: e.g., all white or all blue. This is a conservative
    # estimation; more precise implementations are possible.
    func isSolidColor(query_rect: Rect) -> bool
        for op in display_list.draw_ops:
            if op.type == kDrawPath || op.type == kDrawText:
                return false # assume path is non-solid
            else if op.type == kDrawImage:
                return false # assume image is non-solid
            else if op.type == kDrawDisplayList:
                if not op.display_list.analyzeOps(query_rect):
                    return false
        return true
    # Returns the number of draw operations in this display list, including
    # the counts of those in sub-display lists.
    func getOpCount( ) -> int
        count = 0
        for op in display_list.draw_ops:
            if op.type == kDrawDisplayList:
                return count + op.display_list.getOpCount( )
            else:
                count += 1
        return count
}
```

A variety of tile types are possible, each with benefits and drawbacks that depend on the DisplayList (i.e., content) being rastered as well as the browser environment (e.g., does it support GPU accelerated rasterization?). The system dynamically selects the most efficient tile type for the workload and browser at hand. To ease presentation, a few key types are fully-specified:

```
module<NN> EndpointBrowser::ThinClient::Tiling {
    enum TileType:
        # Backed by a DOM tree (tree of DOM elements): this tile type
        can raster
        # arbitrary Display Lists. Example benefits of rastering to DOM
        include: (a) DOM
        # rasterization is heavily optimized in modern browsers (GPU-
accelerated, fast.
        # low RAM usage), and (b) DOM enables the browser,
extensions, and third-party
        # programs to understand what's in the drawing: e.g., text and
        images in
        # particular. This semantic visibility enables browser native
        functionality such
        # as ADA-compliant assistive technologies (e.g., screen-readers),
        dictionary
        # extensions, and password managers to work out-of-the-box.
        However,
        # generating large DOM documents can incur non-trivial overhead,
        thus
        # potentially making this tile choice inappropriate for tiles
        # with lots of objects that change/animate frequently. A fine-
        granularity
        # Display List delta algorithm can be used to avoid re-generating
        the
        # entire DOM tree; only the changed portions of the tree need be
        updated.
        kDOM = 0,
        # Backed by an HTMLCanvasElement with 2D Context; this can
        be fast for
        # animated content but not all browser canvas implementations are
        # efficient, e.g., the Chrome browser is known to consume
        excessive
        # amounts of CPU and/or GPU RAM. The canvas API calls
        themselves incur
        # overhead (due to argument validation) that make it expensive to
        invoke
        # frequently, as would be needed when drawing pages with lots of
        text.
        kCanvas2D,
        # The WebGL type enables direct control of the GPU, bypassing
        the
        # browser's potentially inefficient Canvas implementation.
        However,
        # hardware-accelerated WebGL is not supported in all environments
        (e.g.,
        # VDI environments, older machines without GPU, etc.). More-
over,
        most
        # browsers limit the number of concurrent WebGL context in use.
        Also,
        # WebAssembly, a relatively new capability, may be required
        # to achieve WebGL rasterization's full potential.
        kWebGL
```

The Tile's abstract definition: a rectangular region that is backed by a DOM element.

```
class RasterTile:
    prop element : HTMLElement
    prop rect : Rect
    func RasterTile(_rect : Rect, _element : HTMLElement) -> None
        rect = _rect
        element = _element
        # Position and size the tile at its intended location.
        element.style.left = rect.x( ) + 'px'
        element.style.top = rect.y( ) + 'px'
        element.style.width = rect.width( ) + 'px'
        element.style.height = rect.height( ) + 'px'
    func getElement( ) -> HTMLElement
        return element
```

-continued

```
        # Abstract function that is implemented in derived classes,
        virtual func raster(display_list : DisplayList) -> None
class DOMTile inherits RasterTile:
        # Represents the <div> that backs the entire tile.
        prop tile_root : HTMLDivElement;
        # A place to store SVG objects that will be referenced by <div>
nodes.
        prop svg : HTMLSVGElement;
        # Resource definitions for SVG elements such as clipping paths.
These are placed
        # in the SVG header of |tile_root|.
        prop defs : HTMLSVGDefsElement
        # Used to assign unique IDs to individual definitions,
        prop def_counter : int
        # Points to the current cursor location in the DOM tree.
        # This points to either the root <div> node, or a descendant <div>
        node, prop cursor: HTMLDivElement
        # Stack of save-restore locations. On Save we push the current
cursor
        # location to this stack. On Restore, we pop the top-most cursor
location
        # and move to it.
        clip_stack : List<HTMLDivElement>
        func DOMTile(_rect : Rect) -> None
            RasterTile(_rect, tile_root)
            def_counter = 0
        cursor = tile_root
        # Place all SVG objects at the beginning so that to-be-generated
        elements can
        # reference them.
        svg.appendChild(defs)
        cursor.appendChild(svg)
        # Be sure to draw in the tile's coordinate space, so that
        content at
        # (rect.x( ), rect.y( ) draws on the tile's origin (i.e., 0,0).
        translate(-rect.x( ), -rect.y( ))
```

The following translates all subsequently drawn content by (x, y).

```
        func translate(x : int, y : int) -> None
        div = document.createSVGElement('div')
        div.style.transform = "translate( ' + x + ',' + y + ')"
        cursor.appendChild(div)
        cursor = div
```

The following emits a <div> element to effect the clip identified by |clip_id|, and advances the cursor to it so that subsequently emitted elements are nested within and thus clipped correctly.

```
        func beginClippedContent(clip_id) -> None
        div = document.createElement('div')
        div.style.clipPath = '#clip_' + clip_id
        cursor.appendChild(div)
        cursor = div
```

The following defines a clipping rectangle given by |rect| and returns its ID.

```
        func defineClip(rect : Rect) -> None
        clip_e = document.createSVGElement('clipPath')
        clip_e.id = 'clip_' + def_counter
        rect_e = document.createSVGElement('rect')
        rect.setStyle(rect_e)
        clip_e.appendChild(rect_e)
        defs.appendChild(clip_e)
        def counter += 1
        return clip_e.id
```

-continued

```
        func drawSVGObject(name : string) -> None
            div = document.createElement('div')
            div.style.backgroundImage = name
            cursor.appendChild(div)
        func drawPath(op : DrawPathOp) -> None
            path = document.createSVGElement('path')
            path.id = 'path_' + def_counter
            path.setAttribute('d', op.path.toSVGPath( ))
            defs.appendChild(path)
            def_counter += 1
            drawSVGObject( '#path_' + path.id)
        func drawText(op : DrawTextOp) -> None
            text = document.createSVGElement('text')
            text.id = 'text_' + def_counter
            # Ensure that glyph positioning matches that of IB.
            text.setAttribute( 'x', calcPosAttr(op.pos_array))
            text.textcontent = op.utf8_array
            defs.appendChild(text)
            def_counter += 1
            drawSVGObject('#text_' + text.id)
        func drawImage(op : DrawImageOp) -> None
            image = document.createElement('img')
            image.src = op.image.getURL( )
            cursor.appendChild(image)
        func rasterOneOp(op : DrawOp) -> None
            if op.type == kSave:
                stack.push(cursor)
            else if op.type == kRestore:
                cursor = stack.pop( )
            else if op.type == kClip:
                beginClippedContent(defineClip(op.rect))
            else if op.type == kDrawPath:
                drawPath(op)
            else if op.type == kDrawText:
                drawText(op)
            else if op.type == kDrawImage:
                drawImage(op)
            else if op.type == kDrawDisplayList:
                raster(op.display_list)
```

The following transforms |display_list| into a DOM tree, thus supporting for the browser's native rasterization machinery to transform |display_list| to on-screen pixels.

```
        func raster(display_list : DisplayList) override -> None
            for op in display_list.draw_ops:
                rasterOneOp(op)
class Canvas2DTile inherits RasterTile:
        prop canvas : HTMLCanvasElement
        func Canvas2DTile(_rect: Rect) -> None
            RasterTile(_rect, canvas)
        func rasterOneOp(ctx : 2DCanvasContext, op : DrawOp) -> None
            if op.type == kSave:
                ctx.save( )
            else if op.type == kRestore:
                ctx.restore( )
            else if op.type == kClip:
                ctx.clip(op.rect)
            else if op.type == kDrawPath:
                ctx.drawPath(op.path)
            else if op.type == kDrawImage:
                ctx.drawImage(op.image)
            else if op.type == kDrawDisplayList:
                raster(op.display_list)
```

The following rasters the given DisplayList to this tile's HTMLCanvasElement by executing operations against the backing canvas. The browser will then complete the rasterization to pixels.

```
        func raster(display_list : DisplayList) override -> None
            # Map content at (|rect.x( )|, |rect.y( )|) in the DisplayList to the
            # tile's origin.
            ctx = canvas.getContext('2d')
            ctx.translate(-rect.x( ), -rect.y( ))
            # No need to draw content that lies outside of the tile's area,
            ctx.clip(rect)
            for op in display_list.draw_ops:
                rasterOneOp(ctx, op)
    # A WebGL rasterizer implemented using the CanvasKit open source
    library.
    # The library, based on Skia, abstracts away the details of GL and
    presents a 2D
    # Canvas like interface to the programmer. Internally, the library emits
    GL ops
    # when API calls are made.
    class WebGLTile inherits RasterTile:
        prop canvas : HTMLCanvasElement
        func WebGLTile(_rect: Rect) -> None
            RasterTile(_rect, canvas)
        func raster(display_list : DisplayList) override -> None
            ctx = canvas.getContext('webgl')
            skcanvas = CanvasKit.getSurfaceWithExistingContext(ctx)
            skcanvas.translate(-rect.x( ), -rect.y( ))
            # No need to draw content that lies outside of the tile's area.
            skcanvas.clipRect(rect)
            for op in display_list.draw_ops:
                if op.type == kSave:
                    skcanvas.save( )
                else if op.type == kRestore:
                    skcanvas.restore( )
                else if op.type == kClip:
                    skcanvas.clipRect(op.rect)
                else if op.type == kDrawPath:
                    skcanvas.drawPath(op.path)
                else if op.type == kDrawImage:
                    skcanvas.drawImage(op.image)
                else if op.type == kDrawDisplayList:
                    raster(op.display_list)
    # Uniquely identifies a tile in a tile map.
    class TileKey:
        prop index_x : int # column index
        prop index_y : int # row index
        func TileKey(_ix : int, _iy : int) -> None
            index_x = _ix
            index_y = _iy
        func ix( ) -> int
            return index_x
        func iy( ) -> int
            return index_y
        # Invoked by Map to determine this object's key.
        func getKey( ) -> string
            return string(index_x) + ':' + string(index_y)
```

The following represents a set of dynamically allocated raster tiles where:

a raster tile is created and added to the tiling set at time of draw every raster tile is given a unique identifier (TileKey)

the type of raster tile that is used is dynamically determined; there may be a mix of tile types within a raster tile set here we statically select raster tile size to simplify specification; alternative implementations can use dynamic tile size selection, or can choose a tile size equal to the layer's size, thus effectively disabling tiling; in an alternative implementation, one can employ a heterogeneous tile size scheme in which tiles within the same set have different sizes in order to optimize rasterization for the workload at hand.

```
class RasterTileMap:
    prop size_rect : Rect
    # Maps from tile's row and column position (aka TileKey) to the Tile
    # object itself;
    # initially empty; populated at draw time.
    prop tile_map : Map<TileKey, Tile>
    prop tile_width : int
    prop tile_height : int
    prop container : HTMLDivElement
    RasterTileMap( ) -> None
        container = document.createElement('div')
    func getContainer( ) -> HTMLDivElement
        return container
    func setSize(_width : int, _height : int) -> None
        container.style.width = _width + 'px'
        container.style.height = _height + 'px'
        size_rect = Rect(0, 0, _width, _height)
        # Tile size must not exceed layer's size.
        tile_width = Math.min(1024, _width)
        tile_height = Math.min(256, _height)
    func setVisible(visible : bool) -> None
        container.style.display = visible ? 'block' : 'none'
    func setTransform(mat : Matrix3D) -> None
        container.style.transform = mat.toCSSValue( )
    func setBlendMode(mode : BlendMode) -> None
        container.style.mixBlendMode = mode
    func rectForTileKey(key : TileKey) -> Rect
        return Rect(tile_width * key.ix( ), tile_height * key.iy( ).
            tile_width, tile_height)
    # Portion of function that returns true iff a canvas 2D
    # element of the size |tile_rect| can be successfully allocated.
    # This function may consider, for instance, if enough canvas memory
    # exists to accommodate a tile of size |tile_rect|.
    func<standard> canAllocCanvas2DContext(tile_rect : Rect) -> bool
        ...
    # Portion of function that returns true iff browser is
    # capable of efficiently rendering WebGL content and it is able to
    # allocate a WebGL context of size |tile_rect|.
    #
    # This efficiency check may entail checking for the availability of a
    # hardware GPU and/or WebAssembly support.
    func<standard> isSuitableForWebGL(tile_rect : Rect) -> bool
        ...
    # Returns true iff the draws ops that lie in |tile_rect| region of
    # |display_list| are too complex to render efficiently with SVG (IOW,
    # the ops would result in a very large SVG document).
    #
    # More sophisticated display-list analyses may consider static metrics
    # such as the number and/or complexity of Path2D objects in
    # |display_list|, and/or the dynamic metrics such as the measured cost
    of
    # drawing complex paths on the Endpoint Browser.
    func isComplexDrawing(display_list : DisplayList, tile_rect : Rect) ->
bool
        kComplexDrawingThreshold = 10
        if display_list.isSolidColor(tile_rect):
            return false
        if display_list.getOpCount( ) < kComplexDrawingThreshold:
            return false
        return true
    # SVG is used in certain cases.
    func isSVGRequired( ) -> bool
        if isScreenReaderActive( ):
            # SVG allows the screen reader to understand the text that is
            # being drawn. Canvas and WebGL do not. Upon examining
            the latter
            # element, the screen reader would merely see a bag of pixels,
            return true
        if hasUserMovedMouse( ):
            # User intends to interact with the content, potentially
            # right-clicking to obtain a context-menu. When that happens,
            the
            # context-menu should have the relevant options for the content
            being
            # clicked (e.g., image should have a "Download" or "Open in
            new tab"
            # option).
            return true
```

```
    # Many other examples of where true would be returned exist.
    This is
    # just one.
    return false
```

The following returns the type of tile that should be allocated given a |display_list| and the tile's key. In making its selection, this function considers static properties of the |display_list| and the capabilities of the browser/platform. Alternative implementations also consider dynamic metrics such as tile update frequency (updates per second) and the average recorded time it takes to update the tile using a particular rasterization method. The trade-offs and solution space here are similar to those in other code-generation systems (e.g., just-in-time JavaScript-to-machine-code compilers).

```
func selectTileType(display_list : DisplayList, tile_key : TileKey) ->
TileType
    tile_rect = rectForTileKey(key)
    # Prefer WebGL rasterization over all else since that is generally
    # fastest. As shown by the CanvasKit project, WebGL rasterization
can
    # be very fast especially if combined with WebAssembly.
    if isSuitableForWebGL(tile_rect):
        return kWebGL
    if isSVGRequired(tile_rect):
        return kDOM
    if canAllocCanvas2DContext(tile_rect):
        if isComplexDrawing(display_list, tile_rect):
            return kCanvas2D
    return kDOM
```

The following allocates the tile corresponding to |key|. |display_list| can be used to determine what type of tile is created.

```
func allocTileAt(key : TileKey, display_list : DisplayList) -> RasterTile
    tile_rect = rectForTileKey(key)
```

```
    tile_type = selectTileType(display_list, tile_key)
    if tile_type == kDOM:
        tile = DOMTile(tile_rect)
    elif tile_type == kWebGL:
        tile = WebGLTile(tile_rect)
    else:
        tile = Canvas2DTile(tile_rect)
    return tile
```

The following rasters |display_list| on to the tiles in the set, allocating new tiles if needed. This re-rasters all tiles to simplify specification, but an efficient implementation will re-raster only the tiles that have changed.

```
func raster(display_list : DisplayList) -> None
    start_index_x = floor(size_rect.x( ) / tile_width)
    end_index_x = floor(size_rect.right( ) / tile_width)
    start_index_y = floor (size_rect y( ) / tile_height)
    end_index_y = floor(size_rect.bottom( ) / tile_height)
    # Iterate through all tile indices.
    for ix in xrange(start_index_x, end_index_x + 1):
        for iy in xrange(start_index_y, end_index_y + 1):
            key = TileKey(ix, iy)
            tile = tile_map[key]
            if not tile: # Allocate tile object if not already allocated
                tile = allocTileAt(key)
                tile_map[key] = tile
                container.appendChild(tile.getElement( ))
            # Raster tile's content.
            tile.raster(display_list)
}
```

E. Example Isolated Browser Specification

An example high-level flow is as follows:

(1) Renderer updates internal data structures, accounting for new HTML/CSS content and/or dynamic DOM/CSS modifications (e.g., as induced by JavaScript)

(2) Isolated Browser invokes Compositor to build and/or update Layer Tree based on Renderer state (3) An instrumented/patched Compositor sends a serialization of the updated Layer Tree to the Endpoint Browser (4) Go back to step (1)

```
# The rendering engine used to parse and execute web content such as a HTML,
# CSS, and JavaScript. This could be any third-party engine such as WebKit
# or Blink, open-source or otherwise. In the open-source Chromium browser,
# there are multiple Renderers and Compositors, at least one per browser
# tab. To simplify, an assumption is made that at most one tab is supported
# and that exactly one Renderer and Compositor is assigned to that tab.
module<standard> IsolatedBrowser::Renderer {
    # PaintChunk: information about how to paint the page contents, typically
    # comprising a set of Display Lists. Many representations are possible.
    # E.g., see Chromium Blink's definition of PaintChunk here:
    #
    #
https://chromium.googlesource.com/chromium/src/+/master/third_party/blink/ren
derer/platform/graphics/paint/README.md .
        class PaintChunk
    # The Renderer's representation of a single frame in the page.
        class<standard> RenderFrame:
            # Installs a customized HTTP throttler that is consulted for every
            # request/response issued by this frame.
            func<standard> setNetworkThrottle(throttle : NetworkThrottle | None) ->
None
            # Returns the custom network throttle used by the frame, if any.
            func<standard> getNetworkThrottle( ) -> NetworkThrottle | None
            # Returns true iff the frame is actively playing a video.
            func<standard> isPlayingVideo( ) -> bool
            # Returns the origin of the current URL loaded by this frame: e.g., the
origin of
            # http://example.org/intro.html is http://example.org.
            func<standard> getCurrentOrigin( ) -> string
```

-continued

```
    # Returns a unique identifier for the HTML frame. Useful for script injection.
    func<standard> getId( ) -> int
    ...
    # Given a URL, fetches the page at URL and associated resources, parses the
    # data and begins executing it.
    func load(url : string) -> None
    # Returns the Paintchunks that represent the current visual state of the
    # page, taking into account dynamic modifications to the browser DOM from
    # script execution and resource loads made since the last invocation of
    # this function.
    #
    # Throughout the text, we refer to this as the renderer lifecycle update.
    func updatePageLifecycle( ) -> List<PaintChunk>
}
module<standard> IsolatedBrowser::Compositor {
    ### Compositor periodically invokes the Renderer to update state needed to
    # build the Layer Tree and per-Layer Display Lists in response to page
    # activity (e.g., new HTML/CSS, dynamic DOM modifications made by
    # JavaScript, etc.).
    #
    # The Compositor is modified to interpose (i.e., hook) into Layer Tree
    # update events, upon which we serialize the new tree into a message and
    # send it to the Thin Client.
    # Routines to serializer state into a binary buffer that may then be sent
    # over the network and de-serialized by the TC.
    class<standard> Serializer:
        func serializeVideoState(state : VideoState, buffer : Binarywriter) ->
None
            buffer.writeArray(state.chunks)
            buffer.writeBool(state.muted)
        # Serializes the DisplayList into a binary buffer using a simple
        # encoding. This is a standard routine since variants of it can be found
        # in existing browser implementations (e.g.. Chromium).
        func serializeDisplayList(display_list : DisplayList,
                                  buffer : Binarywriter) -> None
            buffer.writeInt(len(display_list.draw_ops)) # count of display items
            for op in display_list.draw_ops:
                buffer.writeInt(op.type)
                if op.type == kSave:
                    pass # no arguments
                else if op.type == kRestore:
                    pass # no arguments
                else if op.type == kClip:
                    buffer.writeRect(op.rect)
                else if op.type == kDrawPath:
                    buffer.writePath(op.path)
                else if op.type == kDrawText:
                    buffer.writeArray(op.utf_array)
                    buffer.writeArray(op.pos_array)
                else if op.type == kDrawImage:
                    buffer.writeimage(op.Image)
                else if op.type == kDrawDisplayList:
                    serializeDisplayList(op.display_list, buffer)
```

The following serializes |layer| properties in sequence to a binary |buffer|. It avoids serialization of content that has not changed since the previous commit.

```
func serializeLayer(layer : Layer, buffer : Binarywriter) -> None
    buffer.writeInt(layer.id)
    if layer.parent:
        buffer.writeInt(layer.parent.id)
    else:
        buffer.writeInt(-1) # -1 means "no parent"
    if not layer.is_dirty:
        buffer.writeInt(0) # indicate that properties have not changed
        return
    buffer.writeInt(1)
    buffer.writeInt(layer.type)
    buffer.writeRect(layer.bounds)
    buffer.writeMatrix(layer.transform)
    buffer.writeInt(layer.blend_mode)
    buffer.writeInt(layer.pre_order_index)
    if layer.type == kPictureLayer:
        serializeDisplayList(layer.display_list, buffer)
```

-continued

```
    else if layer.type == kVideoLayer:
        serializeVideoState(layer.video_state, buffer)
# Encodes |layer_tree| into a binary |buffer|.
func serializeTree(layer_tree : LayerTree,
                   buffer : Binarywriter) -> None
    # Pre-order traversal guarantees that parent Layers are serialized
    # before children, and that siblings are visited from left to right,
    # both of which enable simple de-serialization.
    for layer in layer_tree.preOrderList( ):
        serializeLayer(layer, buffer)
        layer.is_dirty = false
        if layer.type == kVideoLayer:
            # Reset to avoid sending the chunks again in the next commit.
            layer.video_state.chunks = [ ]
```

Each page has one LayerTreeManager (and hence Layer Tree). In Chromium's Compositor, for instance, this class corresponds to cc::LayerTreeHost. The standard functionality is extended by interposing on Layer Tree build/update completion events for the purpose of commit serialization.

When the Renderer instantiates this class, it provides the ID of the corresponding HTML frame.

```
class<standard> LayerTreeManager(frame_id : int):
    # Periodically updated using info from Renderer.
    prop layer_tree : LayerTree
    # Assigned upon creation; represents bi-directional connection to the
    # Endpoint Browser's Thin Client.
    prop websock : WebSocket
    # Invoked when LayerTreeManager completes layer tree build/update.
    func<NN> onLayerTreeUpdateComplete(layer_tree : LayerTree):
        buffer = BinaryWriter( )
        Serializer( ).serializeTree(layer_tree, buffer)
        websock.sendMessage(buffer.toArray( ))
    # Standard Compositor implementation that builds a |layer_tree| from
    # Paintchunks produced by the Renderer.
    func buildLayerTree(chunks : Paintchunks) -> LayerTree
    # A simple Compositor implementation: periodically query
    Renderer for
    # state updates; if an update is available, build/update the LayerTree
    # using paint information from the Renderer.
    #
    # An alternative implementation is to send PaintChunks directly
    # to the Endpoint Browser and building the LayerTree there.
    func onPeriodicTimer( ) -> None
        chunks = Renderer.updatePageLifecycle( )
        if not chunks:
            return # No updates available
        layer_tree = buildLayerTree(chunks)
        # Hook: invoke serialization routines.
        onLayerTreeUpdateComplete(layer_tree)
}
```

F. Thin Client Specification

Example high level flow:

(1) establishes a connection to the Isolated Browser and listens for messages, (2) upon receiving a message:

(a) decodes it into a Layer Tree, (b) computes a DOM representation of the Layer Tree (LayerTreeDOM), (c) activates the LayerTreeDOM, thus inducing Endpoint Browser to render frame as pixels (3) goes back to step (2)

```
# ThinClient execution begins in this module.
module<NN> EndpointBrowser::ThinClient::Main {
    ### Global state ###
    # Map of video elements in the video container, indexed by owning Layer id.
    # By maintaining references to video elements across tree activation,
    # we ensure that the element state does not reset, thus allowing us to
    # seamlessly reuse the element (i.e., without audio/visual artifacts) in
    # future LTD trees.
    video_elements_by_id = Map<int, HTMLVideoElement>
    # WebSocket communication channel to IB.
    ws = None
    # References the active LayerTreeDOM tree, if any.
    active_ltd_tree = None
    # Detaches |active_ltd_tree| (if any) from the DOM, and attaches
    # |pending_ltd_tree| in the DOM as the new active tree, thus inducing
    # browser to render content.
    func activateLTDTree(pending_ltd_tree) -> None
        if active_ltd_tree:
            active_ltd_tree.parentNode.removeChild(active_ltd_tree)
        document.body.appendChild(pending_ltd_tree)
        active_ltd_tree = pending_ltd_tree
    # Invoked upon receiving a message from Isolated Browser. This routine
    # expects the message to be in binary form, but alternative implementations
    # may use encodings such as JSON.
    func onMessage(message : Array<uint8>) -> None:
        layer_tree = deserializeTree(BinaryReader(message))
        pending_ltd_tree = buildLayerTreeDOM(layer_tree)
        activateLTDTree(pending_ltd_tree)
    # Connects to Isolated Browser via a Cloud Browsing Service, and registers
    # a message reception handler.
    func connectAndListen(recv_fn : Function) -> None:
        ws = WebSocket.open('secure-browsing.com');
        ws.onrecv = recv_fn
    func onInit( ) -> None:
        connectAndListen(onMessage)
    # Ask Browser to invoke |onInit| upon loading the Thin Client JavaScript.
    window.onload = onInit
}
module<NN> EndpointBrowser::ThinClient::Deserializer {
    # Shadow copy of the IB Compositor's LayerTree. This is maintained by applying
    # updates (changes made to the IB-side layer tree) from the IB.
    prop layer_tree : LayerTree( )
    func deserializeVideoState(buffer : BinaryReader) -> VideoState
        state = VideoState( )
        state.chunks = buffer.readArray( )
        state.muted = buffer.readBool( )
        return state
```

```
func deserializeDisplayList(buffer : BinaryReader) -> DisplayList
    dl = DisplayList( )
    item_count = buffer.readInt( )
    for i = 0; i < item_count; i++
        type = buffer.readInt( )
        if type == kSave:
            op = SaveOp( )
        else if type == kRestore:
            op = RestoreOp( )
        else if type == kClip:
            op = ClipOp( )
            op.rect = buffer.readRect( )
        else if type == kDrawPath:
            op = DrawPathOp( )
            op.path = buffer.readPath( )
        else if type == kDrawText:
            op = DrawTextOp( )
            op.utf8_array = buffer.readString( )
            op.pos_array = buffer.readArray( )
        else if type == kDrawImage:
            op = DrawImageOp( )
            op.image = buffer.readImage( )
        else if type == kDrawDisplayList:
            op = DrawDisplayListOp( )
            op.display_list = deserializeDisplayList(buffer)
        dl.draw_ops.append(op)
        return dl
    # Updates the shadow layer tree with the updates in |buffer| and returns the
    # updated shadow layer tree. Accounts for the fact that |buffer| represents the
    # changes made to the IB-side layer tree since the last update. Implementation is
    # straightforward, so details are omitted to avoid verbosity.
    func deserializeTree(buffer : BinaryReader) -> LayerTree
}
```

Remote Compositing is supported for arbitrary endpoint browsers via intermediate translation to DOM. This module implements that functionality.

```
module<NN> EndpointBrowser::ThinClient::LayerTreeToDOMTransformer {
    # Creates backing video element and keeps a reference to it in the global
    # state so that it can be reused in the next frame without having to
    # restore the video playback state in an artifact-free manner.
    func<NN> createAndAttachBackingVideoElementIfNeeded(video_layer : Layer) -> None
        # Reuse existing <video> element to avoid resets.
        video_layer.video_element = video_elements_by_id[video_layer.id]
        if not layer.video_element:
            video_layer.video_element = document.createElement('video')
            video_elements_by_id[video_layer.id] = video_layer
        video_layer.video_element.style.display = 'block'
    # Draws the layer's contents.
    func drawLayer(layer : Layer) -> None
        if layer.type == kScrollClipLayer:
            pass # Do nothing, no content to draw.
        else if layer.type == kPictureLayer:
            layer.tiling_set.raster(display_list)
        else if layer.type == kVideoLayer:
            pass # Browser will draw the frame, no action needed on our part.
    # Styles the |layer| 's element in accordance with the semantics of the
    # |layer| 's properties.
    func applyLayerProperties(layer : Layer) -> None
        if layer.type == kPictureLayer:
            layer.tiling_set.setSize(layer.bounds.width( ), layer.bounds.height( ))
            layer.tiling_set.setVisible(true)
            layer.tiling_set.setTransform(layer.transform)
            layer.tiling_set.setBlendMode(layer.blend_mode)
        else:
            layer.element.style.width = layer.bounds.width( )
            layer.element.style.height = layer.bounds.height( )
            layer.element.style.transform = layer.transform.toCSSValue( )
            layer.element.style.mixBlendMode = layer.blend_mode
        if layer.type == kVideoLayer and layer.state.chunks:
            # Enqueue frame data for eventual playback. We leverage Media Source
            # Extensions (MSE) which enables dynamic construction of a video stream
            # from binary buffers. For browsers without MSE extensions, the video
            # # element's src attribute may be used to fetch the video data from the
```

```
    # IB.
        buffer = SourceBuffer(layer.state.chunks)
        layer.element.appendSourceBuffer(buffer)
    func getElementForLayer(layer : Layer) -> HTMLElement
        if layer.type == kScrollClipLayer:
            element = document.createElement('div')
        else if layer.type == kPictureLayer:
            element = layer.tiling_set.getContainer( )
        else if layer.type == kVideoLayer:
            element = video_elements_by_id[video_layer.id]
        else:
            assert(0) # Unreachable
        return element
    # Given a LayerTree, returns an HTMLDivElement corresponding to the root
    # element of the LayerTreeDOM tree (termed LTD tree). The LTD tree is the
    # DOM representation of LayerTree.
    #
    # Example execution:
    #   * Input: LayerTree
    #        -<ScrollClipLayer>
    #        |--<PictureLayer>
    #        |--<VideoLayer>
    #   * Returns: DOM Tree (LayerTreeDOM)
    #        -<div style='width: 768; height: 1024; overflow: hidden;'>
    #        |--<canvas style='width: 512; height: 512; transform:
matrix3d(...);'>
    #        |--<video style='width: 256; height: 256;'>
    func<NN> buildLayerTreeDOM(layer_tree : LayerTree) -> HTMLDivElement
        ltd_root = None
        for layer in layer_tree.preOrderList( ):
            layer.element = getElementForLayer(layer)
            if not ltd_root:
                ltd_root = layer.element
            # Insert element into the LTD tree in the same position that |layer|
            # occupies in |layer_tree|, thus guaranteeing that Endpoint Browser
            # will preserve the paint order specified by the layer tree.
            layer.parent.element.appendChild(layer.element)
            applyLayerProperties(layer)
            drawLayer(layer)
        return ltd_root
}
```

Example: Rendering Flow of a Single-Layer Page

In this section, we trace the transformation of a single-layer HTML page loaded by the Isolated Browser into user-visible pixels on the Endpoint Browser. An example page is as follows:

```
<!DOCTYPE html>
<html>
 <body>
  <div id='banner' style=' position: absolute; ' >Hello</div>
  <script>
   <!-- Animation: move the text after 1 second. -->
   setTimeout(function( ) {
      van banner = document.getElementById('banner');
      banner.style.top = '300px';
   }, 1000);
  </script>
 </body>
</html>
```

The above is a simple animated page hosted via an HTTP server running at the imaginary domain example.com. It draws the text "Hello" to the top-left corner of the page, and then moves the text 300 pixels down one second later. In the Chromium 80 web browser, this page comprises one composited layer, and is expected to produce at least two Commits: the first for the initial page rendering, and another Commit for the post-animation rendering.

High Level End-to-End Flow (1) User loads or navigates to the example page for Secure Browsing by:

entering URL that explicitly points to a Secure Browsing Service (e.g., safeview.it/example.com) into the Endpoint Browser's URL Bar (2) Endpoint Browser receives TC JavaScript from Secure Browsing Service, and executes it (3) TC couples with an Isolated Browser from a pool of Isolated Browsers provided by Secure Browsing Service and instructs Isolated Browser to load the page (4) Isolated Browser loads target page and associated resources from the origin server (example.com)

(5) Isolated Browser generates rendering data by transforming web content (HTML/CSS/JavaScript) to a Layer Tree (a.k.a, lifecycle update)

(6) Isolated Browser interposes on Layer Tree generation, serializes it, and sends it to the TC in encoded form (e.g., binary encoding)

(7) TC creates a DOM representation from received Layer Tree and activates it, thus inducing Endpoint Browser to render content (8) Go back to step 5 until the user navigates away from the page. Upon navigation, go back to step 4.

Render Updates (Steps 5 & 6 of End-to-End Flow)

Upon loading the page, IB generates and transmits to the TC a sequence of Layer Trees, where the first tree, T_{0}, is:

```
* Root
    o Layer A (banner)
        - Display List A
``` where Display List A comprises the following draw-ops:

1. DrawRect(0, 0, 1024, 768, kWhite) // draws a white background
2. DrawPath(0, 0, txtPath, kBlack) // draws "Hello" in black at position (0,0)

where |txtPath| references a Path2D object that contains instructions for drawing the glyphs in "Hello".

$T\_\{1\}$ is:
```
* Root
    o Layer A (banner)
        - Display List A'
``` where Display List A' comprises the following draw-ops:

1. DrawRect(0, 0, 1024, 768, kWhite) // draws a white background
2. DrawPath(0, 300, txtPath, kBlack) // draws "Hello" in black at position (0,300)

The two updates differ only in that Display List A' draws text at y position 300 instead of 0.

TC-Side Rendering (Step 7 of End-to-End Flow)

To render the page into user-visible pixels, the TC builds two LayerTreeDOM structures—each corresponding to the two Layer Trees—and installs them in the EB's DOM in succession to render the page (and animation effect), as follows:

1. TC builds LayerTreeDOM_{0} from T_{0} as follows, and then installs it the EB's DOM, thus generating user-visible pixels:
    (a) Allocates a single container div for Layer A, subdivides the region into 3 equal sized tiles, as follows:
    ```
    -------
    |     | <-- Tile 0,1 [1024x256]
    |     | <-- Tile 0,2 [1024x256]
    |     | <-- Tile 0,3 [1024x256]
    -------
    ```
    and creates the initial RasterTileMap for Layer A:
    0,1 -> None
    0,2 -> None
    0,3 -> None
    where K -> None denotes that a tile with key K does not yet have a RasterTile allocated for it.
    The user still sees a blank page at this point.
    (b) For each tile key K in the RasterTileMap, TC allocates a RasterTile for K, attaches it to the LayerTree DOM, and draws to it.
    (i) After drawing the first tile, the resulting RasterTileMap is:
        0,1 -> Canvas2DTile
        0,2 -> None
        0,3 -> None
    and the user would the following (approximately) on their screen:
    ```
    -------
    |Hello| <-- Tile 0,1 (drawn, text)
    |     | <-- Tile 0,2 (not yet drawn)
    |     | <-- Tile 0,3 (not yet drawn)
    -------
    ```
    A Canvas2DTile was selected to raster Tile 1 because a query of draw-ops for that portion of Display List A indicated that the tile is complex due to the presence of text in that region (see isComplexDrawing( )).
    (ii) After drawing the second tile, the resulting RasterTileMap is:
        0,1 -> Canvas2DTile
        0,2 -> DOMTile
        0,3 -> None
    and the user sees the following on their screen:
    ```
    ------
    |Hello| <-- Tile 0,1 (drawn, text)
    |     | <-- Tile 0,2 (drawn, all white)
    |     | <-- Tile 0,3 (not yet drawn)
    ------
    ```
    A DOMTile was selected to raster Tile 2 because that region was comprises a few draw-ops, and thus was considered simple enough for SVG rasterization.
    (iii) After drawing the third tile, the resulting RasterTileMap is:
        0,1 -> Canvas2DTile
        0,2 -> DOMTile
        0,3 -> DOMTile
    and the user sees the following on their screen:
    ```
    ------
    |Hello| <-- Tile 0,1 (drawn, text)
    |     | <-- Tile 0,2 (drawn, all white)
    |     | <-- Tile 0,3 (drawn, all white)
    ------
    ```
    A DOMTile was selected for Tile 3 for the same reason given in (ii).

-continued

```
2. Upon receiving Layer Tree T_{1}, TC transforms it into LayerTreeDOM_{1} as
follows,
    and then installs it in the EB's DOM:
    (a) Allocates a single container div for Layer A, subdivides the region
        into 3 equal sized tiles, as follows:
            ------
            |     | <-- Tile 0,1 [1024x256]
            |     | <-- Tile 0,2 [1024x256]
            |     | <-- Tile 0,3 [1024x256]
            ------
        and creates the initial RasterTileMap for Layer A:
            0,1 -> None
            0,2 -> None
            0,3 -> None
        where K -> None denotes that a tile with key K does not yet have a
        RasterTile allocated for it. The user would see a blank page at this
        point.
    (b) For each tile key K in the RasterTileMap, TC allocates a RasterTile
        for K, attaches it to the LayerTreeDOM, and draws to it.
        (i) After drawing the first tile, the resulting RasterTileMap is:
            0,1 -> DOMTile
            0,2 -> None
            0,3 -> None
        and the user sees the following on their screen:
            ------
            |     | <-- Tile 0,1 (drawn, all white)
            |     | <-- Tile 0,2 (not yet drawn)
            |     | <-- Tile 0,3 (not yet drawn)
            ------
        A DOMTile was selected to raster Tile 1 because that region has few
        draw-ops, and thus was considered simple enough for DOM rasterization.
        (ii) After drawing the second tile, the resulting RasterTileMap is:
            0,1 -> DOMTile
            0,2 -> Canvas2DTile
            0,3 -> None
        and the user sees the following on their screen:
            ------
            |     | <-- Tile 0,1 (drawn, all white)
            |Hello| <-- Tile 0,2 (drawn, text)
            |     | <-- Tile 0,3 (not yet drawn)
            ------
        A Canvas2DTile was selected to raster Tile 2 because a query of draw-
        ops for that portion of the Layer A's Display List indicated that the tile is
        complex due to the presence of text paths ("hello").
        (iii) After drawing the third tile, the resulting RasterTileMap is:
            0,1 -> DOMTile
            0,2 -> Canvas2DTile
            0,3 -> DOMTile
        and the user sees the following on their screen:
            ------
            |     | <-- Tile 0,1 (drawn, all white)
            |Hello| <-- Tile 0,2 (drawn, text)
            |     | <-- Tile 0,3 (drawn, all white)
        A DOMTile was selected for Tile 3 for the same reason given in (i).
        Of note here is that tile types can change during execution in
        response to changes in display list content.
```

Example Benchmarks

Here are given performance benchmarks with static and dynamic tile selection for this single-layer example page. To collect results, a Chromium 80 web browser (EB) is configured with a lone 1400×900 tab running on a 2018 MacBook Pro with High-DPI (DSF 2.0) display via the IB. Three trials are taken, each time starting over with a fresh tab. Statistics are from Chromium's Task Manager.

Using static tile selection with all tiles of type Canvas2DTile, the EB consumes 38 MB of main system RAM and 58 MB of VRAM. The cumulative time spent rendering frames was 19 milliseconds (ms). With dynamic tile selection, the EB consumes 32 MB of main system RAM and 8 MB of VRAM, spending a cumulative 8 ms on rendering frames.

Dynamic tile selection is substantially more efficient in GPU RAM and CPU utilization because it allocates only one Canvas2DTile for this page. The other tiles are DOMTiles due to the fact that the vast majority of the page uses simple draw ops. DOMTiles are efficiently rendered by the browser's optimized native GPU rasterization machinery, thus avoiding the CPU and VRAM overhead of CPU rasterization.

Example: Rendering Flow of a Multi-Layer Page

In this section, an example multi-layer HTML page is transformed into user-visible pixels on the Endpoint Browser. The example page is as follows:

```
<!DOCTYPE html>
<html>
  <body>
    <div id='banner' style=' position: absolute; ' >Hello</div>
    <div id='ad' style=' position: fixed; right: 100px; width: 100px; height: 100px;'>
      <image src='animated.gif'/>
    </div>
    <script>
      var ad = document.getElementById('ad');
      <!-- Display a link to purchase product after 1 second. -->
      setTimeout(function ( ) {
        ad.innerHTML = "<a href= ' buy. html ' >Buy now to get a discount!</a>";
      }, 1000);
    </script>
  </body>
</html>
```

The page is similar to the single-layer page, but overlays a transparent fixed-positioned advertisement in the upper-left corner of the page on top of the page's main content ("Hello"), as is typical of many real-world sites. The advertisement, by virtue of being fixed-positioned, gets its own layer, and comprises a looping animated image meant to grab the user's attention. This page is expected to generate a multitude of frame updates, one for each update of the animated image.

High Level End-to-End Flow

This is the same as the single-layer example.

Rendering Updates (Steps 5 & 6 of End-to-End Flow)

Upon loading the example page, IB generates and transmits to the TC a sequence of n Layer Trees:

$T\_\{0\}, T\_\{1\}, \ldots, T\_\{n-1\}$ where the precise value of n depends on how long the page is left open; but for our purposes, we assume that n>2. In that update sequence, Layer Tree $T\_\{i\}$ is defined as:

* Root
  o Layer A (banner)
    - Display List A
  o Layer B (ad)
    - Display List B_{i}
For i < n - 1, Display List B_{i} is defined as:
  1. DrawImage(0, 0, frame_data_{j})
Display List B_{n-1} (the final one) is defined as:
  1. DrawImage(0, 0, f rame_data_{j})
  2. DrawPath(0, 0, parPath) // draws a paragraph of text ("Buy...")
In the above, frame_data_{j} corresponds to the pixel data (bitmap) of the j-th frame (where j is i modulo n) of the animated GIF referenced by the page.

TC-Side Rendering (Step 7 of End-to-End Flow)

To render the page into user-visible pixels, the TC transforms each $T\_\{i\}$ in the sequence into the corresponding LayerTreeDOM {i} structure and installs it in the EB's DOM in sequence order. Since $T\_\{i\}$ for i<n−1 are similar, it suffices to examine the processing of $T\_\{0\}$ and $T\_\{n-1\}$ in detail.

1. TC builds LayerTreeDOM_{0} from T_{0} as follows, and then install it in the EB's DOM.
   (a) Allocates a single container div for Layer A, subdivides the region into 3 equal sized tiles, as follows:

```
   -------
   |    | <-- Tile 0,1 [1024x256]
   |    | <-- Tile 0,2 [1024x256]
   |    | <-- Tile 0,3 [1024x256]
   -------
   ``` and creates the initial RasterTileMap_{A} (i.e., the map for Layer A)
       0,1 -> None
       0,2 -> None
       0,3 -> None
   where K -> None denotes that a tile with key K does not yet have a RasterTile allocated for it.
   It does the same for Layer B (ad), but subdivides it into only 1 tile as the layer is relatively small.

```
   -----
   |   | <-- Tile 0,1 [256x256]
   -----
   ```

RasterTileMap_{B} is:
       0,1 -> None
   The user sees a blank page at this point.
   (b) For each tile key K in a RasterTileMap, TC allocates a RasterTile for K, attaches it to the LayerTree DOM, and draws to it. Here we Demonstrate this in parallel for Layer A and B.
       (i) After one iteration, the resulting RasterTileMap_{A} is:
           0,1 -> Canvas2DTile
           0,2 -> None
           0,3 -> None and the user would see the following for Layer A:
```
-------
       |Hello| <-- Tile 0,1 (drawn, text)
       |     | <-- Tile 0,2 (not yet drawn)
       |     | <-- Tile 0,3 (not yet drawn)
-------
```
After the same iteration, RasterTileMap_{B} is:
    0,1 -> DOMTile (drawn, image)
and the user would see Layer B as:
```
-----
| i | <-- Tile 0,1 [256×256] (i denotes an image)
-----
```
A DOMTile was chosen because the display list has only one draw-op.
and thus selectTileType deemed it simple enough for efficient DOM
element generation.
The DOM tree emitted by the DOMTile rasterizer is:
    <div style="position: absolute; top: 0px; left: 0px; width: 256px;
        height: 256px;">
      <img src="image_frame_data_0.png" x="0" y="0">
    </div>
where image_frame_data_0 is the bitmap corresponding to frame 0 of the
animated image.
(ii) After drawing the second tile, the resulting RasterTileMap_{A} is
        0,1 -> Canvas2DTile
        0,2 -> DOMTile
        0,3 -> None
and the user sees the following for Layer A:
```
-------
       |Hello| <-- Tile 0,1 (drawn, text)
       |     | <-- Tile 0,2 (not yet drawn)
       |     | <-- Tile 0,3 (not yet drawn)
-------
```
A DOMTile was selected to raster Tile 2 because that region was
non-complex, and thus was considered simple enough for DOM
rasterization.
RasterTileMap_{B} does not have a second tile, so it remains
unchanged.
(iii) After drawing the third tile, the resulting RasterTileMap_{A} is
        0,1 -> Canvas2DTile
        0,2 -> DOMTile
        0,3 -> DOMTile
and the user would see the following for Layer A:
```
-------
       |Hello| <-- Tile 0,1 (drawn, text)
       |     | <-- Tile 0,2 (drawn, all white)
       |     | <-- Tile 0,3 (drawn, all white)
-------
```
A DOMTile was selected for Tile 3 for the same reason given in (ii).
RasterTileMap_{B} does not have a third tile, so it remains
unchanged.
After the EB installs the LayerTreeDOM, the user sees:
```
-------
|Hel|i|
|   -|
|    |
-------
```
in which Layer B (with image i), positioned in the upper righty
composites on top of Layer A with text "Hello" (partially occluded by
image i).
n. TC builds LayerTreeDOM_{n-1} from T_{n-1} as follows, and then installs
it in EB's DOM:
(a) Allocates a single container div for Layer A, subdivides the region
into 3 equal sized tiles, as follows:
```
-------
       |     | <-- Tile 0,1 [1024×256]
       |     | <-- Tile 0,2 [1024×256]
       |     | <-- Tile 0,3 [1024×256]
-------
```
and creates the initial RasterTileMap for Layer A:
    0,1 -> None
    0,2 -> None
    0,3 -> None
where K -> None denotes that a tile with key K does not yet have a
RasterTile allocated for it.
It does the same for Layer B (ad), but subdivides into only 1 tile as the
layer is relatively small.
```
-----
|   | <-- Tile 0,1 [256×256]
-----
```

-continued

```
RasterTileMap for Layer B is:
    0,1 -> None
The user continues to see the previously rendered frame at this point,
because this LayerTreeDOM has yet to be installed.
(b) For each tile key K in a RasterTileMap, TC allocates a RasterTile for
    K, attaches it to the LayerTree DOM, and draws to it. Here it is
    demonstrated that this in parallel for Layer A and B.
    (i) After drawing the first tile, the resulting RasterTileMap_{A} is:
        0,1 -> Canvas2DTile
        0,2 -> None
        0,3 -> None
    and the user sees the following for Layer A:
        -------
        |Hello|  <-- Tile 0,1 (drawn, text)
        |     |  <-- Tile 0,2 (not yet drawn)
        |     |  <-- Tile 0,3 (not yet drawn)
        -------
    RasterTileMap_{B} is:
        0,1 -> Canvas2DTile (drawn, complex text)
    and the user sees Layer B as:
    | t |  <-- Tile 0,1 [256x256] (t denotes text "Buy..")
    A Canvas2DTile was chosen because the display list now has complex
    paths and thus selectTileType deemed it too complex for efficient SVG
    path generation and rendering.
    (ii) After drawing the second tile, the resulting RasterTileMap is:
        0,1 -> Canvas2DTile
        0,2 -> DOMTile
        0,3 -> None
    and the user sees the following for Layer A:
        -------
        |Hello|  <-- Tile 0,1 (drawn, text)
        |     |  <-- Tile 0,2 (drawn, all white)
        |     |  <-- Tile 0,3 (not yet drawn)
        -------
    A DOMTile was selected to raster Tile 2 because that region has few
    draw-ops and thus was considered simple enough for DOM rasterization.
    RasterTileMap_{B} does not have a second tile, so it remains
    unchanged.
    (iii) After drawing the third tile, the resulting RasterTileMap is:
        0,1 -> Canvas2DTile
        0,2 -> DOMTile
        0,3 -> DOMTile
    and the user would see the following for Layer A:
        -------
        |Hello|  <-- Tile 0,1 (drawn, text)
        |     |  <-- Tile 0,2 (drawn, all white)
        |     |  <-- Tile 0,3 (drawn, all white)
        -------
    A DOMTile was selected for Tile 3 for the same reason given in (ii).
    RasterTileMap_{B} does not have a third tile, so it remains
    unchanged.
After the EB installs the LayerTreeDOM, the user would see:
    -------
    |Hel|i|
    |   -|
    |    |
    -------
in which Layer B (with text t ["Buy.."]), positioned in the upper right.
composites on top of Layer A with text "Hello" (partially occluded by
text t).
```

Benchmarks

Here are given performance benchmarks with static and dynamic tile selection for this multi-layer example page. To collect results, the page was loaded, via a Remote Compositing system, on a Chromium 80 web browser (EB) configured with a lone 1400×900 tab running on a 2018 MacBook Pro with High-DPI (DSF 2.0) display. Three trials were taken, each time starting over with a fresh tab. Statistics were from Chromium's Task Manager.

Using static tile selection with all tiles of type Canvas2DTile, the EB consumes 38 MB of main system RAM and 64 MB of VRAM. The cumulative time spent rendering frames was 20 milliseconds (ms). With dynamic tile selection, the EB consumes 33 MB of main system RAM and 8 MB of VRAM, spending a cumulative 9 ms on rendering frames.

Dynamic tile selection is substantially more efficient in GPU RAM and CPU utilization because it allocates only two Canvas2DTiles for this page. The vast majority of tiles are DOMTile-backed due to the fact that the vast majority of the page uses simple draw ops. DOMTiles are efficiently rendered by the browser's optimized native GPU rasterization machinery, thus avoiding the CPU and VRAM overhead of CPU rasterization.

Display List to DOM Transformation

The DOM rasterizer facilitates rendering content by way of translation to DOM. In this section, the DOM transformation approach defined in the DOMTile specification is applied to various example Display Lists:

---

(a) Consider a simple Display List that draws a curved path
ClipRect(0, 0, 1024, 768)
DrawPath(curvedPath) # curvedPath references path drawing instructions

---

Such a Display List may be produced by the IB browser upon loading a page that draws |curvedPath|. The transformation approach converts the Display List into the following DOM tree:

---

```
<div style="position: absolute; top: 0px; left: 0px; width: 256px;
       height: 256px;">
   <svg viewBox="0 0 256 256" xmlns="http://www.w3.org/2000/svg">
      <defs>
         <rect id="obj_0" x="0" y="0" width="256" height="256">
         rect id="obj_1" x="0" y="0" width="1024" height="768">
         <path id="obj_2" d="M 10 80 Q 95 10 180 80" stroke="black"
fill="transparent"/>
      </defs>
   </svg>
   <div style="transform: translate(0,0); clip-path: url(#obj_0);">
      <div style="clip-path: url(#obj_0);">
         <div style="background-image: url(#obj_2);"> </div>
      </div>
   </div>
</div>
```

---

Path data contained in |curvedPath| is converted into an SVG path string (see value of attribute "d" above).

---

(b) Consider a Display List that draws text:
DrawText(0, 20, "hello", pos_array) # pos_array contains glyph positioning
data

---

Such a Display List results from loading a simple page that contains the
text "hello". The transformation approach converts the above Display List into the following DOM tree:

---

```
<div style="position: absolute; top: 0px; left: 0px; width: 256px;
       height: 256px;">
   <svg viewBox="0 0 256 256" xmlns="http://www.w3.org/2000/svg">
      <defs>
         <rect id="obj_0" x="0" y="0" width="256" height="256">
         text id="obj_1" x="0 8 16.1 23 30" y="20">hello</text>
      </defs>
   </svg>
   <div style="transform: translate(0,0); clip-path: url(#obj_0);">
      <div style="background-image: url(#obj_1);"> </div>
   </div>
</div>
```

---

The emitted SVG explicitly specifies glyph placement for the text "hello", thus providing pixel-accurate text rendering fidelity. Furthermore, unlike Canvas-based rasterization, it allows the Endpoint Browser or extensions running on the Endpoint Browser (e.g., Chrome Extensions) to understand that the text being rendered is the English word "hello", thus allowing the user to select it and trigger the user's Dictionary extension or screen-reading program (an accessibility feature), and to obtain text-specific functionality (context menu items, copy/paste), among other things.

---

(c) Consider a simple Display List that draws an image:
ClipRect(0, 0, 1024, 768)
DrawImage(0, 0, frame_data_0) # frame_data_0 is the image of a cat

---

Such a Display List may be produced by the IB browser upon loading a page that shows the image of a cat. The transformation algorithm converts the Display List into the following DOM tree:

---

```
<div style="position: absolute; top: 0px; left: 0px; width: 256px;
       height: 256px;">
   <svg viewBox="0 0 256 256" xmlns="http://www.w3.org/2000/svg">
      <defs>
         <rect id="obj_0" x="0" y="0" width="256" height="256">
         rect id="obj_1" x="0" y="0" width="1024" height="768">
      </defs>
   </svg>
   <div style="transform: translate(0,0); clip-path: url(#obj_0);">
      <div style="clip-path: url(#obj_0);">
         <image src="/resources/cat.png"/>
      </div>
   </div>
</div>
```

---

In contrast with Canvas or WebGL rasterization, the DOM rasterization allows the Endpoint Browser to understand that an image is displayed (as opposed to seeing only a bag of pixels), and that in turn enables the user to right click and save the image as is possible natively. It also allows accessibility tools recognize the image and possibly read out any associated textual caption.

Display List Deltas

It can be inefficient in CPU and network utilization to generate and transmit a new per-layer Display List every time a layer's drawing changes, especially if the layer is large and/or updates frequently. In this section, an optimization that enables incremental updates of Display Lists using Display List deltas is presented.

The delta approach works by subdividing a layer's master Display List into several Display List tiles (i.e., sub Display Lists). When the IB updates the master Display List, we identify the tiles that were affected, and serialize only those tiles (ops therein) to the TC. The TC, for any given Layer, retains a copy of the master Display List from the prior update, but applies the incoming tile updates (i.e., deltas).

More precisely, we define the TC's TiledDisplayList as follows:

---

```
module TC::Tiling {
   # An alternative Display List implementation in which a rectangular region
   # is tiled into several equal sized (in area) sub-display lists. Tiling
   # allows for efficient partial updates to the Display List because only the
   # tiles that change need be transferred over the network and changed on the
   # TC.
   #
   # In this specification, we assume a fixed tile size, but an alternative
```

```
# implementation may choose to use different tile sizes within the same
# tile map with little additional effort.
class TiledDisplayList:
    prop tile_map : Map<TileKey, DisplayList>
    # Updates the tile corresponding to tile |key|.
    func updateTile(key : TileKey, new_dl : DisplayList) -> None
        tile_map[key] = new_dl
}
```

On the IB, serializing display list tiles is accomplished with the following routines:

```
module IsolatedBrowser::Compositor {
  class Serializer:
    # Declaration. Returns display list ops with bounding
    # boxes that intersect |rect|.
    func<standard> extractOpsInRect(display_list : DisplayList,
            rect : Rect) -> DisplayList
    # Declaration. Sub-divides |bounds| into a list of tiles, and returns
    # that list.
    func<standard> tileRectList(bounds : Rect) -> List<Rect>
    # Writes the |display_list| draw_ops that intersect |tile_rect| into
    # |buffer|.
    func writeDisplayListRect(display_list : DisplayList,
            tile_rect : Rect,
            buffer : Binarywriter) -> None
        buffer.writeRect(tile_rect) # identify the tile
        tile_dl = extractOpsInRect(display_list)
        serializeDisplayList(tile_dl, buffer)
    # Serializes only the tiles that intersect |dirty_rect| in the given
    # |display_list| into |buffer|.
    #
    # Meant to be invoked as part of serializeLayer in lieu of
    # serializeDisplayList.
    func writeDirtyTiles(display_list : DisplayList,
            dirty_rect : Rect,
            layer_bounds : Rect,
            buffer : Binarywriter) -> None
        for rect in tileRectList(layer_bounds):
            if rect.intersects(dirty_rect):
                writeDisplayListRect(display_list, rect, buffer)
}
```

Example: Image Animation

An example of how Display List tiling cuts rendering and network tiling costs is shown on the following example page:

```
<!DOCTYPE html>
<html>
  <body>
    <div id='ad' style='position: absolute; width: 100px; height: 100px;'>
      <image src='animated.gif'/>
    </div>
    Paragraph 1
    Paragraph 2
    ...
  </body>
</html>
```

The page displays a 100×100 animated image in the top left corner, followed by lots of text content. Because the image is animated, the D3 generates a continuous stream of updates for the TC to render.

G. Rendering Updates

Upon loading the example page, IB generates and transmits to the TC a sequence of n Layer Trees:

$T\_\{0\}, T\_\{1\}, \ldots, T\_\{n-1\}$ where the precise value of n depends on how long the page is left open.

In that update sequence, Layer Tree $T\_\{i\}$ is defined as:

```
* Root
  o Layer A
    - Display List A_{i}
```

Without tiled Display Lists, Display List $A\_\{i\}$ (for all i) would contain the following ops:

```
1. DrawImage(0, 0, frame_data_{j})
2. DrawPath(0, 256, par1Path) // draw paragraph 1
3. DrawPath(0, 512, par2Path) // draw paragraph 2
4. DrawPath(0, 768, par2Path) // draw paragraph 3
...
```

In other words, all of Layer A's content, including text, is serialized in every update even though only the image is being animated.

By contrast, with tiled Display Lists, the initial update is the same size as the without tiling case, but subsequent updates are substantially smaller.

More precisely, with tiled display lists using a fixed and uniform 256×256 tile size, Display List $A\_\{0\}$ is defined as:

```
1. DrawImage(0, 0, frame_data {j})
2. DrawPath(0, 256, par1Path) // draw paragraph 1
3. DrawPath(0, 512, par2Path) // draw paragraph 2
4. DrawPath(0, 768, par2Path) // draw paragraph 3
...
``` but Display List $A\_\{i\}$ (for i>0) is defined as:
1. DrawImage(0, 0, frame_data_{j})

That is, after the first display list, subsequent updates do not transmit the ops that lie outside of the animating tile. There is no need to because the TC already has a copy of those tiles, and those tiles have not changed.

Context-Aware Throttling

Data-rate throttling is a technique for controlling network and CPU resource consumption. In the context of RBI, throttling allows admins to enforce per-device bandwidth limits on web browsing traffic. Throttling also allows the TC to control the flow of RBI updates (Commits) to the endpoint it runs on, and that is useful for regulating the CPU and power expended in processing RBI updates.

Existing network-level and browser-level (DevTools) rate throttling mechanisms result in a poor user experience. One problem is that they treat all browser traffic with equal bandwidth priority when, in reality, not all content is of equal value in the user's eyes. For example, videos that are visible to the user (e.g., in a foreground tab) are more important, from a UX perspective, than invisible videos (e.g., those in background tabs or those that have been scrolled out of view). To give another example, non-ad content is more important than ad content, yet network-based throttling treats ad and non-ad content alike, giving both an equal share of bandwidth. Finally, content such as input boxes and menus are more important than background animations, yet updates of the latter can overwhelm the link to preclude updates of the former.

Described herein is Context-Aware Throttling—an RBI throttling mechanism that takes the meaning and user-value of page content into account to selectively throttle content at sub-page granularity. In particular, the approach subdivides the page into units (Layers) and gives bandwidth priority to the most important units as determined by their impact on perceived user experience. This allows the system to keep within imposed resource limits (bandwidth and endpoint CPU) in a way that avoids degrading the user experience of the entire browsing session. For example, visible videos continue to play with high quality and keyboard input stays responsive even as bandwidth constraints are being adhered to.

Context-Aware Throttling differs from network and browser-level rate limiting in that it (a) allows one to be selective about what portions of the page are throttled, as opposed to throttling the entire page/browser and consequently impacting the whole page/browser user experience, and (b) allows one to consider the user context (e.g., is the user looking at the content? Is video playing on the page?). Both are made possible by the fact that the IB has an understanding of what content is on the page (browsers are designed to understand HTML after all), what that content is doing (e.g., is it actively playing a video?), and what the user sees. By contrast, traditional rate limiters see only a stream of bytes and hence have no visibility into page semantics or user perception of page content.

The Layer abstraction is a unit for data rate control decisions. Foremost, it provides rich semantic information about the content being rendered and how the user perceives it, via its associated metadata such as Display Lists and video state. The layer abstraction is also general in that implementers are free to define its granularity (i.e., define what content falls within any given layer). For instance, in the extreme case, a layer may be defined so that it always maps one-to-one with page DOM elements. The techniques presented herein are not bound to the Layer abstraction: they are easily adapted to other remoting approaches such as DOM-level Remoting.

The priority of a Layer is a system parameter (e.g., provided by admin policy) and a variety of configurations (policies) are possible:

Example: priority is given to visible video layers over invisible ones

Example: priority is given to non-ad layers over ad layers

Example: priority is given to interactive layers (e.g., those with input boxes or the focus of mouse activity) over layers with high-data rate background animations Example: priority is given to layers whose updates do not consume excessive CPU when drawing them on the client.

Or any combination of the above policies.

Specification

A. The Isolated Browser is augmented with:
 - Layer priorities
   - Each layer has a configurable priority
   - Priority may be static, or dynamic based on the Layer's properties
     - E.g., as determined by an analysis of Display List contents
     - E.g., as determined by an analysis of video content or its metadata
 - A rate limiter for bandwidth control
   - The rate limiter is shared by all pages (browser wide)
   - Though a variety of limiting approaches may be used here, in an example embodiment we use the Token Bucket Filter (TBF), which has the following parameters:
     - Token fill-rate: determined by standard bandwidth estimation procedure or by an artificial limit; token unit is in bytes
     - Bucket size: a large burst size is recommended to account for video content; unit is in bytes
   - A single rate limiter allows unused capacity to be shared by lower priority classes
 - A prioritized layer serializer
   - that serializes high priority layers first to ensure that they get favored access to bandwidth capacity
B. We augment the Thin Client with:
 - Per-layer flow controller
   - Periodically monitors resource utilization of a layer
     - E.g., how long it takes to draw, memory required, etc.
   - If high, informs IB Compositor to downgrade priority by sending it a message with the id of the Layer to downgrade
   - Optionally, it may update the Layer's priority when it detects that resource utilization is nominal

```
#   An extension of the IB Compositor that supports data rate limiting. Here is
#   given only the changes made to the core implementation.
module<standard> IsolatedBrowser::Compositor {
    ## Globals shared by all LayerTreeManager instances
    # Size of EB's viewport; kept up to date by resize updates sent by TC.
    prop viewport_rect : Rect
    # A global rate limiter shared by all priority classes,
    prop tbf : TokenBucketFilter
```

```
# Two priority classes to keep the spec simple,
enum Priority:
    kLow = 0,
    kHigh = 1
# An extension of the core Layer class.
class Layer:
    # Priority set by the TC. None if TC hasn't set it.
    prop priority : Priority | None
    func intersectsViewport( ) -> bool
        return transform.mapRect(bounds).intersects(viewport_rect)
    # Returns true if the layer resides in a tab that is visible to the user:
    # i.e., is not in a background tab and is not being occluded by other
    # windows.
    func<standard> isForeground( ) -> bool
    # Returns true iff this Layer is hosted within an ad iframe. This is
    # standard functionality provided by modern browsers (e.g.. Chromium has
    # an AdTracker).
    func<standard> isInAdFrame( ) -> bool
    # Returns true iff the layer hosts an interactive element or is capable
    # of being interacted with (e.g., scrolled) in some way. This may be
    # tailored to the needs of the user base,
    func isInteractive( ) -> bool
        # These helpers are trivial to implement given existing Renderer APIs,
        return (hasInputFocus( ) or hasHTMLButtonElement( )
            or hasScrolledRecently( ))
    # Returns true iff layer is of interest to user. This can be tailored to
    # the user-base at hand: e.g., some user bases will find ads interesting,
    # others will not.
    func isInterestingToUser( ) -> bool
        # Our target audience does not value ad content. Nor is there any value
        # in consuming bandwidth for invisible content.
        return intersectsViewport( ) and not isInAdFrame( )
    # Example prioritization function that favors videos and interactive
    # content.
    func getPriority( ) -> int
        # Allow TC to override the priority for flow control needs,
        if priority:
            return priority
        # Background tabs are not visible to the user, so there's little value
        # in consuming bandwidth to remote such content.
        if not isForeground( ) or not isInterestingToUser( ):
            return Priority::kLow
        if type == kVideoLayer:
            return Priority::kHigh
        elif type == kPictureLayer and isInteractive( ):
            return Priority::kHigh
        return Priority::kLow
    # Override the default priority calculation for the layer. This allows
    # the TC to control prioritization for flow controls needs.
    func setPriority(Priority new_prio) -> None
        priority = new_prio
    # Invoked when this layer's updates are throttled; does nothing by
    # default but is overridden by the video quality adjustment modules,
    func wasThrottled(tbf : TokenBucketFilter) -> None
        pass
# A layer tree serializer that considers available bandwidth and layer
# priority order during serialization. Layer serialization is skipped if
# there is not enough available bandwidth.
class PrioritizedSerializer inherits Serializer:
    func serializeIfTokensAvailable(layer : Layer) -> None
        tmp_buffer = BinaryWriter( )
        serializeLayer(layer, tmp_buffer)
        # Send the update only if there's enough bandwidth capacity.
        if tmp_buffer.size( ) <= tbf.nrTokens( )::
            buffer.writeBuffer(tmp_buffer)
            tbf.consumeTokens(tmp_buffer.size( ))
            layer.is_dirty = false
            if layer.type == kVideoLayer:
                # Avoid sending the chunks again in future commits.
                layer.video_state.chunks = None
        else: # not enough tokens
            # Do not send an update, and do not clear the dirty flag to ensure
            # that the layer is considered for serialization in the next commit.
            #
            # Take layer-specific throttling action (e.g., adjust video quality)
            layer.wasThrottled(tbf)
```

-continued

```
        func serializeTree(layer_tree : LayerTree,
                  buffer : Binarywriter) -> None
            # High-priority layers get priority access to TBF tokens.
            for layer in layer_tree.preOrderList( ):
                if layer.getPriority( ) == Priority::kHigh:
                    serializeIfTokensAvailable(layer)
            # Now serialize the low-priority layers.
            for layer in layer_tree.preOrderList( ):
                if layer.getPriority( ) == Priority::kLow:
                    serializeIfTokensAvailable(layer)
    # A variant of LayerTreeManager with bandwidth throttling capability. The
    # IB is expected to use this instead of LayerTreeManager if bandwidth
    # throttling capability is desired.
    class ThrottlingLayerTreeManager inherits LayerTreeManager:
        # Callback invoked when TC's FlowController explicitly updates a layer's priority
        # class. This happens, for instance, when TC realizes that drawing layer
        # |layer_id| costs too much endpoint CPU and thus wants to reduce the layer data
        # rate in order to avoid falling behind on drawing other layers.
        func<NN> onSetPriorityFromTC(layer_id : int, prio : Priority) -> None
            layer = layer_tree[layer_id]
            layer.setPriority(prio)
        # Invoked when LayerTreeManager completes layer tree build/update.
        func<NN> onLayerTreeUpdateComplete(layer_tree : LayerTree):
            buffer = BinaryWriter( )
            PrioritizedSerializer( ).serializeTree(layer_tree, buffer)
            websock.sendeessage(buffer.toArray( ))
        # Initialize the rate limiters with values that add up to a global maximum
        # data rate of roughly 100KBps.
        kMaxDataRate = 100000 # in bytes
        kBucketSize = kMaxDataRate * 4 # allow bursts up to 4x the average max data rate
        tbf = TokenBucketFilter(kBucketSize, kMaxDataRate)
}
module<standard> Common::Utils {
    # Standard set of routines for getting current time and creating timers.
    class<standard> Time
    class TokenBucketFilter(bucket_size : int, data_rate : int):
        prop tokens : int = 0
        # The last time the TBF was filled,
        prop last_time : Time
        func consumeTokens(int nr_to_sub) -> None
            tokens = max(0, tokens - nr_to_sub)
        func addTokens(int nr_to_add) -> None
            tokens = max(bucket_size, tokens + nr_to_add)
        func hasTokens( ) -> bool
            return tokens > 0
        func getDataRate( ) -> int
            return data_rate
        func replenishBucket( ) -> None
            elapsed_time_secs = Time::Now( ) - last_time
            addTokens(elapsed_time_secs * data_rate)
            last_time = Time::Now( )
        # Replenish the bucket at regular intervals.
        Time::setInterval(replenishBucket, 100) # invoked every 100 ms
}
```

Examples: kPictureLayer Data Rate Throttling

A. Example: Login Page with Background Animation

Real-world pages often contain gratuitous animations that are not central to the user's needs. When loaded via RBI, these animations may consume substantial bandwidth at the expense of interactive response time. For example, consider the following login page modeled after a real-world login page to a major cloud service:

```
<!DOCTYPE html>
<html>
    <body>
        <div id='background' style='width: 100%; height: 100%;'>
        <form action='/login.php' method='post' style='position: absolute; left: 50%;'>
            Login: <input id='login'></input>
            Password: <input id= 'pass'></input>
            <input type='submit' value='Submit'>
        </form>
        <script>
            var boxes = [ ], i;
            for (i = 0; i < 100; i += 1) {
```

```
            var box = document.createElement('div');
            box.style.top = box.style.left = '0px';
            box.style.width = box.style.height = '100px';
            box.style.backgroudcolor = 'blue-';
            box.style.transform = 'rotateZ(0)'; // force composited layer creation
            boxes.push(box);
            box.appendChild (document.getElementById('background'));
        }
        <!-- Animation: move the boxes around to create a simple jiggling effect.
-->
        window.requestAnimationFrame(function( ) {
            boxes.forEach(function (box) {
                box.style.left += Math.random( ) * 2;
                box.style.top += Math.random( ) * 2;
            });
        });
    </script>
</body>
</html>
```

Hosted via an HTTP server running at the imaginary domain example.com, the page features a login form comprising HTML, input fields (for login and password) and a jiggling-box background animation. The background animation comprises a hundred animated boxes that, when loaded via RBI, induce the Compositor to generate frequent layer updates. Without fine-grained layer bandwidth regulation, these updates will likely overwhelm the EB-to-IB communications channel and make it impossible (or excruciatingly slow) for the user to input credentials into the login form.

In this section, it is demonstrated that, with a bandwidth throttling mechanism in place, the RBI service provides differentiated bandwidth regulation of page content, thus providing low interactive response times to the user while keeping within admin-enforced bandwidth upper-limits.

Session trace under RBI:

1. The user enters the URL of the page into the EB (example.com). The TC then requests that IB load the page.
2. The RBI services allocates and pairs an IB with the user (if not already paired) and forwards the load request to the IB.
   a. Upon allocation: among other things, IB initializes a single 100KBps TBF for rate limiting needs.
3. IB loads the page
   a. IB's Renderer parses the page, builds intermediate data structures, and prepares for lifecycles update requests from the Compositor
   b. Compositor allocates a single LayerTreeManager for the page
4. The page's LayerTreeManager enters its main rendering loop, which involves periodically generating Commits and sending them to the TC
   a. For each turn of the rendering loop, LayerTreeManager requests a lifecycle update from the Renderer. That results in the building or updating of the Layer Tree and the generation of a Commit.
   b. For this page, all generated Layer Trees have the following form
      Tree Root
      |_ P_1 (PictureLayer for animated square object)
      |_ . . . (same)
      |_ P_k (same)
      |_ P_k+1 (PictureLayer for login form with input fields)
      where layers P_1 to P_k (k = 100 for this page) correspond to animated objects in the page's background and P_k + 1 corresponds to the login form.
         i. P_k + 1 contains username and password input fields. To log in to the site, the user must first shift keyboard focus to those fields prior to typing.
      ii. The background objects (P_1 to P_k) are constantly animated
         via CSS style updates made by the page's JavaScript. As there are 100 of them in our example demo (see HTML), we expect it to consume significant bandwidth.
      iii. The background objects, by virtue of our rate limiting policy, do not contain input fields and thus will be considered low priority (Priority::kLow). The login form layer also starts off with Priority::kLow since it does not yet have input focus.
   c. Although the form of the Layer Tree is similar across commits, the properties of individual Layers in the tree will vary from commit to commit.
5. In this example user session, the Compositor is expected to generate the following sequence of commits immediately after page load: C_0, C_1, C_2, . . . , C_20
   a. C_0 contains the initial properties of all page layers: e.g., transform, size, type. Display List, etc.
   b. C_1 to C_20 contain updates to the animated layer properties, specifically their positions
      i. E.g., In C_1, P_1 may move to the right by 1 pixel, P_2 may move down by 2 pixels, and so on.
      ii. E.g., In C_10, P_k + 1 updates its Display List to draw a focus ring around the input field
6. Shortly after load (commits C_20 to C_60), the user perceives a slight reduction in frame-rate for the background animation
   a. Cause of background frame-rate reduction: when it is time to generate C_20, the tokens in the TBF become depleted, which means there is not enough bandwidth availability to serialize all background objects in this commit
   b. PrioritizedSerializer::serializeTree then chooses a subset of all background layers to serialize. The remaining will have to wait for a future commit in which more TBF tokens become available.
7. During commits C_61 to c_100, the user clicks on the username field and begins typing her credentials. As she types, she perceives low response times: the characters echo with little to no latency and the caret blinks in steady tempo.
   a. As a result of shifting input focus to the username fields the login form layer's priority changes to Priority::kHigh, per our example policy (see Layer::getPriority( )).
   b. Since high-priority layers get priority access to TBF tokens, the response times of keyboard echos and caret blinks are not impacted by the high volume; of background updates in the low-priority layers.

B. Example: News Page with Advertisement Frames

Real-world pages often contain advertisements that are not central to the user's interests or needs. When loaded via RBI, these ads may consume substantial bandwidth along the EB-to-IB link, even if the user is not actively interacting with or looking at the page. For example, consider the following news page:

```
<!DOCTYPE html>
<html>
  <body>
    <div style='overflow: scroll;' id='article'>
      Breaking News: Stock Market is Up
      ...
    </div>
    <iframe style='position: fixed; bottom: 0px;' src='ad.net/widget.html'/>
    <iframe style='position: fixed; right: 0px;' src='ad.net/product-video-
1.html'/>
  </body>
</html>
```

Hosted on an HTTP server running at the imaginary domain example.com, the page features a long news article and multiple advertisement iframes, as is typical of real-world news sites. One ad frame hosts a video player that begins playing videos as soon as the page is loaded and continues to play for the duration of the session, cycling through a variety of ad videos even when the user is not interacting or looking at the page, thus consuming substantial bandwidth. The second ad features DOM and image-based animations that update frequently, also consuming significant bandwidth. The news article itself is hosted inside of a scrollable div element.

In this section, it is demonstrated that, with a bandwidth throttling mechanism in place, the RBI service ensures timely rendering of news content when the user scrolls, while keeping within admin-enforced bandwidth upper-limits.

Session trace under RBI:

1. The user enters the URL of the page into the EB (example.com). The TC then requests that IB load the page.
2. The RBI services allocates and pairs an IB with the user (if not already paired) and forwards the load request to the IB
    a. Upon allocation: among other things, IB initializes a single 100KBps TBF for rate limiting needs.
3. IB loads the page
    a. IB's Renderer parses the page, builds intermediate data structures, and prepares for lifecycles update requests from the Compositor
    b. Compositor allocates a single LayerTreeManager for the page
4. The page's LayerTreeManager enters its main rendering loop, which involves periodically generating Commits and sending them to the TC
    a. For each turn of the rendering loop, LayerTreeManager requests a lifecycle update from the Renderer. That results in the building or updating of the Layer Tree and the generation of a Commit.
    b. For this page, all generated Layer Trees have the following form (simplified):
        Tree Root
        |_ P_1 (PictureLayer for news (scrollable))
        |_ P_2 (PictureLayer for ad.net/widget.html ad)
        |_ V_1 (VideoLayer for ad.net/product-video-1.html)
        |_ P_3 (PictureLayer for video controls)
        i. The ad layers (P_2, V_1) host dynamic content (animation and videos), while the news layer (P_1) is animated only when the user explicitly scrolls the content.
        ii. The dynamic content will consume significant bandwidth, but our rate limiting method will prevent those layers (low-priority) from interfering with the perceived responsiveness of the news layer (initially low-priority) should the user decide to scroll it (making it high-priority).
5. The compositor will generate the following sequence of commits immediately after page load: C_0, C_1, C_2, . . . , C_20
    a. C_0 contains the initial properties of all layers (background and foreground): e.g., transform, size, type. Display List, etc.
    b. C_1 to C_20 contain updates to the advertisement layers (changing frame to frame)
        i. Image and DOM animation on P_2
        ii. New video chunks for V_1

6. Shortly after load (commits C_20 to C_60), the user scrolls the news layer (P_2). As she does so, she perceives a slight reduction in frame-rate on the advertisement layers
    a. As soon as she begins scrolling P_2, TC updates the scroll position of the layer on the IB, thus promoting the layer to Priority::kHigh per the logic in Layer::getPriority( ).
    b. On the next commit (e.g., C_21), LayerTreeManager observes the position change and serializes an updated set of layer properties for P_2
        i. These property updates include a Display List that describes what content to draw further down the scrollable
        ii. If the Display List is delayed substantially, then the user will momentarily see blank content (this is what we're trying to avoid)
    c. Since P_2 is now considered high priority, it gets priority access to TBF tokens as soon as they become available.
    d. Ad layers, being low priority, must wait for P_2's updates to be serialized, which means that their layer-properties will not be serialized on every commit, hence the perceived reduction in frame-rate of the ad layers.
7. After C_60, the user stops scrolling, and she shortly thereafter perceives an improvement to the smoothness of animation and/or video playback in the ad frames
    a. Once scrolling stops, P_2 is downgraded to Priority::kLow, and moreover, P_2 no longer uses any tokens, thus enabling the low-priority ad content layer updates to be serialized on every commit.

kVideoLayer Data Rate Throttling

The ability to throttle video transfers independently of other page content on the EB-to-IB communications path is a unique capability afforded by RBI; network-level throttling cannot do this because it sees the page merely as a bag of bytes and is unaware of what they represent (e.g., video vs. non-video). However, reducing the EB-to-IB transfer rate of video layer communications alone may not be enough to ensure a good user experience; specifically, throttled EB-to-IB data rates risk introducing playback stalls if the EB's frame playback rate is greater than the rate at which the frame data arrives from the D3.

To minimize playback stalls, we can reduce the quality, compression format, and/or frame-rate of the video so that more video content can be transferred at the same or smaller bitrate. One challenge is that the quality of video encoding is determined at the web application level and depends largely upon the specific video player in use. Described herein are several techniques that address this challenge.

H. Example Techniques for Avoiding Video Playback Stalls

Explicit Quality Adjustment via Video Player Interaction

Many video players expose user-adjustable quality/bit-rate options in their UI. Hence one way to adjust video quality is to manipulate the video player application settings by either simulating user actions (clicking on DOM elements) or by directly invoking the player's JavaScript API. A key benefit of this approach is that it works for any video player with exposed quality settings. However, the precise interaction sequence including the ids of DOM elements must be hard-coded and therefore must be continuously updated when the video player changes.

an Extension for Adjusting the Video Quality Setting on Popular HTML Video Players.

```
module IsolatedBrowser::Extensions::QualityAdjustment {
  # Leverages Extensions API (e.g.. Chromium Extension API) to inject a
  # simulated click on every element with id attribute |id| within frame
  # |frame_id|. Returns true iff at least one such element was found and
  # successfully clicked.
  func<standard> clickElements(frame_id : int, id : string) -> bool
  # Execute the JavaScript in |script| in the context of the frame identified
```

```
# by |frame_id|.
func<standard> executeScript(frame_id : int, script : string) -> bool
# Quality adjuster for ExampleCorp1 video player.
class PlayerAController:
    # Adjusts quality (and hence bit-rate) of video players in frame
    # |frame_id| by simulating user interaction on the video player.
    func adjustQualityByClicking(frame_id : int, prio : Priority) -> bool
        if prio == Priority::kHigh:
            return clickElements('high-quality')
        return clickElements('low-quality')
    # Adjust bit-rate by directly invoking the video player's JavaScript
    # API. func adjustQualityByScripting(frame_id : int, prio : Priority)
        -> bool
            return executeScript(
                'document.getElementById("movie_player").
                setPlaybackQuality(%s);' % prio)
# Adjuster designed for another video player. Works like the one above,
# but element ids and API calls will differ.
class PlayerBController:
    ...
}
module IsolatedBrowser::Compositor {
    func Layer::wasThrottled(tbf : TokenBucketFilter) -> None
        if layer.type != kVideoLayer:
            return
        # Fall back to user-interaction simulation if adjustment via direct API
        # call fails. The latter may fail if the site changes the API name.
        #
```

```
        # Each layer is associated with one LayerTreeManager object,
        # and each such object has an associated DOM frame id that
uniquely
        # identifies the HTML frame/iframe it corresponds to.
        if getFrame( ).getCurrentOrigin( ) == 'maker-of-player-a.com':
            ctrl = Extensions::QualityAdjustment::PlayerAController( )
        else:
            ctrl = Extensions::QualityAdjustment::PlayerBController( )
        frame_id = getFrame( ).getId( )
        if not Ctrl.adjustQualityByScripting(frame_id, getPriority( )):
            ctrl.adjustQualityByClicking(frame_id, getPriority( ))
}
```

B. Induced Quality Adjustment Via Bandwidth Modulation

Another approach to quality adjustment is to module the effective bandwidth along the IB to Origin Web Server link. The aim is to artificially trigger the HTML video player's built-in adaptive streaming capabilities. This is based on the fact that adaptive players pay attention to how fast video chunks are being downloaded and adjust the quality rate automatically in order to avoid playback stalls. A benefit of this approach is that it works on any adaptive video player (e.g., those that auto-adjust bit-rate of video playback based on available bandwidth) and it will not break when the DOM element of the player changes.

```
A module that throttles the bandwidth of select XHR requests/responses
# issued by the IB with the aim of triggering the video player's built-in
# quality adjustment mechanism (found in modern adaptive video players).
module IsolatedBrowser {
    # Defines the default request/response throttling behavior for every HTTP
    # request/response issued by the IB to Origin Servers. It may be overridden
    # to customize throttling behavior.
    class<standard> NetworkThrottle:
        # Returns a list of pending responses.
        func<standard> pendingResponses( ) -> List<Response>
        # Returns the frame that is being throttled.
        func<standard> getFrame( ) -> RenderFrame
        ...
    # Contains a single HTTP response, including size, payload, origin, etc.
    class<standard> Response
        # The contents of the response.
        enum<standard> Response::Initiator:
            kXHR, # request was initiated by XMLHttpRequest
            kVideo, # request was initiated by a <video> tag
            ...
    ...
    # A custom throttler that overrides the default throttling behavior,
    class XHRThrottle inherits NetworkThrottle:
        prop data_rate : int = -1 # -1 implies unbounded data rate
        func throttleIfNeeded(resp : Response) -> bool
            # Throttle only those responses that are likely to contain video
            # content. XHRs may be used to fetch video content by MSE-based
            # players, but they may also be used to fetch non-video application
            # data. We avoid disrupting the latter by using a heuristic here based
            # on a combination of request initiator type and whether the page is
            # actually playing any video (a capability unique to RBI).
            if (resp.type == Response::Initiator::kXHR and
                getFrame( ).isPlayingVideo( )):
                resp.setThrottle(data_rate)
                return true
            else if resp.type == Response.Initiator::kVideo:
                resp.setThrottle(data_rate)
                return true
            return false
        func onResponse(resp : Response) -> None
            if not throttleIfNeeded(resp):
                NetworkThrottle: :onResponse(resp) # original behavior
        func setDataRate(new_rate : int) -> None
            data_rate = new_rate
            # Throttle pending responses that have yet to complete; video stream
            # responses may take a while to complete on account of their size
```

```
            # and/or streaming.
            for resp in pendingResponses( ):
throttleIfNeeded(resp)
        func<standard> onNewFrameCreated(frame : RenderFrame) -> None:
            # Install a custom throttling object for each frame so that we can
            # control the request/response data rate of specific frames without
            # impacting other frames.
            frame.setNetworkThrottle(XHRThrottle( ))
}
module IsolatedBrowser::Compositor {
    # Returns the RenderFrame that hosts this Layer.
    func<standard> Layer::getRenderFrame( ) -> RenderFrame
    func Layer::wasThrottled(tbf : TokenBucketFilter) -> None
        if layer.type != kVideoLayer:
            return
        # Get a reference to the custom throttler for this frame; this was
        # assigned at frame creation time (see above).
        frame_throttle = getRenderFrame( ).getThrottle( )
        # Throttling the IB-to-OriginServer link will trigger adaptive streaming
        # logic in the video player: it will dynamically update the video quality
        # or codec parameters to ensure smooth playback with the available
        # bandwidth. Note that this assumes the video player and Origin Web
        # Server supports adaptive streaming.
        frame_throttle.setDataRate(tbf.getDataRate( ))
}
```

I. Example: Video Rate Limiting

It is herein demonstrated that bandwidth regulation of video content on the news page example given above. On that page, product video served by ad.net employs an HTML5 video player with adaptive streaming capability. The players are hosted within iframes and begin playing video content in an endless loop upon iframe load.

With the news page example in mind, the session trace under RBI is as follows:

1. The user enters the URL of the page into the EB (example.com). The TC then requests that IB load the page.
2. The RBI services allocates and pairs an IB with the user (if not already paired) and forwards the load request to the IB
    a. Upon allocation: among other things, IB initializes a single 100KBps TBF for rate limiting needs.
3. IB loads the page
    a. IB's Renderer parses the page, builds intermediate data structures, and prepares for lifecycles update requests from the Compositor
    b. Compositor allocates a single LayerTreeManager for the page
4. The page's LayerTreeManager enters its main rendering loop, which involves periodically generating Commits and sending them to the TC
    a. For each turn of the rendering loop, LayerTreeManager requests a lifecycle update from the Renderer. That results in the building or updating of the Layer Tree and the generation of a Commit.
    b. For this page, all generated Layer Trees have the following form:
        Tree Root
        |_ P_1 (PictureLayer for main frame http://example.com)
        |_ V_1 (VideoLayer for iframe video http://example.com/news.mp4)
        where V_1 is assigned low priority (Priority::kLow) as a result of being within an ad iframe (see Layer::getPriority( )). Had it not been in an ad iframe, it would have received Priority::kHigh on account of it being user-visible (in the viewport and in a foreground tab).
5. As the HTML video players begin fetching and playing segments, video chunks are enqueued into V_1's VideoLayer chunk queue. This results in the following sequence of commits over the page's lifetime: T_0, T_1, T_2, ..., T_100 (the precise number of commits will vary from run to run), where
    a. Chunk C_a (5KB) is enqueued to V_1's chunk queue at T_10
    b. Chunk C_c (40KB) is enqueued to V_1's chunk queue at T_20
    c. Chunk C_d (5KB) is enqueued to V_1's chunk queue at T_60
    d. Chunk C_e (5KB) is enqueued to V_1's chunk queue at T_70
    e. Chunk C_f (5KB) is enqueued to V_1's chunk queue at T_80
6. Given the flow of video chunks, rate-limiting code executes as follows:
    a. In T_0, no rate limiting is needed since there is not yet any chunk data in either video layer:
        i. V_1: chunks = [ ] (0KB)
    b. In T_10, V_1 has a chunk to serialize:
        i. V_1: chunks = [C_a (5KB)]
        ii. Given that there are enough TBF tokens, the chunk gets serialized

- continued c. In T_20, V_1 gets a new chunk:
        i. V_1: chunks = [C_c (200KB)]
        ii. But that chunk exceeds the number of available tokens, and thus V_1 must be throttled (in turn invoking Layer::wasThrottled for V_1)
        iii. As a result of the throttling, user is at risk of video playback disruption (stalls)
    d. In T_50, V_1 finally has finally accumulated enough tokens to send C_c
    e. In T_60, V_1 gets a new chunk that is much smaller as a result of applying a stall reduction technique (done within the Layer::wasThrottled call)
        i. V_1: chunks = [C_d (5KB)]
    f. All subsequent chunks added to V_1 in the trace are equally small, thus reducing the risk of EB-side playback stalls.

A. Example: Explicit Video Quality Adjustment Via Video Player Interaction

Step 6c in the primary trace above is now examined more closely with the assumption that Explicit Video Quality Adjustment is in effect. Upon having its wasThrottled method invoked, video layer V_1 reduces the quality of the video stream as follows:

1. It inspects the URL of the iframe hosting the video
2. It observes that the URL corresponds to the maker of video player PlayerA, so it instantiates a PlayerAController object to control it
3. It tells PlayerAController to reduce quality via the JavaScript API
4. But, in our example, that API call fails since PlayerAController has no such exposed API (e.g., because it was removed in the latest version)
5. As a fallback action, PlayerAController resorts to simulating user interaction with the video player
    a. IB, under extension control, generates a click event on the button for "Low Quality"
    b. That in turn invokes the onButtonClick handler
    c. The handler sets the |quality| variable of the page to 'low'
6. In subsequent chunk fetches, the video player will fetch low-quality versions of segments as opposed to the default high quality versions.
    a. Observe that the query string for the fetch request URLs now evaluates to 'low' instead of 'high'.
    b. This explains why C_d is small (5KB): the application reduces quality, thus causing it to request smaller video segments.

B. Example: Induced Video Quality Adjustment Via Bandwidth Modulation

Step 6c in the primary trace above is herein examined more closely with the assumption that Bandwidth Modulation is in effect.

Upon having its wasThrottled method invoked, video layer V_1 reduces the quality of the video stream as follows:

1. It obtains a reference to the XHRThrottle for its containing frame
2. It sets the throttle data rate to match that of the layer's TBF data rate
    a. As a low priority layer, V_1 is assigned a low data rate, and thus one can expect video traffic in that frame to be throttled to that amount.
3. Upon invoking XHRThrottle::setDataRate, it considers all active/pending HTTP responses (e.g., for long lived video streams) and future connections:
    a. For each such connection, it determines who the initiator of the connection is and whether the page is actively playing video (IB's Renderer tracks via its implementation of HTMLMediaElement) .

- continued b. It throttles only those connections that were initiated by XHR or by a video tag, and that only if video is actively playing on the page.
    c. Note that only the connections in the owning frame are impacted by the data rate change, which is a useful property since popular real-world video players are often hosted inside of iframes.
4. At the HTML/JavaScript level, the page's adaptive video player observes the change in bandwidth and reduces quality to 'low'.
    a. As the video continues playback, the page observes that it is dangerously close to the end of the playback stream despite having more chunks in its pending queue.
    b. It sets the quality variable to 'low', which in turn causes the next segment fetch request to request a low-quality version of the segment as opposed to the default 'high' quality version, hence adapting to bandwidth conditions.

Speculative Local Rendering for User Input

Providing a transparent interactive browsing experience in Remote Browser Isolation (RBI) systems is helpful to the widespread adoption of such systems. Unfortunately, interactions in existing RBI systems are far from transparent. One challenge is that the Isolated Browser (IB), under the partial control of guest page JavaScript, may enact arbitrary rendering changes in response to user actions. To achieve high-fidelity rendering, in some embodiments, the Endpoint Browser (EB) must wait for all user action decisions and associated rendering data from the IB prior to rendering the appropriate effect. This synchronous rendering degrades the interactive user-experience in the following ways.

First, it binds interactive response time to the speed of the network and the IB, both of which may be highly variable in real-world scenarios. For instance, an employee in a remote branch office on a dial-up link will notice a significant lag between the time she presses a key and the time the expected character renders on the screen. Or, when the Isolation Service is overloaded, the user may see, among other things, delayed link-highlight animation in response to hovering the mouse over a link. If the network is unreliable, as is often the case on mobile networks, the expected rendering may never even take effect on the EB, giving the impression of a stuck browsing session.

Second, synchronous rendering precludes the activation of browser-native widgets such as the software-keyboard, native context menu, full-screen mode, and new tabs. This stems from a browser requirement that user activations take place in the context of the triggering event, and in particular, while the handler is still on the stack. Unfortunately, there is no known way to meet this requirement reliably on modern browsers since querying the IB for a decision/data requires the use of asynchronous request/response messaging primitives (by contrast, synchronous XHRs are deprecated or no longer honored).

Approach: Speculative Local Rendering

Described herein are embodiments of an approach for rendering the effects of user actions based on optimistic speculation and subsequent correction. Our approach, termed Speculative Local Rendering (SLR), calls for the EB to independently predict the results of user actions and optimistically render those predicted effects. If the prediction is inconsistent with the authoritative action and/or rendering eventually calculated by the IB (misprediction), then the EB takes corrective action.

Speculation allows the EB to independently and asynchronously make rendering decisions, thus providing native response time for a variety of user actions, even if the EB-to-IB network is slow or disconnected. For instance, with speculative rendering engaged, characters typed into an input field will render/echo with native-like latency and link highlights will animate nearly instantaneously when the mouse hovers over a link. Speculation also supports native widget activations: e.g., taps on input fields will show the soft-keyboard and/or IME keyboard, right clicks (or the analogous tap-and-hold on mobile) on images, links and text will render a contextual menu, and full screen and new tab requests will take effect without the need for additional user-activation prompts.

A drawback of naïve speculation is that it is subject to high misprediction rates and, consequently, frequent misrendering. To ensure high fidelity rendering, SLR employs two techniques in various embodiments: Prediction Hinting and Adaptive Correction. Prediction Hinting increases the likelihood of accurate prediction by taking advantage of pre-fetched contextual metadata. For instance, in the case of keyboard input, whether or not an input DOM element has the keyboard focus would inform the decision to optimistically render text glyphs corresponding to the pressed keys. Adaptive Correction allows SLR to quickly correct rendering mistakes, and, to avoid making the same rendering mistakes in the future. In the case of keyboard input, for example, Adaptive Correction entails disabling prediction for input fields that exhibit high misprediction rates.

Example challenges solved by SLR that are pertinent to Clientless Remote Browser Isolation:

- DOM eLement-aware prediction and rendering. Unlike text remoting, the location and nature of interactive content on a web page depends on the page's DOM and CSS. Thus, accurate optimistic rendering calls for awareness of DOM element context: e.g., the decision to echo text and where to echo it depends on what element, if any, has keyboard focus; the decision to highlight a button and how to highlight it depends on the properties of the element being hovered over, and so on. SLR leverages contextual information about DOM elements and their styling to ensure optimistic rendering accuracy.
- Support for a variety of interaction modes and eLements. A web page contains a variety of interactive elements: links/buttons that highlight/glow on mouse hover, images and links that display a context menu on right-click/prolonged tap, and a rich set of input elements such as combo boxes, color dials, date pickers, and content-editable elements in addition to basic text input elements. SLR leverages IB-provided knowledge to identify and optimistically render interactions on all such elements.
- CLientLess operation. Clientless RBI systems, by virtue of their HTML/JavaScript form factor, are limited in what they can do on the Endpoint Browser by its DOM/Scripting APIs. Since SLR is designed to operate in the context of Clientless RBI, it too is constrained in how it can observe input and render content. Thus, techniques that require access to Win32 APIs to interposition on input widgets- - -as is the case with Citrix Local Text Echo- - - are not applicable to this restricted environment.

A new technique is required to address the challenges posed in the Clientless RBI context. SLR alone addresses those challenges.

7. Speculative Local Rendering Method Overview

An example implementation of Speculative Local Rendering works as follows:

1. Upon receiving a user action (e.g., keyboard or mouse input event), EB predicts the rendering output of that action on a target DOM element. EB may leverage prediction hints, such as prefetched Display Lists, to determine what DOM element is being acted upon or to determine what the resulting outcome should be. These hints are expected to be provided in advance, for instance via pre-fetching, so they are available at prediction time.
2. EB optimistically displays the predicted rendering, knowing full well that the prediction may be incorrect. DOM element-specific rendering information, as provided in the prediction hint, is used in the optimistic depiction.
3. Concurrently with or shortly after displaying the predicted rendering, EB informs the IB of the input event and the predicted value.
4. IB injects the received input event into the guest page, thus potentially inducing rendering changes.
5. IB calculates the authoritative rendering and compares it to the predicted value/data; the EB is informed of the comparison result. Alternatively, the EB may perform the comparison.

6. If the prediction is correct, EB finalizes the predicted rendering. Else, EB issues a correction, and optionally, falls back to synchronous input rendering mode (adaptive correction) AND/OR displays a notification--potentially near the point of correction--to alert the user.

8. Speculative Local Rendering for Pointer Device Input

SLR can be applied predictively to render the outcomes of pointer actions (mouse, touch, stylus, etc.), thus significantly improving the end-user interaction experience on high-latency networks. Specifically, the techniques described in this section may be used to:

- Trigger native UI widgets
    - Example: trigger the native context menu on right-click / long-tap: e.g., of an image or link.
    - Example: trigger native link handling behavior when clicking / tapping on links: e.g., on mobile, app-specific URLs should launch the mobile app registered with that URL.
    - Example: trigger the native text selection widget, which presents copy-paste actions, when user long-taps on text in her mobile browser
    - Example: trigger a soft-keyboard and/or IME input when the user taps on an input box
- Render user-interaction triggered animations locally on the EB
    - Example: link-highlight animation
    - Example: CSS hover, focus, and active effects (as made possible by the CSS :hover, :focus, and :active pseudo-selectors)
    - Example: change mouser pointer cursor to reflect element being hovered upon: e.g., hand icon for links, but text selection icon for text elements A. Example Method

9.

SLR is applied in the context of the EB's mouse input event handler as follows:
1. EB predicts what content to render in response to said mouse event
    a. EB identifies the DrawDisplayListOp that falls underneath the mouse pointer by conducting a Hit Test
    b. EB inspects the metadata embedded within the DrawDisplayListOp to determine what content to render for the given event
        i. For example, if the metadata indicates that an input element was tapped, then EB knows that it should render the native soft-keyboard and/or IME input keyboard (a native UI widget)
        ii. For example, if the metadata indicates that a link or image element was right-clicked (or long tapped on mobile devices), then EB knows that it should render the native contextual menu for the link or image (again a native UI widget)
        iii. For example, if the metadata indicates that a link was hovered upon, then EB knows that it should render the link with a highlighting effect as dictated by the page's CSS
2. EB renders predicted content, crucially, within the same event handler context
    a. If EB predicts the display of a native UI widget (e.g., soft-keyboard, right-click context menu, etc.), EB triggers the display of the predicted widget with the use of Shadow Elements (SEs). There are several example ways to do this:
        i. Event-Time Shadow Element Creation and Positioning
            1. EB dynamically inserts a lone SE into the DOM in the context of the event handler; the SE is located underneath the tap location; the Shadow Element is initialized with the properties of the element that was hit (e.g., image elements have a Shadow Element with an <img> are initialized with at least the image's URL).
            2. Several browser implementations recognize the dynamically inserted SE and ensure that the event is delivered to it, even though it did not exist prior to event dispatch.
            3. Upon receiving the event, the Shadow Element naturally triggers browser-native event response, which is the predicted native UI widget.
        ii. Render-Time Shadow Element Creation and Positioning
            1. EB dynamically creates and inserts SEs for multiple/all elements of interest when a Layer's DisplayList is rendered. The elements are inserted into a special hit-test div that stacks on top of all other content to ensure that hit tests work as intended.
            2. For example, if a page has an input, text, link, and image elements, then SEs are created and positioning (in the viewport coordinate space) for each such element and placed into the hit-test div.

3. SE elements are stacked in DisplayList paint order to ensure that user interactions simulate native hit-test behavior: e.g., top-most input SE gets the click.
4. Benefit: allows third-party applications to understand semantic content of page by reading the Shadow Elements.
  b. If EB predicts the animation of page content (as opposed to the triggering native UI widgets), EB performs said animation as follows:
    i. Pre-requisites:
      1. DrawDisplayList ops are augmented to reference multiple potential sub-DisplayLists, one for each mouse state of interest. For example, the DrawDisplayList op for a link would have at least two drawings: one corresponding to the hover state (e.g., with link highlighting) and another corresponding to the no-hover state.
      2. Rasterizers are modified to draw the DisplayList that corresponds to the element's current state: e.g., if the mouse is hovering over a link element, then only the link's hover DisplayList will be drawn.
    ii. EB updates the draw state of the hit element in a global DrawState map, and forces a redraw of the Layer that hosts the hit element
    iii. Upon (re)draw, EB renders the appropriate sub-DisplayList for the element's current state as indicated by the DrawState map.
3. Concurrently with prediction, EB informs IB of the mouse action and associated details.
4. EB reverts the locally predicted rendering if the IB indicates that there is a misprediction.
  a. Reverting the display of UI widgets entails removing the corresponding Shadow Element from the DOM.
  b. Reverting the rendering of animations entails removing the animation from the corresponding element DisplayList and then inducing a redraw of the layer's DisplayList.

B. Hit Testing

Before EB can predict what to render, it first conducts a Hit Test. A Hit Test is a search procedure that identifies the element that falls underneath the current mouse or tap position. Hit tests are conducted entirely on EB-local data structures, thus allowing it to be done entirely within event handler context. The Hit Test works by first identifying the Layer underneath the point of interest, and then by identifying the top-most draw op hit within that layer's DisplayList.

For DisplayList hit testing to work, we augment DrawDisplayListOp with information about the location and identity of the element that that op corresponds to, as follows.

```
module<standard> Common::Drawing {
    enum ElementType:
        kUntracked = 0,
        kImage,
        kEditable,
        kLink
    class DrawDisplayListOp inherits DrawOp:
        prop drawing_by_state : Map<DrawingState, DisplayList>
        prop element_type : ElementType
        prop element_id : int
        prop src_url : string | None # valid for image elements only
        func DrawDisplayListOp( ) -> None:
            DrawOp(kDrawDisplayList)
}
```

In an example implementation, the IB's Renderer is modified to generate DrawDisplayListOp objects with the required element properties (e.g., element_type, etc.). Additional element properties can be included to enhance the prediction: e.g., whether or not a context-menu event handler is registered on the element can be used to determine if the EB should display the native context-menu.

Upon mouse or touch input, the |hitTest| function detailed below may be invoked to identify the DrawDisplayListOp that was hit.

```
module<NN> EndpointBrowser::ThinClient {
    # Maps a point in the viewport coordinate space to the layer's local coordinate
    # space.
    func<standard> Layer::inverseViewportProject(viewport_pt : Point) -> Point
    # Returns the first DrawDisplayListOp that is hit at point |pt|.
    func hitTest(pt : Point) -> DrawDisplayListOp | None
        # Check layer closest to user first. Note that |layer_tree| corresponds to EB's
        # local copy of the IB's Layer Tree.
        for layer in reversed(layer_tree.preOrderList( )):
            # Visit top-most ops first.
```

-continued

```
        for op in reversed(dl.draw_ops):
            if (op.type == kDrawDisplayList and
                    op.element_type != ElementType::kUntracked and
                    op.bounds.intersects(layer.inverseViewportProject(pt))):
                return op
        # No items of interest found at |pt|.
        return None
}
``` c. Triggering Native UI Widgets with Shadow Elements

One idea behind Shadow Elements is to direct browser-generated input events to hidden DOM elements that trigger the expected native behavior (e.g., display a widget). There are multiple ways to direct input events to the appropriate Shadow Element. The following are two example methods. The first focuses on pre-creating and pre-positioning Shadow Elements (one for each element of interest) at DisplayList render time. The second focuses on dynamically creating and positioning the relevant Shadow Element at event time.

Detailed herein is the method of dynamically inserting a Shadow Element at the time of an input event (e.g., tap or click). It relies on the ability to conducts EB-local hit tests within event handler context.

```
module<NN> EndpointBrowser::ThinClient {
    # References the current Shadow Element if any.
    prop shadow_element : HTMLElement | None
    # Projects |rect| on to its final rendered position on the viewport,
    func projectToViewportSpace(rect : Rect) -> Rect
    # Standard API for listening for touch and mouse gestures. TC supports basic
    # gestures such as 'tap', 'click', 'long-tap', 'scroll', 'pinch', etc.
    func<standard> addGestureListener(event_name : string, fn : Function,
                options: Map<string, string>) -> None
    # Returns true if |e| corresponds to a context-menu activation click (e.g.,
    # right-click on a mouse, or long-tap on touch-screen devices).
    func<standard> isContextMenuClick(e : Event) -> bool
    # Returns the shadow element to use, if any, else returns None.
    func createShadowElement(op : DrawDisplayListOp, e : Event) -> HTMLElement | None
        node = None
        if op.element_type == ElementType::kInput:
            node = document.createElement('textarea')
        elif op.element_type == ElementType::kImage and isContextMenuClick(e):
            node = document.createElement('img')
            node.src = op.src_url # Must be valid for "Open in new tab . . . " option to work
        elif op.element_type == ElementType::kLink and isContextMenuClick(e):
            node = document.createElement('a')
            node.setAttribute('href', op.src_url)
        return node
    func updateShadowElement(op : DrawDisplayListOp, e : Event) -> None
        # Remove the existing shadow element, if any.
        if shadow_element:
            shadow_element.parentNode.removeChild(shadow_element)
            shadow_element = None
        if not op:
            return # Nothing of interest was hit. Do nothing.
        shadow_element = createShadowElement(op, e)
        if shadow_element:
            # Position and insert the shadow element into the DOM so that it too can
            # receive the event e .
            shadow_element.style.position = 'fixed'
            shadow_element.style.opacity = '0' # hide the element from the user
            projectToViewportSpace(op.bounds).setStyle(shadow_element)
            shadow_element.op = op # Used layer by event handlers
            document.body.insertChild(shadow_element)
    func onGesture(e : GestureEvent) -> None
        updateShadowElement(hitTest(e.point), e)
    # We cannot know what point will be hit prior to the event and thus we
    # dynamically insert the shadow element upon event reception. In turn, that implies
    # that we intercept the event during the capturing phase of event propagation
    # to ensure that the shadow elements will also receive and process the event.
    addGestureListener(['touch-down' , 'click', 'context-menu'], onGesture,
                {capture: true})
}
```

D. Rendering Pointer-Initiated Animations

Some events, such as hovering, require local drawing updates, for example, to render the link highlight effect. Since an aim is to avoid consulting the IB for the requisite hover drawing when the event occurs, we have it pre-fetched and ready for query prior to the event. We can satisfy this requirement by including the hover drawing as part of the element's DrawDisplayListOp, as follows:

```
module<NN> EndpointBrowser::ThinClient {
    enum Drawingstate:
        kDefault = 0,
        kHover = 1
    class DrawDisplayListOp inherits DrawOp:
        # IB's Renderer is modified to generate this map at paint time. While we
        # expect most DrawDisplayListOp objects to have only one drawing, we can expect
        # link and elements with CSS hover state to have multiple.
        prop drawing_by_state : Map<DrawingState, DrawDisplayListOp>
        . . .
}
```

When rendering content, EB selects the appropriate drawing for any given DrawDisplayListOp. The following details one way to do this for hover animations.

```
module<NN> EndpointBrowser::ThinClient {
    # Tracks the element that is currently being hovered over,
    prop hovered_element_id : int
    func onMouseMove(e : MouseEvent) -> None
        op = hitTest(e)
        if op and op.element_id:
            hovered element id = op.element_id
}
module<NN> EndpointBrowser::ThinClient::Tiling {
    class Canvas2DTileWithHoverAnimation inherits Canvas2DTile:
        func rasterOneOp(ctx : 2DCanvasContext, op : DrawOp) -> None
            if op.type = = kDrawDisplayList:
                # Not all DrawDisplayList ops have hover drawings.
                if (hovered_element_id = = op.element_id and
                    op.drawings_by_state.hasKey(Drawingstate::kHover)):
                    state = Drawingstate::kHover
                else:
                    state = Drawingstate::kDefault
                raster(op.drawings_by_state[state])
            else:
                Canvas2DTile::rasterOneOp(ctx, op)
}
```

Speculative Local Rendering for Keyboard Input

We apply SLR to optimistically render the outcomes of keystrokes on input fields. SLR allows the EB to locally echo keystroke characters without waiting for roundtrip confirmation from the IB, thus significantly improving the end-user interaction experience on high-latency networks. The input fields that are in scope include editable DOM elements such as HTMLInputElement, HTMLTextAreaElement, as well as DOM elements marked with the contenteditable attribute.

Method

We apply SLR to keyboard input directed at editable elements, as follows:

1. For each keypress, the EB predicts the new state of the editable and stores that state in a Tentative Input Buffer (TIB) associated with the field.
    a. We define the TIB as follows:
        ```
        module<NN> EndpointBrowser::ThinClient {
        class TIB:
            prop predicted_text : string
            prop selection_start : int
            prop selection_end : int
        }
        ```
        Note that |selection_end| tracks the current cursor location in addition to denoting the end of the selection range.
    b. Each editable on the page has an element_id that is used to index into a map of TIBs. The active element_id is tracked at all times such that the focus of input is easily determined.

-continued c. While SLR is supported on the editable, the associated TIB is kept up-to-date with key presses: e.g., if user types the keys h and i, then the buffer would contain the string 'hi'. If the user then presses backspace, then the buffer would be updated to 'h', More generally, the character and cursor action correspond to the native character and cursor action absent overrides by JavaScript.

d. In response to the keypress, EB also informs the IB of the keypress event, as done by default (without SLR).

i. When the backend receives the keypress from the client, IB injects the keystroke into the page as it would normally. Though uncommon, the page's JavaScript may prevent the default action of the keystroke and/or make additional modifications to the element's value, and that scenario is accounted for.

2. EB renders the TIB entirely locally, without synchronously consulting the IB a. One challenge is that rendering involves transforming the TIB into a sequence of positioned glyphs and performing selection highlighting and caret placement. Significantly, glyph positioning is done without consulting the IB, which is a challenge given the need to do EB-side text shaping (entire libraries such as HarfBuzz are dedicated to handling the complexities of text-shaping).

b. For RBI systems that render content by mirroring DOM elements (e.g., DOM based RBI systems), meeting this challenge is a matter of allowing the default keystroke action on the mirrored element. So long as the mirrored element's state accurately reflects the TIB, the browser's native text rendering machinery takes care of selecting and positioning the appropriate glyphs as well as positioning and animating the caret.

c. For Remote Compositing based RBI systems (as detailed in this document), rendering is similar to the DOM-mirroring approach: a real DOM element may be used to lay out and render the appropriate glyphs for the input field. For the DOMTile raster target, the details are given in the DOMTileWithEditable class. For the Canvas2DTile raster target, additional work is needed to raster the DOM element and composite it onto a Canvas: see details in the Canvas2DTileWithEditable class.

3. EB continuously watches for mispredictions of the target field a. Misprediction occurs when the history of IB element values (authoritative) diverges from the history of predicted EB element values b. There are several ways to detect history mismatches:

i. One method is as follows:

1. When the TIB string changes, have the EB calculate a hash of the new string, called the TC-VALUE-HASH, and send it to the IB.

2. When IB's element value changes, or when TC-VALUE-HASH is received, compare the hash of the IB's value against the TC-VALUE-HASH sent by the EB.

3. If they are not equal, notify the TC of misprediction along with the authoritative IB value for the field ii. Another method is as follows:

1. EB maintains a history of local field changes, which we term the Local Value List (LVL).

2. IB detects changes to the input field and reflects them back to the EB to aid in misprediction detection.

3. Upon receiving a reflected field update from the IB, the EB finds the matching entry in the LVL and removes all preceding entries, thus deeming all prior inputs as finalized.

4. If the EB cannot find a matching entry in the LVL, it reports a misprediction.

5. Optionally, to avoid long history divergences, the EB may report a misprediction if tentative input cannot be finalized fast enough.

6. In regard to (5), the rate at which LVL entries are expected to be finalized can be dynamically adjusted to network latency conditions: e.g., EB should wait for a longer period before reporting a misprediction if the network is known to high latency.

7. Optionally, LVL entries pending finalization may be indicated as such via the UI indicators: e.g., by having the EB underline tentative text.

iii. Yet another method is to combine schemes (i) and (ii), as they are complementary.

4. Upon detecting misprediction, EB falls back to synchronous echo mode: it disables speculative rendering on the element, discards tentative input, and henceforth displays only the IB provided values.

a. Fallback is initiated by deleting the TIB associated with the editable, as done by |onMisprediction|.

b. In DOM Mirroring mode, the TC reinitializes the field with the IB-supplied field value and suppresses further local key echo (i.e., default behavior) on the mirrored element.

- c. In Remote Compositing mode, the TC will render the IB provided value once it sees that there is no TIB associated with the field.
- d. Regardless of the rendering method, input that was never finalized is discarded.
- e. Optionally, an in-page UI indicator is used to alert the user when input history has been discarded. The indicator would be rendered by either the EB or IB.
- f. Alternative formulations may attempt to re-enable speculation for the field at a later time, for instance, if the rate of misprediction is found to be low.

Tentative Input Buffer (TIB)

An example of the setup and cleanup of a simple TIB as follows.

```
module<NN> EndpointBrowser::ThinClient {
    # Maps from element id to TIB. SLR is enabled only for elements in this map.
    prop tib_map = Map<int, TIB>
    # Invoked when IB notifies TC of a newly inserted editable DOM element,
    func onEditableInserted(element_id : int, initial_text : string,
            initial_sel_start : int,
            initial_sel_end : int) -> None
        tib = TIB( )
        tib.text = initial_text
        tib.selection_start = initial_sel_start
        tib.selection_end = initial_sel_end
        tib_map[element_id] = tib
    # Invoked when IB notifies TC of editable DOM element removal.
    func onEditableRemoved(element_id : int) -> None
        tib_map.remove(element_id)
    # Invoked when IB informs TC of misprediction.
    func onMisprediction(element_id : int) -> None
        tib_map.remove(element_id) # Disable speculation
    # Send key press to IB: needed so that IB can run guest page event handlers and
    # calculate the authoritative value of the input field.
    func onKeyPress(e : Event) -> None
        ws.send(['keypress', e.keyCode])
}
```

IME-Compatible TIB Update Mechanism

One approach to updating the TIB is to have the EB listen for key events and update the TIB accordingly: insert the character corresponding to the key at the current TIB cursor location. However, that approach can possibly fail in the case of IME events as those events do not generate key events. The following details an alternative method that does work with IME. We employ a Shadow Element (introduced earlier) that notifies us of both IME and non-IME input events alike.

```
module<NN> EndpointBrowser::ThinClient {
    # Updates TIB selection in response to shadow element selection changes.
    func onSelectionChange(e : Event) -> None
        se = e.target
        sel = se.getSelection()
        tib = tib_map[se.op.element_id]
        tib.selection_start = sel.startOffset
        tib.selection_end = sel.endoffset
    # Updates TIB text in response to shadow element input changes (e.g., IME input).
    func onInputChange(e : InputEvent) -> None
        se = e.target
        tib = tib_map[se.op.element_id]
        tib.predicted_text = se.value
        # Send the VALUE-HASH of the shadow element's text content to IB; needed for
        # misprediction detection. Sending the raw TIB text is an alternative,
        # albeit less network-efficient.
        ws.send(['value-hash', SHA256(tib.predicted_text)])
    # Dynamically inserts a shadow element that listens for input and selectionchange
    # events.
    func onGesture (e : GestureEvent) -> None
        updateShadowElement(hitTest(e.point), e)
        if shadow_element and shadow_element.op.type == ElementType::kEditable:
            shadow_element.addEventListener('input' , onInputChange)
            shadow_element.addEventListener('selectionchange', onSelectionChange)
        addGestureListener(['touch-down', 'click'], onGesture, {capture: true})
}
```

An alternative method, specific to devices with mouse-based pointing devices, involves preemptively inserting the Shadow Element at the anticipated location of the mouse click. The anticipated location corresponds to the most recent mouse pointer position, and that may be tracked by intercepting mousemove DOM events.

Local Field Rendering

To ensure network-independent input response, the EB must draw the TIB content without consulting the D3 on the key rendering critical path. The Remote Compositing system can achieve this by augmenting the DisplayList structure with a new operation, called DrawTextField, that enables the EB to locally draw TIB content and keep that drawing up-to-date as the TIB content changes. The DrawTextField op conveys position, size, text style (e.g., font), as well as text selection range, cursor location, and current IB-generated drawops for the editable (used for synchronous fallback).

An alternative formulation piggybacks editable information in an existing operation such as DrawDisplayList rather than create a distinct DrawTextField op, but uses a distinct operation as it is simpler for exposition. Moreover, IB's Renderer is modified to generate a DrawTextField operation for each editable element that it paints into a DisplayList. Finally, the DrawTextField op corresponds only to the editable component (the part that hosts the input text) of the editable element; it does not include background styling components (e.g., outline, focus ring, etc.), and we expect the Renderer to generate the draw ops for those separately (e.g., as part of a parent DrawDisplayList operation).

```
module<standard> Common::Drawing {
    enum DrawOpType:
        kSave = 0,
        kRestore,
        kClip,
        kDrawPath,
        kDrawText,
        kDrawImage,
        kDrawDisplayList,
        <NN>kDrawTextField
    class<NN> DrawTextField inherits DrawOp:
        # Unique identifier for the DOM editable element that hosts this text input
        # field. This is assigned by the IB's Renderer.
        prop element_id : int
        # Corresponds to IB's value for the field (authoritative); EB renders this only
        # if speculation is disabled for the field.
        prop content : DrawDisplayListOp
        # The CSS font styling of the field contents; needed to identify glyphs to draw
        # for speculative rendering.
        prop font : string
        # Additional CSS styling to be applied: e.g., for alignment, indentation, and
        # inner margin.
        prop formatting : Map<string, string>
}
```

The tiling subsystem must also be augmented to handle the new DrawTextField op. Example implementations for the DOMTile and Canvas2DTile targets are given below.

```
module<NN> EndpointBrowser::ThinClient::Tiling {
    class DOMTileWithEditable inherits DOMTile:
        func rasterOneOp(op : DrawOp) -> None
            if op.type == kDrawTextField:
                tib = tib_map[op.element_id]
                if tib:
                    drawTIB(tib)
                else:
                    raster(op.content)
            else:
                DOMTile::rasterOneOp(op)
    class Canvas2DTileWithEditable inherits Canvas2DTile:
        func rasterOneOp(ctx : 2DCanvasContext, op : DrawOp) -> None
            if op.type == kDrawTextField:
                tib = tib_map[op.element_id]
                if tib:
                    drawTIB(ctx, tib)
                else:
                    raster(op.content)
            else:
                Canvas2DTile::rasterOneOp(ctx, op)
}
```

Note that TIB contents are drawn only while SLR is enabled for the given element id. If disabled (e.g., due to misprediction), the tile draws the IB generated field contents (op.content).

Drawing the TM (drawTIB)

The EB aims to draw the contents of the TIB entirely locally based only on DisplayList information (most notably the DrawTextField op), thus avoiding consultation with the D3 on the field-rendering critical path. To achieve this, several details of text field rendering are addressed, most notably:

Glyph selection: for each character in the field, the glyph that matches the font style (family and size) of the input field is obtained.

Glyph positioning: a determination is made of where to place each glyph, and that requires the use of text shaping/layout and word-wrapping algorithms to ensure a native-like rendering of text content (multi-line content in particular).

Caret positioning and selection highlighting: the caret is drawn at the appropriate TIB specified location and highlight selected glyphs (if any).

We achieve local drawing by using a real DOM editable element, called the EDITABLE-ELEMENT, to emulate the editable field. The idea is to configure EDITABLE-ELEMENT with styling and attributes (as indicated by the DrawTextField op) that closely matches the IB rendering of the element. One benefit of this approach is that it leverages the EB's native glyph selection, text shaping, and selection mechanisms to render the field.

Local emulation with the EDITABLE-ELEMENT is a natural fit for the DOMTile rasterization target: emit the appropriately styled editable DOM element (e.g., an HTMLTextAreaElement) upon encountering a DrawTextFieldOp. See DOMTileWithEditable::drawTIB for details.

However, if the Canvas2DTile target is desired, then rasterization is complicated by the need to transform the EDITABLE-ELEMENT into canvas pixels. We can achieve this transformation by leveraging the fact that most browsers (Chrome, Firefox, and Safari) have the ability to render DOM content onto an HTMLCanvasElement via SVG foreignObjects. Specifically, on supported browsers, one can wrap a DOM element (the editable DOM element in our case) in a SVG foreignObject, and then invoke ctx.drawImage to rasterize the SVG onto a HTMLCanvasElement.

Details for DOMTile and Canvas2DTile targets are as follows:

```
module<NN> EndpointBrowser::ThinClient::Tiling {
    func createEditableElement(op :
    DrawTextFieldOp, tib : TIB) -> None
        # One may use alternative elements such
        as 'div' or 'input', so long as it can
        # render an area of formatted text.
        ta = document.createElement('textarea')
        op.bounds.setStyle(ta)
        ta.style.font = op.font
        for key, value in formatting:
            ta.style[key] = value
        ta.value = tib.predicted_text
        ta.setSelectionRange(tib.selection_start, tib.selection_end)
        return ta
    func DOMTileWithEditable::drawTIB(op :
            DrawTextFieldOp, tib : TIB) -> None
        cursor.appendChild(createEditableElement(op, tib))
    # Returns an SVG drawing that has |element|
    embedded within it via the
    # foreignObject element, a well-known technique.
    func<standard> wrapWithSVG(element :
    HTMLElement) -> HTMLSVGElement
    func Canvas2DTileWithEditable::
    drawTIB(ctx : 2DCanvasContext,
            op : DrawTextFieldOp,
            tib : TIB) -> None
        ta = createEditableElement(op, tib)
        svg = wrapWithSVG(ta)
        ctx.drawImage(svg)
```

Speculative Local Rendering Examples

We demonstrate the effectiveness of the combined Mouse and Keyboard SLR schemes on the following HTML page:

```
<!DOCTYPE html>
<html>
<title>Welcome to WidgetCorp</title>
<body>
  Username: <input id='username'/>
  Password: <input id='password'/>
  <a href='privacy.html'>Privacy Policy</a>
  <script>
    var u = document.getElementById('username');
    u.addEventListener('keypress', function (e) {
      if (e.charCode === '-') {
        e.preventDefault();
      }
    });
```

```
</script>
</body>
</html>
```

The page is a simplified version (styling and JavaScript removed) of authentication portals seen on many sites. The page does some basic validation of the username field by preventing the use of invalid characters (a hyphen in this case). In this example, we assume the page is served from the imaginary domain example.org.

Compositor Commits (Needed to Understand Scenarios Below)

Upon loading the page at example.org, IB generates and transmits to the TC a sequence of Commits. The first commit in that sequence, $C\_\{0\}$, is:

```
* Root
    o Layer A (background)
        - Display List A
    o Layer B (login form)
        - Display List B
``` where Display List A draws the following:

```
1. DrawRect(0, 0, 1024, 768, kWhite) // draws a white background
2. DrawDisplayList(0) // draws DisplayList for "Privacy Policy" link
```

Display List B consists of drawings for the "Username" and "Password" text and associated input fields, as follows:

```
1. DrawText(0, 0, "Username") // draws "Username" text
2. DrawText(0, 30, "Password") // draws "Password" text
3. DrawDisplayList(1) // draws display list for username input field (id 1)
4. DrawDisplayList(2) // draws display list for
password input field (id 2)
```

DrawDisplayListOp 0 corresponds to the "Privacy Policy" link and has the following property values.

```
DrawDisplayListOp_0 = {
  bounds: [30, 60, 60, 80],
  element_type: ElementType::kLink
  element_id: 2
  src_url: "http://www.example.org",
  drawing_by_state: {kDefault: DisplayList_0_Default,
  kHover: DisplayList_0_Hover}
}
```

Display Lists 1 and 2 correspond to the input elements, and have the following property values:

```
DrawDisplayListOp_1 = {
  bounds: [30, 0, 80, 20],
  element_type: ElementType::kEditable,
  element_id: 3
  src_url: None
  drawing_by_state: {kDefault: DisplayList_1_Default}
}
DrawDisplayListOp_2 = {
  bounds: [30, 30, 80, 50],
  element_type: ElementType::kEditable,
  element_id: 4
  src_url: None
  drawing_by_state: {kDefault: DisplayList_2_Default}
}
```

The "Privacy Policy" DisplayList has two sub-DisplayLists, one for each draw state, where DisplayList_0_Default corresponds to the no-hover state and DisplayList_0_Hover corresponds to the hover state drawing. The former simply draws the text "Privacy Policy" while the former draws the same text but in a different color (the link highlight color).

The IB's default style sheet specifies that all links should change color on hover, hence the login page need not specify the link hover style explicitly in its HTML.

DrawDisplayListOp_1 and DrawDisplayListOp_2 do not have hover-state drawings. They host the input text field and a rectangle that marks the bounds of the text field as follows:

```
DisplayList_1_Default = {
    draw_ops: [DrawRectOp_1, DrawTextFieldOp_1]
}
DisplayList_2_Default = {
    draw_ops: [DrawRectOp_2, DrawTextFieldOp_2]
}
```

The DrawTextFieldOp draw ops specify the essential details (e.g., font style to use) of how to locally render text within the field:

```
DrawTextFieldOp_1 = {
    element_id: 5,
    content: DrawDisplayListOp_3,
    font: "Arial 11px regular",
    formatting: {margin: 5}
}
DrawTextFieldOp_1 = {
    element_id: 6,
    content: DrawDisplayListOp_4,
    font: "Arial 11px regular",
    formatting: {margin: 5}
}
```

Note that DrawDisplayListOp_3 and DrawDisplayListOp_4 both reference the text content as rendered by the IB. As explained earlier, the TC render that only if it has fallen back to synchronously rendering the field.

Scenario 1: Tap Interaction on a Mobile Browser

We demonstrate that SLR enables the triggering of native UI widgets and animations in response to tap actions on a mobile Endpoint Browser.

Interaction Flow

The interaction flow with a hypothetical user named Alice is as follows:
1. Alice directs her EB to visit http://www.example.org
   a. Alice's EB is a mobile browser: e.g., an iPhone 8 running iOS 12 (Mobile Safari 12)
2. The page loads through the RBI service
   a. As usual, the service intercepts the request, serves the Thin Client which then directs the IB to load the page
   b. IB's Compositor starts sending Compositor Commits to the Thin Client, and Thin Client renders Commits as it gets them
3. Alice sees a username input field and taps on it
   a. Tap triggers the display of the soft-keyboard on her mobile browser
4. Alice then performs a context-menu click (tap-and-hold on mobile) on the "Privacy Policy" link
   a. The tap triggers the link highlight effect, thus changing the color of the link
   b. The tap triggers a native link-specific context menu with a "Open in New Tab" option that, once selected, causes the Privacy Policy page to be opened in a new browser tab Tap on Input Element When Alice, on her mobile browser, taps on an input field at viewport position (40, 10), a Shadow Element is used to trigger the native soft-keyboard as follows:
1. EB generates a pair of touch events: one for the touch-down and another for the touch-release.
   a. The events indicate that the touch position is x = 40, y = 10, which is within the bounds of the Username input element.

b. Upon touch-down, the TC invokes the onGesture function to field the "touch-down" gesture, while still in the context of the touch-down touch event handler.
2. onGesture does the following:
   a. Performs a local hitTest at the position indicated in the touch-down gesture, which ends up returning DrawDisplayListOp_1
      i. Layer hit test returns Layer B
      ii. Within Layer B, DrawDisplayListOp_1 lies directly underneath tap position
   b. Dynamically inserts an <input> shadow element at the bounds indicated by DrawDisplayListOp_1
      i. The Shadow Element is stacked above all other nodes in the EB's DOM
      ii. The Shadow Element DOM node is:
         10. ```
         11. <input style='position: fixed; opacity: 0; left: 30 px; top: 0 px; width: 50 px; height: 20 px;'>
         12. ```
3. Upon returning from onGesture, the touch-down event propagates to the next DOM element in the event propagation path, which is expected to be the <input> Shadow Element we dynamically inserted.
4. The same <input> Shadow Element also receives the following touch-release event, thus triggering the display of the soft-keyboard widget, which is the default behavior for a shot tap on an input element.

Context-Menu Click on "Privacy Policy" Link

When Alice conducts a tap-and-hold gesture induced context-menu activation on the "Privacy Policy" link, the following occurs:

1. EB generates a touch-down event followed eventually by a touch-release event
   a. The touch was made at position x = 40, y = 10, which is within the bounds of the "Privacy Policy" link element.
   b. Upon touch-down, the TC invokes the onGesture function to field the "touch-down" gesture, while still in the context of the touch-down touch event handler.
2. onGesture does the following:
   a. Performs a local hit-test at the tap position indicated in the event, which ends up returning DrawDisplayListOp_0
      i. Layer hit test search returns Layer A
      ii. Within Layer A, the hit test search returns DrawDisplayListOp_0, since the background rectangle stacks below it
   b. Sets the actively hovering element id to the one indicated in DrawDisplayListOp_0, and forces redraw of the layer
   c. Dynamically inserts an anchor (<a>) Shadow Element at the bounds indicated by DrawDisplayListOp_0
      i. The Shadow Element is stacked above all other nodes in the EB's DOM
      ii. The Shadow Element DOM node is:
         13. ```
         14. <a href='http://example.org' style='position: fixed; opacity: 0; left: 30 px; top: 60 px; width: 30 px; height: 20 px;'>Privacy Policy</a>
         15. ```
3. The touch-down event propagates to the next DOM element in the event propagation path, which is expected to be the <a> Shadow Element the TC had dynamically inserted.
4. The EB internally observes that the touch-release event has yet to fire (indicating a long-tap is in progress), which in turn induces it to display the native link context menu, which is the default behavior for long-pressing on a link element.

| |
|---|
| 5. Layer redraws its DisplayList in the next animation frame, at which point it observes that the element id corresponding to DrawDisplayListOp_0 is being hovered upon (per hovered_element_id), and consequently draws that draw op's hover drawing instead of the default one. |

A similar sequence of events occurs on desktop EB with the right-click context-menu trigger.

Scenario 2: Keyboard Input on a Desktop or Mobile Browser

We demonstrate that SLR enables typed characters to be echoed entirely locally on the EB, and that SLR successfully recovers from mispredictions.

Interaction Flow

| |
|---|
| The interaction flow with a hypothetical user named Alice is as follows:<br>1. Alice directs her EB to visit http://www.example.org using either a soft-<br>    a. Alice's EB may be a desktop or mobile browser.<br>       keyboard or a hardware keyboard.<br>2. The page loads through the RBI service<br>    a. As usual, the service intercepts the request, serves the Thin Client which then directs the IB to load the page<br>    b. IB's Compositor starts sending Compositor Commits to the Thin Client, and Thin Client renders Commits as it gets them<br>3. Alice sees a username input field and taps on it (click on desktop)<br>    a. The tap is directed to the corresponding input Shadow Element<br>    b. The input method for the field is shown: e.g., a soft-keyboard widget or an IME widget.<br>4. Alice then enters her username 'alice' into the input field<br>    a. As each character is typed, Alice observes an immediate character echo with no perceptible network-related latency<br>    b. As she types, she sometimes mistypes, and corrects those errors<br>    c. At one point, she types an illegal character that gets dropped, thus causing an SLR misprediction<br>5. Alice repeats steps 3 and 4 on the password field, though she avoids typing any illegal characters this time. |

Local Rendering

For this trace, an assumption is made that TC is configured to render using Canvas2D tiles.

| |
|---|
| 1. When Alice types the character 'a' into the username input field, the following sequence of events occur:<br>    a. EB generates an 'input' event on the corresponding Shadow Element<br>       i. The onInputChange function is invoked<br>    b. onInputChange function updates the TIB with the latest value from the Shadow Element as follows:<br>       i. It looks up the TIB for the Shadow Element<br>       ii. It updates the predicted_text property of the element's TIB<br>       iii. The contents of the TIB after the update are as follows:<br>           tib = {<br>             predicted_text: "a",<br>             selection_start: 1,<br>             selection end: 1<br>           }<br>           Note that the selection start and end have been updated to reflect the new cursor location immediately after the "a",<br>    c. TC renders the updated content of the TIB in the next animation frame<br>       i. Assuming that TC is configured to render using Canvas2D tiles, Canvas2DTileWithEditable::drawTIB executes.<br>       ii. It creates a local EDITABLE-ELEMENT:ctextarea style='left: 30 px; top: 0 px; width: 50 px; height: 20 px;'><br>       iii. It sets the selection of the EDITABLE-ELEMENT to be 1 (for both start and end).<br>       iv. It wraps the EDITABLE-ELEMENT in SVG (not yet attached to the DOM).<br>       v. It draws the SVG onto the target location, as indicated the text field's draw op, on to the Canvas2D canvas.<br>       vi. Alice sees the text "a" echoed in the input field, with no apparent delay. |

2. When Alice types the character 'k', the same sequence of events as in (1) occurs, except that:
   a. the element's TIB contents now contains:

'''
      tib = {
         predicted_text: "ak",
         selection_start: 2,
         selection end: 2
      }
      '''

Note that the selection start and end have been updated to reflect the new cursor location immediately after the "ak".
   b. Alice now sees the text "ak".
3. Alice realizes she mistyped, so she presses the Backspace key, in which case the same sequence of events as in (l) occurs, except that:
   a. the element's TIB contents now contains:

```
      tib = {
         predicted_text: "a",
         selection_start: 1,
         selection end: 1
      }
      ```

Note that the selection start and end have been updated to reflect the new cursor location immediately after the "a".
   b. The TIB is rendered in the same way, except that Alice now sees the text "a".
4. When Alice types the character 'i', the same sequence of events as in (1) occurs, except that:
   a. the element's TIB contents now contains:

```
      tib = {
         predicted_text: "ai",
         selection_start: 2,
         selection end: 2
      }
      ```

Note that the selection start and end have been updated to reflect the new cursor location immediately after the "ai".
   b. The TIB is rendered in the same way, except that Alice now sees the text "ai".
5. Alice again realizes the mistake, and presses the left arrow key, in which the same sequence of events as in (1) occurs, except that:
   a. the element's TIB contents now contains:

```
      tib = {
         predicted_text: "ai",
         selection_start: 1,
         selection end: 1
      }
      ```

Note that the selection start and end have been updated to reflect the
6. When Alice types the character '1', the same sequence of events as in (1) occurs, except that:
   a. the element's TIB contents now contains:

'''
      tib = {
         predicted_text: "ali",
         selection_start: 2,
         selection end: 2
      }
      ```

Note that the selection start and end have been updated to reflect the new cursor location immediately after the "al".
   b. The TIB is rendered in the same way, except that Alice now sees the text "ai" with the cursor positioned between the "a" and "i".

C. Misprediction Handling

Continuing the trace from the previous section, the following demonstrates how mispredictions can be handled:

7. Alice then mistakenly types the hyphen characterThis triggers misprediction and correction as follows:
   a. The page JavaScript, running on the IB, intercepts the key press and, having determined that the character is not permissible in the username field, prevents the default action (which is to echo the character).

b. IB receives the VALUE-HASH of the input field. The hash corresponds to the text "ali-", but the hash of the corresponding field in the IB corresponds to "ali" (since the page JavaScript prevented the trailing hyphen).
    c. IB sends a misprediction message to the TC, causing the TC's onMisprediction handler to fire.
    d. IB also sends a new Commit to the TC indicating the new authoritative value of the input field in DrawTextFieldOp::content. It's effectively a drawing of the "ali" text.
    e. onMisprediction removes the TIB for the input field at hand.
    f. In the next animation frame, Canvas2DTileWithEditable observes that the input field has no TIB, thus forcing it to draw the IB's authoritative rendering of the field (DrawTextFieldOp::content).
    g. Henceforth, no speculation is performed on the field.
8. Alice types the remainder of her username successfully.
9. Alice moves to the password field and types her password without illegal characters
    a. Speculation on the password field is enabled even though it was disabled on the username field.
    b. Since Alice was able to type her password without forbidden characters, misprediction was never triggered on the field.

Appendix

Specification Language

For clarity and precision, a typed programming language inspired by Python has been used to provide additional detail on various techniques described herein. A variety of languages can be used to implement embodiments of the techniques described herein.

A brief overview of constructs is as follows:

Variables

Variables hold state, and syntax follows a Python-like model.

x=0

Type declarations, when left out, are inferred from context.

Loops

Python-like while and for loops are supported, e.g., for x in xrange (1, 3):

iterates twice, with x holding the value 1 in the first iteration and 2 in the second iteration.

Function (func)

Defines a method that may be invoked. When invoked (potentially with arguments), it performs computation and returns a value. For example,

```
func myFunc(val : int) -> bool
    return 1 < 2
``` defines a function named |myFunc| that takes one argument of type int and returns a value of type bool.

A function with an empty body denotes a type definition for a function defined in a third-party or standard component, e.g.,

```
func getTime( ) -> float
* Class (class)
```

Defines a class of objects with properties and methods (prop and func keywords, respectively). A class may inherit from another class in object-oriented fashion, and supports common object-oriented features such as polymorphism. For example,

```
class Polygon:
    func getArea( ) -> float
class Triangle:
    prop base : float
    prop height : float
    Triangle( ): # class constructor
        base = 0
        height = 0
    func getArea( ) -> float # polymorphic override
        return (self.base * self.height) / 2
``` defines a base Polygon class and a derived Triangle class (via inherits keyword) with several properties (|base| and |height|). The Triangle class overrides the getArea function in polymorphic fashion. The |self| variable references the containing object, and is used to access object properties. Classes are instantiated as follows, e.g., t=Triangle( )

where we say that is an object of type Triangle.

Module (module)

Defines a high-level component. For example,

```
module EndpointBrowser: : Compositor {
    . . .
}
``` defines a Compositor component nested within a larger EndpointBrowser component.

Enumeration (enum)

Defines an integer enumeration of values, for example,

```
enum Color {
    Transparent = 0,
    kRed,
    kBlue
}
``` meaning the value of kTransparent is 0 while the values of kRed and kBlue are implicitly assigned to be 1 and 2, respectively.

Annotations

Identifiers (e.g., module, class, func, variables) may be augmented with one of the following annotations: standard, nonstandard/new; example semantics of those terms are as follows:

standard: denotes that the component corresponds to a foundational software concept and/or publicly available software component NN (for: nonstandard/new): denotes that component does not correspond to a commonly found component; the module may or may not be new An annotation of A implies that all content within the module should by default also be considered A unless explicitly marked otherwise. Example:

```
module<standard> BigModule {
    module<NN> SubModule1 {
        ...
    }
    module SubModule2 {
        ...
    }
}
```

The above indicates that BigModule is a standard component that has two submodules, SubModule1 and SubModule2, where SubModule1 is new/nonstandard and SubModule2 is standard.

Subsequent definitions of a module denotes extensions of the original definition. For example, module A below has two functions: fA and fB.

```
...
module A {
    func fA( ) -> None
}
module A {
    func fB( ) -> None
}
...
```

(b) The annotation <custom> within a function definition denotes that the reader is free to choose an implementation.

(c) The assert(exp) function means that expression |exp| should evaluate to true at that point in program execution. This is used to remind the reader of important program invariants.

(d) The isInstanceOf(o, C) function returns true iff |o| is an object of class |C|.

(e) Comments within the specification begin with the # character.

Types
  All variables in this language have types.
  Primitive types include uint8, int, float, bool, string, and None.
  Container types
  List<T> denotes a dynamic list of objects of type T, supporting a standard set of methods: e.g., push, pop( )
  Array<T> denotes a statically-sized array of objects of type T
  Map<K,V> denotes a dictionary that maps objects of type K to objects of type V one-to-one. The non-primitive type K, the key must be supplied by K's getKey function.
  Function refers to a function type, useful for passing callbacks.
  Union types are also supported, e.g., object:(Apple|Orange) is taken to mean that |object| may be either an Apple or an Orange.
  Variables without types are permitted so long as the type can be inferred from context.

Example Video Player with Adaptive Streaming Capability

The following video player leverages Media Stream Extensions to dynamically adjust the quality of video playback based on the likelihood of hitting playback stalls. Like many real-world players, this particular player also allows the user to manually select the quality type.

```
<!DOCTYPE html>
<html>
  <body>
    <video id='vid' style='width: 1024px; height: 768px;'></video>
    Select video quality:
    <button quality='high' onclick='onButtonClick( );'>720p</button>
    <button quality='low' onclick='onButtonClick( );'>240p/button>+
    <script>
    let quality = 'high'
    let m = new MediaSource
    let next_seg = 0
    let source_buffer = null
    let segments = [ ]
    let fetch_pending = false
    onButtonClick = ( ) =>
        quality = this.getAttribute( 'quality')
    fetchNextSegment = ( ) =>
        # Fetch chunk of the specified quality level.
        fetch_pending = true
        let chunk = await fetch( 'segment-' + next_seg + '-' + quality + '.mp4-')
        fetch_pending = false
        source_buffer.appendBuffer(chunk)
        next_seg += 1
    m.onsourceopen = ( ) =>
        source_buffer = m.addSourceBuffer('mp4')
        fetchNextSegment( ) // fetch the first chunk
    # Invoked periodically as playback advances,
    vid.ontimeupdate = ( ) =>
        # Begin fetch of the next segment when nearly done playing current one.
        if next_seg < segments.length:
            if vid.currentTime >= vid.totalTime * 0.8 and not fetch_pending:
                fetchNextSegment( )
            # Adaptive streaming: downgrade to 'low' quality if the chunk transfer
            # brought us dangerously close to a playback stall.
            if vid.currentTime >= vid.totalTime * 0.98:
                quality = 'low'
    vid.oncanplay = ( ) =>
        # Start playing as soon as the first chunk is loaded,
        vid.play( )
    window.onload = ( ) =>
        # Get a list of video segments (i.e., chunks)
        segments = (await fetch('/segments.txt')).slice(',')
        video.src = URL.createObjectURL(m)
    </script>
  </body>
</html>
```

Upon loading within an iframe (window.onload), the player loads a list of video segments from the origin web server and initiates fetch of the first segment at the default quality level ('high'). Subsequent segments are fetched in an on-demand fashion and may be of a different quality level if the user alters the desired quality (by clicking on the quality buttons) during playback, or if the player determines that segment fetch is taking too long.

Utility Components

An example system uses several components that are commonly found in publicly available graphics libraries and/or open-source web browsers.

```
module<standard> Common::Utility {
    # Represents a single point (x, y) in 2D space
    class Point:
```

-continued

```
    prop x : float
    prop y : float
    # A rectangle.
    class Rect:
        prop ltrb : List<float>[4]
        func Rect(x, y, w, h) -> None
        # Returns the width of the rectangle,
        func width( ) -> float
        # Returns the height of the rectangle;
        func height( ) -> float
        # Returns true iff this rect intersects |other|.
        func intersects(other : Rect) -> bool
        # Returns true iff |pt| intersects this rect.
        func intersects(pt : Point) -> bool
        # Sets element's CSS position and size to that of this rect.
        func setStyle(element : HTMLElement) -> None
    # The open source package glMatrix implements the functionality
described
    # here.
    class Matrix3D:
        # A 4x4 projection matrix of floats, suitable for projecting points in
        # 3D space.
        prop List<float>[4][4]
        # Returns an identity matrix.
        static func identity( ) -> Matrix3D
        # Returns self * other_matrix.
        func multiply(other_matrix : Matrix3D) -> Matrix3D
        # Returns the inverse of this matrix, or None
        # non-invertible.
        func inverse( ) -> (Matrix3D | None)
        # Returns the matrix as a CSS string value, e.g., 'matrix3d(. . .)'.
        func toCSSValue( ) -> string
    # Reads data types from binary buffer |buf| in serial order.
    class BinaryReader(buf : Array<uint8>)
    # Writes data types to binary buffer
    class BinaryWriter(buf : Array<uint8>)
    # Returns the SHA256 hash of the string |s|.
    func SHA256(s : string) -> string
}
```

Native Browser Types

Invokes standard browser functionality. Here are various type definitions.

```
module<standard> EndpointBrowser::DOM {
    # DOM overview:
    # - browser internal representation of rendered output
    # - tree of HTML Elements and Nodes: e.g..
    #    * HTMLDivElement
    #    |- HTMLVideoElement
    #    |- HTMLImageElement
    # - commonly traversed and manipulated using JavaScript to create
dynamic
    # webpages
    # - manipulations automatically initiate Browser re-rendering
    # - common manipulations include attaching and detaching elements.
    # modifying their attributes, and removing attributes/elements.
    # Partial type definition for base class for all HTML elements,
    class HTMLElement:
        prop parentNode : HTMLElement
        func appendChild(element : HTMLElement) -> None
        func removeChild(element : HTMLElement) -> None
    # A sequence of lines and contours used to build shapes. This is
    # expressive enough to draw complex shapes such as text glyphs,
    class Path2D:
        # Returns a string representation of the path, suitable for use as the
        # value of an SVG path element's "D" attribute.
        func toSVGPath( ) -> string
    # Holds bitmap data (partial type definition)
    class Image inherits HTMLImageElement
    # The source (e.g., URL) of the bitmap data,
    prop src : string
    # Partial type definition for <canvas> elements.
    class HTMLCanvasElement inherits HTMLElement:
        # Draws |image| onto the canvas.
        func drawImage(image : Image) -> None
        # Rasters |svg| and draws the resulting pixels onto the canvas.
        # On supported browsers (Chromium-based browsers. Safari, Firefox)
        # foreignObject elements of type HTMLElement within svg| are also
        # rasterized.
        func drawImage(svg : HTMLSVGElement) -> None
        # Draws the current frame of video onto the canvas,
        func drawImage(video : HTMLVideoElement) -> None
        # Draws |path| onto the canvas.
        func drawPath(path : Path2D) -> None
        # Saves the current matrix and clipping state of the canvas onto a
        # stack.
        func save( ) -> None
        # Restores the top-most matrix and clipping state from the stack,
        func restore( ) -> None
        # Sets the clipping region to that of the intersection of the current
        # clip and |rect|. Draws outside of the clipping region have no effect,
        func clip(rect: Rect) -> None
    class HTMLDocumentElement:
        prop body : HTMLElement
    # Renders video content. Uses hardware acceleration when available.
    # Heavily optimized by the Browser, hence preferable. Known draw-
backs
    # include:
    # * resets state if detached from Browser DOM (on some browsers)
    # * attempts to restore state after re-attach will result in
    # audio & visual artifacts (e.g., skipping)
    class HTMLVideoElement inherits HTMLElement
    # Partial type definition.
    #
    # One instance of this object per window/frame is created automatically
by
    # the browser. From script, it is referenced via the |document| variable,
    class Document:
        # Root node of the DOM tree.
        prop documentElement : HTMLDocumentElement
    # External type declaration for the third-party CanvasKit library.
    class CanvasKit
}
Partial type definition.
module<standard> EndpointBrowser::BOM {
    # This module represents the Browser's Object Model. It provides
    # capabilities such as network & file I/O, window management, session
state
    # management, etc.
    # Bi-directional, FIFO communication channel used to communicate
with
    # the Isolated Browser.
    class WebSocket
}
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        perform, at a client device, a predictive rendering using an endpoint browser executing on the client device, in response to a user input made by a user interacting with the endpoint browser;
        verify the predictive rendering using a surrogate browser that is executed on a remote server; and
        in response to receiving an indication that the predictive rendering is not correct, based at least in part on the verification, perform an adaptive correction on the client device; and
    a memory coupled to the processor and configured to provide the processor with instructions.

2. The system of claim 1, wherein the verification is performed asynchronously to the predictive rendering.

3. The system of claim 1, wherein the processor is further configured to prefetch contextual information.

4. The system of claim 3, wherein the contextual information comprises one or more Document Object Model (DOM) elements.

5. The system of claim 3, wherein the contextual information comprises one or more display lists.

6. The system of claim 3, wherein the contextual information is used to trigger a rendering of a native user interface widget.

7. The system of claim 1, wherein the processor is further configured to prefetch a plurality of versions of an element.

8. The system of claim 7, wherein the element comprises a hover element.

9. The system of claim 1, wherein the processor is configured to cease speculation predictive rendering if a threshold amount of information is not received from the surrogate browser.

10. The system of claim 1, wherein the processor is configured to determine whether the predictive rendering should be performed for a given field.

11. The system of claim 1, wherein the user input comprises one or more keystrokes.

12. The system of claim 1, wherein the user input comprises a hover action over an element.

13. The system of claim 1, wherein the user input comprises a touch action over an element.

14. A method, comprising:
performing, at a client device, a predictive rendering using an endpoint browser executing on the client device, in response to a user input made by a user interacting with the endpoint browser;
verifying the predictive rendering using a surrogate browser that is executed on a remote server; and
in response to receiving an indication that the predictive rendering is not correct, based at least in part on the verification, performing an adaptive correction on the client device.

15. The method of claim 14, wherein the verification is performed asynchronously to the predictive rendering.

16. The method of claim 14, further comprising prefetching contextual information.

17. The method of claim 16, wherein the contextual information comprises one or more Document Object Model (DOM) elements.

18. The method of claim 16, wherein the contextual information comprises one or more display lists.

19. The method of claim 16, wherein the contextual information is used to trigger a rendering of a native user interface widget.

20. The method of claim 14, further comprising prefetching a plurality of versions of an element.

21. The method of claim 20, wherein the element comprises a hover element.

22. The method of claim 14, further comprising ceasing speculation predictive rendering if a threshold amount of information is not received from the surrogate browser.

23. The method of claim 14, further comprising determining whether the predictive rendering should be performed for a given field.

24. The method of claim 14, wherein the user input comprises one or more keystrokes.

25. The method of claim 14, wherein the user input comprises a hover action over an element.

26. The method of claim 14, wherein the user input comprises a touch action over an element.

27. A computer program product embodied in a non-transitory computer readable storage medium and comprising computer instructions for:
performing, at a client device, a predictive rendering using an endpoint browser executing on the client device, in response to a user input made by a user interacting with the endpoint browser;
verifying the predictive rendering using a surrogate browser that is executed on a remote server; and
in response to receiving an indication that the predictive rendering is not correct, based at least in part on the verification, performing an adaptive correction on the client device.

* * * * *

UNITED STATES PATENT AND TRADEMARK OFFICE
CERTIFICATE OF CORRECTION

PATENT NO. : 11,729,182 B2
APPLICATION NO. : 17/894972
DATED : August 15, 2023
INVENTOR(S) : Ji Feng, Gautam Altekar and Yang Yu Page 1 of 1

It is certified that error appears in the above-identified patent and that said Letters Patent is hereby corrected as shown below:

In the Specification

In Column 26, Line(s) 42, after "kDrawImage", insert --,--.

In Column 53, Line(s) 5, after "path", insert --:--.

In Column 55, Line(s) 60, delete "D3" and insert --IB--, therefor.

In Column 66, Line(s) 37, delete "D3" and insert --IB--, therefor.

In Column 87, Line(s) 9, delete "D3" and insert --IB--, therefor.

In Column 89, Line(s) 5, delete "TM" and insert --TIB--, therefor.

In Column 89, Line(s) 9, delete "D3" and insert --IB--, therefor.

Signed and Sealed this
First Day of April, 2025

Coke Morgan Stewart
*Acting Director of the United States Patent and Trademark Office*